United States Patent
Chang et al.

(10) Patent No.: US 7,171,352 B2
(45) Date of Patent: Jan. 30, 2007

(54) LINGUISTIC OBJECT MODEL

(75) Inventors: Su Chin Chang, Woodinville, WA (US); Ravi C. Shahani, Redmond, WA (US); Domenic J. Cipollone, Redmond, WA (US); Michael V. Calcagno, Kirkland, WA (US); Mari J. B. Olsen, Bellevue, WA (US); David J. Parkinson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/940,483

(22) Filed: Sep. 14, 2004

(65) Prior Publication Data

US 2005/0251382 A1 Nov. 10, 2005

Related U.S. Application Data

(63) Continuation of application No. 10/830,988, filed on Apr. 23, 2004.

(51) Int. Cl.
G06F 17/21 (2006.01)
G06F 17/27 (2006.01)
G06F 17/28 (2006.01)

(52) U.S. Cl. ............. 704/9; 704/7; 704/10; 707/103 R

(58) Field of Classification Search .............. 704/9, 704/7, 10, 1; 707/100, 101, 102, 103 R; 717/104
See application file for complete search history.

(56) References Cited

U.S. PATENT DOCUMENTS 5,682,542 A * 10/1997 Enomoto et al. ........... 715/516
6,425,119 B1 * 7/2002 Jones et al. ................. 717/100
6,857,118 B2 * 2/2005 Karr et al. .................. 717/114
2003/0055625 A1 * 3/2003 Korelsky et al. ............. 704/9
2004/0111264 A1 * 6/2004 Wang et al. ............... 704/257
2004/0181390 A1 * 9/2004 Manson ....................... 704/2
2004/0243971 A1 * 12/2004 Leung ....................... 717/104

OTHER PUBLICATIONS

Muller et al. Automatic Speech Translation Based on the Semantic Structure, Oct. 3-6, 1996, Fourth International Conference on Spoken Language, vol. 2, pp. 658-661.*
Kuansan Wang, Semantic Modeling For Dialog Systems In A Pattern Recognition Framework, Dec. 9-13, 2001, Workshop on Automatic Speech Recognition and Understanding, pp. 284-287.*
Kim et al. Design of Software Reuse System Using Object Model In System Analysis, Nov. 12-15, 2000, Proceedings of the 2000 IEEE Management of Innovation and Technology, vol. 2, pp. 556-560.*
U.S. Appl. No. 10/942,646, filed Sep. 15, 2004, entitled "Resolvable Semantic Type and Resolvable Semantic Type Resolution".
U.S. Appl. No. 10/943,046, filed Sep. 15, 2004, entitled "Semantic Framework for Natural Language Programming".

(Continued)

*Primary Examiner*—Abul Azad
*Assistant Examiner*—Thomas E. Shortledge
(74) *Attorney, Agent, or Firm*—Westman, Champlin & Kelly, P.A.

(57) ABSTRACT

A linguistic object model is adapted to model semantic elements of a natural language. The linguistic object model includes a set of abstract representations of semantic elements of an utterance. Each abstract representation in the set corresponds to a natural language type that is independent of any particular language.

56 Claims, 10 Drawing Sheets

OTHER PUBLICATIONS

U.S. Appl. No. 10/943,091, filed Sep. 15, 2004, entitled "Lexical Semantic Structure".

U.S. Appl. No. 10/830,988, filed Apr. 23, 2004, entitled "Semantic Programming Language".

* cited by examiner

LINGUISTIC OBJECT MODEL

CROSS-REFERENCE TO RELATED APPLICATION(S)

The present application is a continuation of and claims priority of U.S. patent application Ser. No. 10/830,988, filed Apr. 23, 2004, the content of which is hereby incorporated by reference in its entirety.

BACKGROUND OF THE INVENTION

The present invention relates to a system and method for modeling the semantics of natural language. More particularly, the present invention relates to a set of types adapted to model the semantics of natural language for software application development.

A natural language is language as produced by people (as opposed to computer languages or other artificial languages), including all of the idioms, assumptions and implications of the utterance or text. In the context of natural language processing, a command and control system processes natural language utterances or texts and attempts to recognize and to interpret the utterance or text to derive a usable interpretation.

Conventionally, one technique for providing natural language command and control involves static recognition of pre-encoded commands. For example, commercially available voice-to-text programs allow the user to use simple commands to initiate pre-encoded operations, such save file. However, such programs typically cannot process such commands unless the exact command is used. In other words, store file may not be properly understood by an application coded to recognize the command save file.

Similarly, question/answer type applications typically include pre-encoded phrases or terms in order to facilitate search and retrieve-type functions. However, conventional implementations require the specific search term to be used in the utterance or text in order to succeed, and consequently cannot adequately account for the richness of human speech.

Programming natural language applications is extremely difficult. Typically, programmers know how to code in a computer language, but have little experience diagramming sentence structures and/or performing linguistic analysis. This deficiency makes programming for natural language applications difficult. Moreover, extending a natural language software application coded for the English language to work with other languages typically requires recoding, not only of the software application, but also of any associated linguistic analysis engines. This makes programming for natural language applications extremely difficult and potentially very expensive.

SUMMARY OF THE INVENTION

A linguistic object model is adapted to model semantic elements of a natural language. The linguistic object model includes a set of types and classes of linguistic expressions that the types are designed to model. In one embodiment, each type in the set of types corresponds to semantically meaningful elements of an utterance.

In another embodiment, a computer readable medium stores computer readable data structures utilized to model natural language. A set of types is adapted to represent classes as abstract objects. The classes represent categorized linguistic expressions, which may correspond to a semantically meaningful part of a natural language utterance.

DETAILED DESCRIPTION OF ILLUSTRATIVE EMBODIMENTS

A. Overview

The present invention is a Linguistic Object Model (LOM), a semantic framework, and a semantic programming language (SPL) for producing natural language applications. The LOM models semantic utterances independent of the natural language used or the application domain involved. The semantic framework includes a runtime component (an Interpreter), which mediates between natural language analysis engine(s) and a client application, and a set of types, which define the nature of the interaction between all components of the system. The SPL provides a programming framework for interfacing with the LOM and with natural language analysis engines adapted to operate with the LOM. The SPL may also be used to interface with other linguistic object models.

The present invention includes the overall process and architecture in addition to a number of the subprocesses and data structures. In order to better understand the present invention, one exemplary environment, which can be used with the present invention, is introduced. However, it should be appreciated that the present invention can be used in a wide variety of other systems and environments as well.

B. Illustrative Operating Environment

Figure 1:
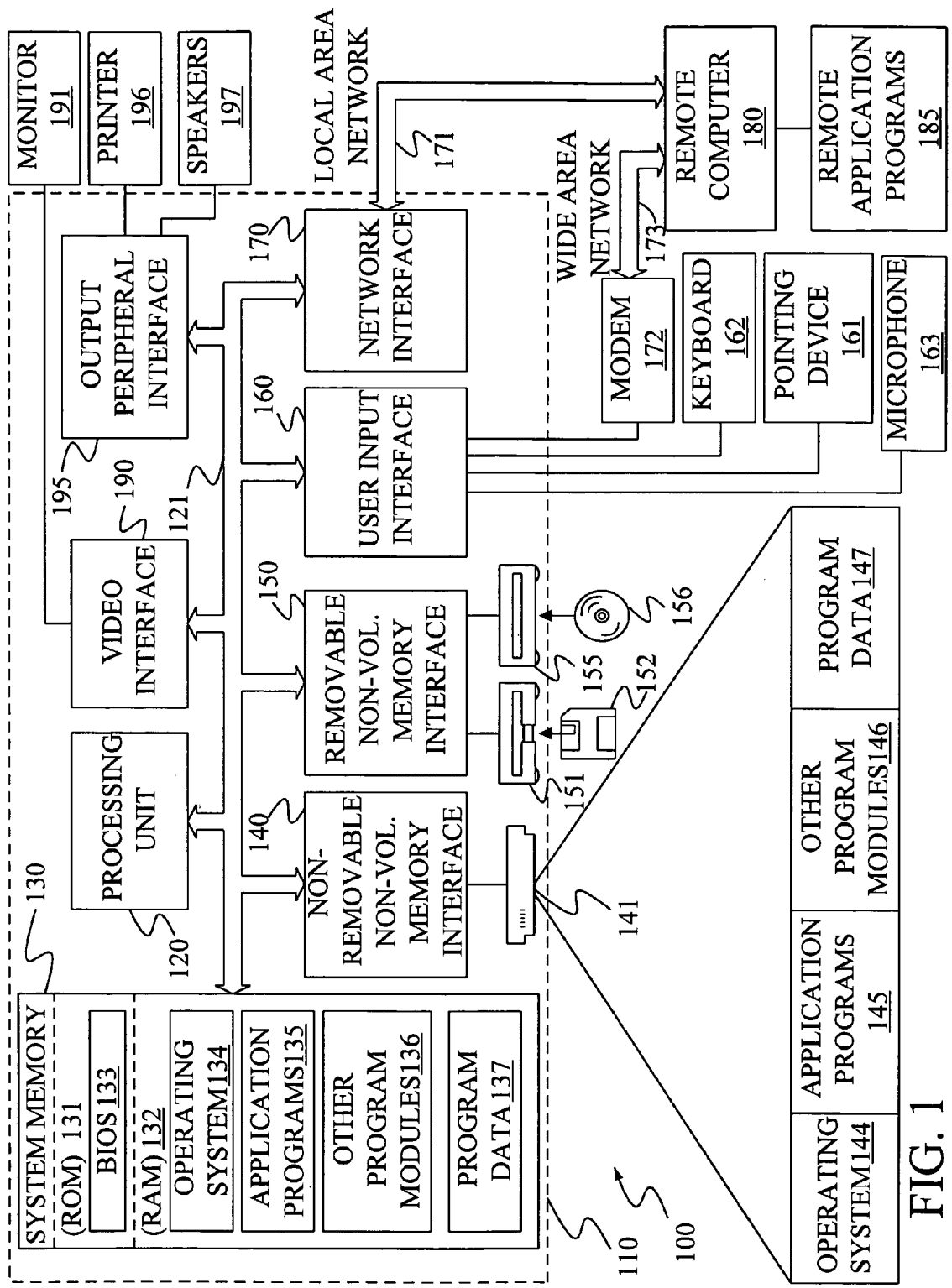
FIG. 1 is a diagrammatic view of the computing system environment on which an embodiment of the present invention may be implemented.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, and the like. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. The phrase "computer storage media" is intended to include both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers

197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

C. Overview of SPL Framework

The SPL framework consists of a runtime component (an Interpreter) and a set of types. The runtime component mediates between a client application and one or more natural language analysis engines. The set of types defines the interaction between all elements in the system. In applications that utilize the SPL framework, an Interpreter instance is created at runtime and is initialized with a declarative schema that describes the semantic model of the features in the client application that rely on natural language inputs. This declarative schema is created by the developer along with the application code, and it describes the relationship among a number of semantic modeling types created by the developer and derived from types in the LOM. These semantic modeling types may contain procedural code that is not mentioned in the declarative schema and that, when instantiated by the Interpreter, places runtime-context-driven constraints on the instantiation of the types.

Figure 2:
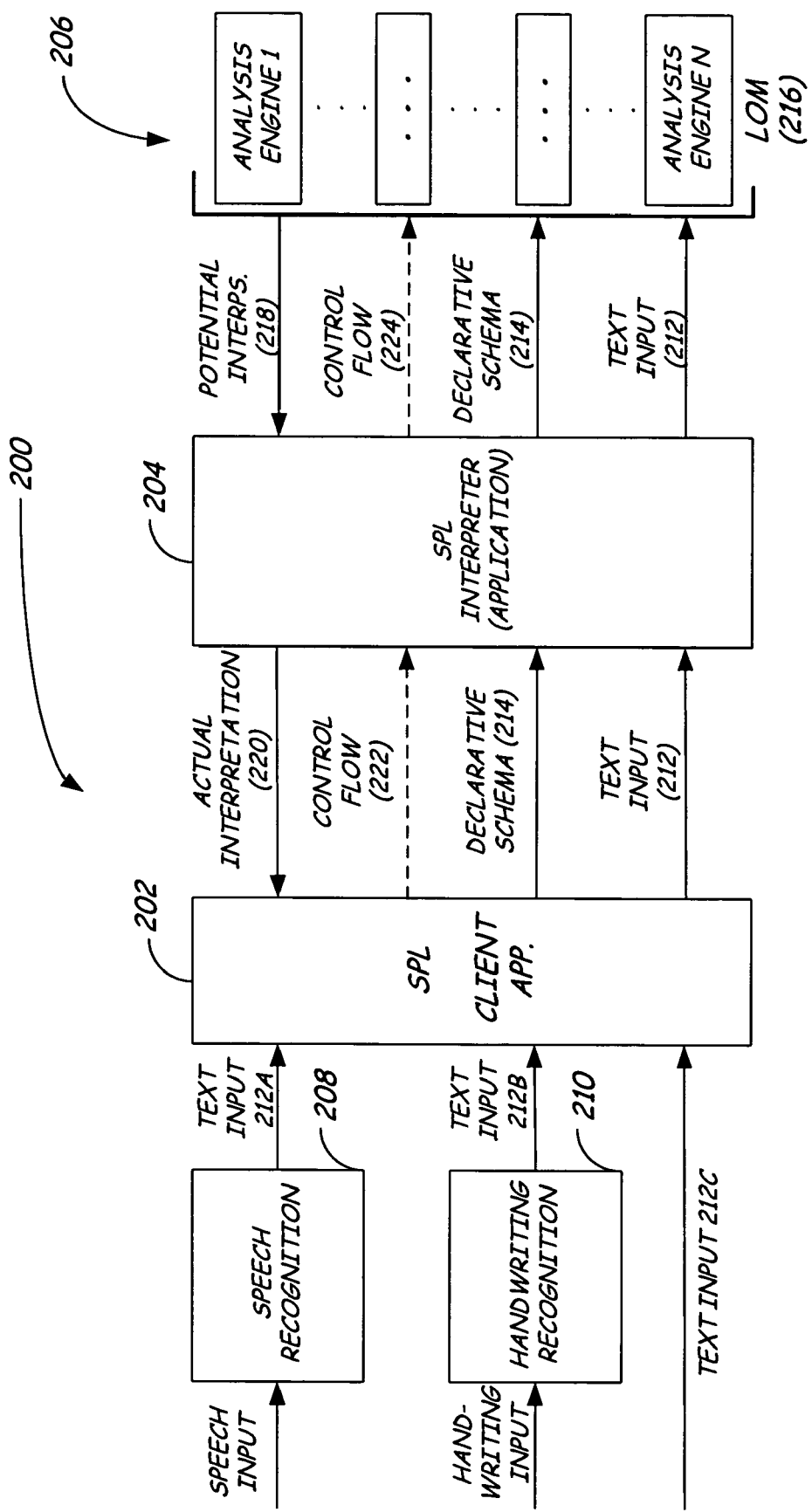
FIG. 2 is a simplified block diagram of a natural language system according to an embodiment of the present invention.

FIG. 2 is a block diagram of a semantic framework in accordance with one embodiment of the present invention. Semantic framework 200 includes an SPL client application 202, an SPL interpreter application 204, and a plurality of analysis engines 206. In general, the SPL client application 202 accepts text input, which may be input directly by a user (such as through a keyboard or other input device) or which may be received from a speech recognition system 208 or a text recognition system 210.

The speech recognition system 208 is a system that receives an audio input and produces a text output representative of the audio input. The text recognition system 210 is a system that receives a handwritten or scanned input and generates a text output representative of the handwritten or scanned input. In one embodiment, the speech recognition system 208 and the handwriting recognition system 210 are integrated with the client application 202.

In framework 200, a text input 212 string is input to SPL client application 202. Text input 212A refers to text output from the speech recognition system 208. Text input 212B refers to text output from handwriting recognition system 210. Text input 212C represents other text input, such as from a keyboard, from a memory buffer, or from any other input source. Hereinafter, reference numeral 212 is applied to the received text input, independent of source.

SPL client application 202 passes the text input 212 and application schema 214 of the SPL client application to SPL interpreter application 204. SPL interpreter application 204 passes text input 212 and application schema 214 to the plurality of natural language analysis engines 206 (shown as boxes Analysis Engine 1 through Analysis Engine N), each of which is designed to map the utterance to the Linguistic Object Model (LOM) 216. Any number of analysis engines 206 may be employed, and each engine 206 may use a unique analysis strategy for mapping the text input 212 to the LOM 216 and to the application schema 214.

In general, each analysis engine 206 applies its paradigm to the text input 212, and maps the text input 212 to the LOM 216 to produce a plurality of potential interpretations 218, which are returned to the SPL interpreter application 204. The SPL interpreter application 204 identifies one or more actual interpretations 220, and returns those actual interpretations 220 to the SPL client application 202, which can then act on the one or more actual interpretations 220.

In one embodiment, the analysis engines 206 derive only one possible interpretation 218; however, most semantic utterances allow for more than one possible interpretation, which may be resolved by the Interpreter 204 or the client application 202 with respect to the context of the utterance. In this case, the context is the domain of the SPL client application 202 and the objects it supports. The SPL interpreter 204, having received declarative schema 214 from the SPL client application 202, attempts to resolve the potential interpretations 218 against the declarative schema 214. The SPL interpreter application 204 can discard potential interpretations 218 that cannot be resolved against the declarative schema 214. The remaining interpretations (those that can be resolved against the declartive schema 214) are the actual interpretations 220. The SPL interpreter 204 attempts to instantiate each of the plurality of the actual interpretations 220 according to the declarative schema 214 of the SPL client application 202 by invoking the actual interpretation object 220 in the client application 202.

Depending on the implementation and configuration of the framework 200, controls 222 may be passed from the SPL client application 202 to the SPL interpreter application 204, instructing the SPL interpreter application 204 to perform further processing. Similarly, the interpreter application 204 may pass controls 224 to the analysis engines for further processing of the text input 212 relative to the LOM 216. Thus, the semantic framework 200 may process a text input iteratively to arrive at actual interpretations that corresponds to types defined within the domain of the SPL client application 202.

In general, the SPL client application 202, interpreter 204, and the analysis engines 206 may be located in a single computer. In an alternative embodiment, application 202, interpreter 204 and engines 206 may be located on different systems, such as on separate servers on a network.

The SPL interpreter 204 serves as an intermediary between the client application 202 and the analysis engines 206. The SPL programming language is intended to be intuitive to developers. In one embodiment, the language is built on top of C#, so the syntax will look familiar to developers. However, the SPL is adapted to express the LOM semantic structure and to perform linguistic analysis and can be implemented in C# directly or in any other object-based programming language.

As previously mentioned, the SPL framework includes a runtime component (the SPL interpreter 204), which mediates between natural language analysis engine(s) 206 and a set of types, which are created by the developer and derived from the types defined in the LOM. The set of types defines the nature of the interaction between all components of the framework.

The SPL Framework makes use of but does not include natural language analysis engines. It is designed to allow multiple analysis engines to be used simultaneously if desired. One might want to employ multiple analysis engines, for example, because some engines may be better at particular kinds of natural language input than others. Combining the outputs of the multiple engines may result in better overall performance and behavior.

For any given natural language input 212, the analysis engines 206 are expected to provide the interpreter 204 with linguistically possible interpretations 218 expressed in the system of types described in the declarative schema 214. The analysis engines 206 generally have access to the description of the semantic types in the declarative schema 214, but not to the actual types. Rather than producing actual objects, they produce potential interpretations (218), which are sets of instructions for building actual interpretations 220. The potential interpretations 218 produced by the analysis engines 206 become actual interpretations 220 only if the interpreter 204 succeeds in creating instantiations of the interpretations, where this includes running the procedural code of the types involved. The interpreter 204 attempts to resolve the possible interpretations 218 against the declarative schema 214, and, depending on the specific implementation, instantiates successfully-resolved interpretations in the client application 202 for further processing.

The back-and-forth between the client application 202, the interpreter 204 and the analysis engines 206 (including text input 212, declarative schema 214, potential interpretations 218, actual interpretations 220, and control flow 222 and 224) isolates conflicts and/or ambiguities. The framework and the LOM cooperate to free the programmer to concern him or herself with the application domain, rather than the linguistic analysis.

In general, the declarative schema may be XML code, Microsoft .NET attributes, or Microsoft .NET attributes and the resolvable types themselves. Alternatively, the resolvable types may be coded so that the schema information can be inferred from the types using "reflection". Reflection is the ability to determine what methods, fields, constructors, and so on, are defined for a class or an object. Reflection makes it possible to create dynamic programs.

Now that the framework has been introduced, it is important to understand the underlying linguistic object model from which the developer may derive his or her application specific set of types. The linguistic object model, in addition to being useful for natural language application development purposes, may be used to interact directly with a natural language semantic analysis system for arbitrary purposes.

D. Linguistic Object Model (LOM)

D1. Overview

The Linguistic Object Model (LOM) of the present invention is made up of a set of types, which are independent of the application domain or even the language. The present invention includes the set of types and the classes of linguistic expressions that the types are designed to model. The types are the declarative elements of the LOM.

It should be understood that applications of the present invention may be implemented in any number of ways, and that specific implementation details may vary from examples provided herein. However, the examples provided below are intended for illustrative purposes, and are by no means to be interpreted as limiting. Where appropriate, alternative methods or framework variances may be called out to further illustrate the versatility and robustness of the present invention.

In general, the LOM models the semantics of an utterance (what is said or written) in a domain independent way. The term "domain" as used herein refers to the SPL client application originating the natural language processing request. As used herein, the term "semantics" refers to the meaning or signification of spoken or written words. The term "utterance" refers to any finite sound or series of sounds and/or any written word or phrase detected by a software engine that the language engine attempts to analyze semantically. The term "syntax", as used herein, refers to the grammatical or structural rules that define how symbols in a language are to be combined to form words, phrases, expressions, and other cognizable constructs.

LOM types can be accessed by a software application to map elements of an utterance to classes of linguistic expressions. For the purpose of clarity, the following discussion takes as primary the mapping from LOM types to classes of linguistic expressions. However, it should be understood that the mapping is a full-duplex (two-way) mapping from LOM types to classes of linguistic expressions and back. Both directions of this mapping are important for different tasks. Moreover, it should be understood that the LOM itself is language independent, such that no code changes are required to the LOM in order to model different languages. Such language-specific code changes are made, instead, in the analysis engines, not in the client application.

In general, the LOM specifies language abstractly, as a set of building blocks. The SPL application utilizes the building block framework to access the lexical semantic structure and the analysis engines in domain dependent way. Finally, it should be understood that the LOM does not require application schema to operate. The LOM can be utilized to model an utterance, and an analysis engine can provide a LOM mapping independent of the application schema. Thus, the LOM can be considered to be inside the analysis engines, and the LOM is a way to express natural language semantically. The analysis engines make decisions as to what the correct LOM expression is for a given utterance, effectively mapping the utterance to the LOM.

Figure 3:
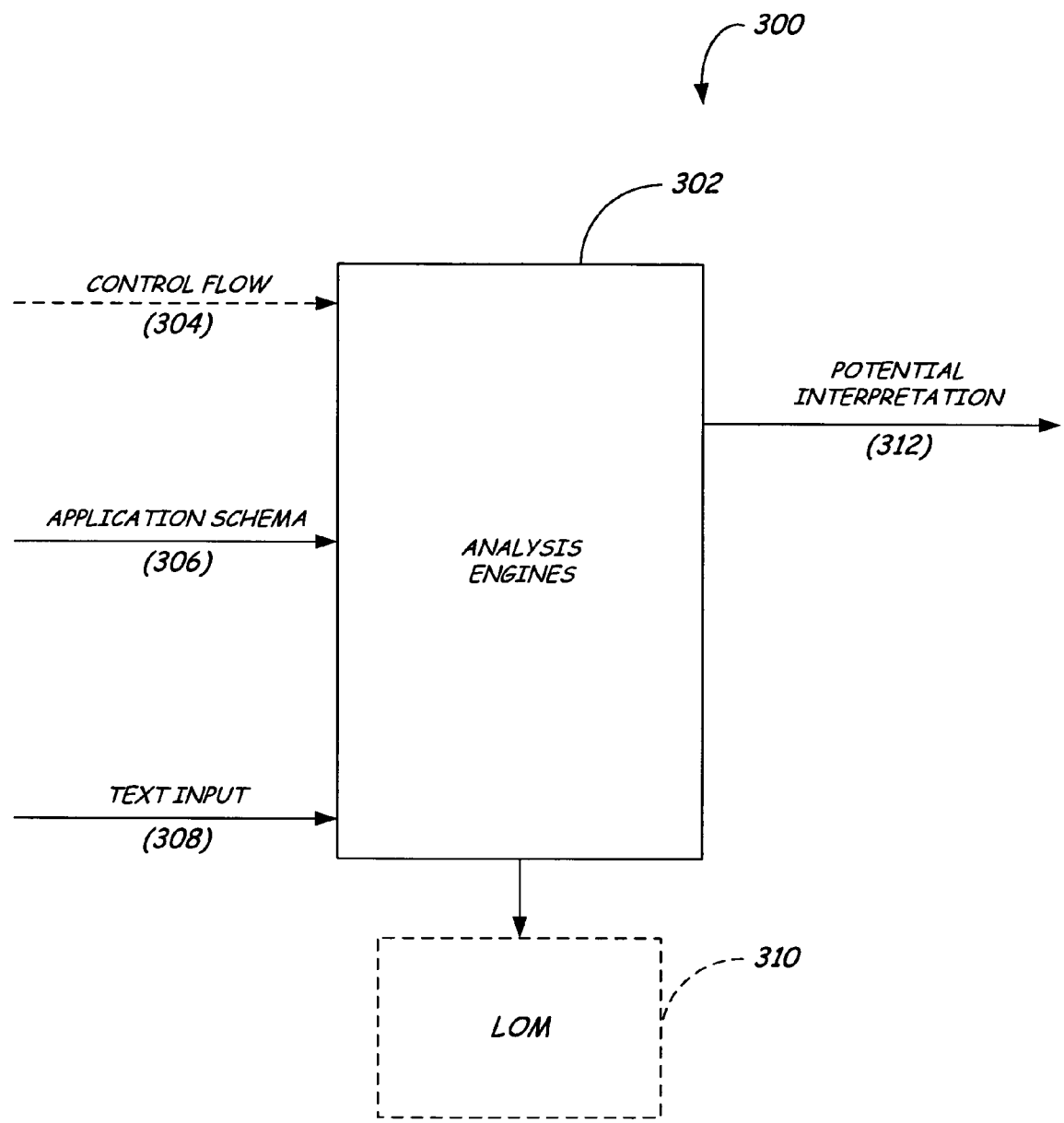
FIG. 3 is a simplified block diagram of the analysis engines of FIG. 2 with the Linguistic Object Model shown in phantom.

FIG. 3 shows a simplified block diagram of an analysis component 300 of the system of FIG. 2 according to an embodiment of the present invention. An analysis engine 302 receives flow controls 304, application schema 306 and text input 308. Using the LOM 310, the analysis engine 302 maps the text input 308 to the application schema 308 in order to produce one or more potential interpretations 312, which can be resolved by an SPL interpreter or by the client application from which the application schema 306 was received.

In general, the possible interpretations 312 are simply objects of particular types, represented as LOM objects. The analysis engines 302 may additionally map the LOM objects to the corresponding objects of the application schema before returning the possible interpretations to the interpreter or the client application, depending on the implementation.

Prior to discussing the structure of the LOM in detail, it is useful to develop at least a cursory understanding of the base types utilized by the semantic programming language. In general, the semantic programming language can operate over any number of different semantic object models, but is specifically optimized to operate with the structure of the LOM. At this time, the LOM is the particular semantic object model that offers the best compromise between programming intelligibility (from an application developer's perspective) and linguistic coverage (namely model elements required for application scenarios such as command-and-control, question-answering, and the like).

D2. Semantic Programming Language Types

The semantic programming language (hereinafter referred to as "SPL") is intended to assist software application developers to implement natural language programs. Since most developers are not experts in semantic analysis or linguistics, the SPL provides a framework and a programming language for non-linguist developers to deal with natural language semantics in largely intuitive ways.

The SPL and an accompanying compiler facilitate programming of natural language client applications to the LOM. The SPL is designed to hide many of the underlying details of the linguistic framework in order to make it easier for developers to write code that interacts properly with the Framework.

Although the SPL can be the standard front-end for developers making use of the Framework, the SPL is not required. A developer can target the Framework directly, by creating types that implement the various Framework interfaces, by inheriting from types that implement the various Framework interfaces, and by providing application schema to the Interpreter. Alternatively, this may be done indirectly, such as by other means of authoring Framework-compatible code, as through, for example, a visual forms-based design tool.

In general, the LOM is implemented as a class library of the SPL. This is similar to the way that the C Runtime Library and the Standard Template Library (STL) form the standard library of, for example, Microsoft® Visual C++®, which is an application designed to facilitate software development and which was created by Microsoft Corporation of Redmond, Wash. The terms Microsoft® and Visual C++® are trademarks owned by Microsoft Corporation of Redmond, Wash.

The semantically meaningful types in SPL are those types that participate in the modeling of the semantics of incoming utterances and in modeling the application commands to which those incoming utterances correspond. Semantically meaningful types are the types that SPL authors can derive from and specialize to their application domains. The semantically meaningful types in SPL are Entities, Frames, Restrictions, Commands, and Denoter Objects. Functional types in SPL are Phrases and Slots. Each of these types is discussed separately below.

In general, the SPL framework types define all aspects of the interactions between the client application, an SPL interpreter, and one or more natural language analysis engines. The phrase "all aspects of the interactions" refers to the interfaces that the various components must implement, the base classes from which the various components inherit, and the types of data passed between components of the system. In one embodiment, the framework types are implemented as types in the NET Framework, which is a framework that was created by Microsoft® Corporation of Redmond, Wash. The SPL types can be arranged into several namespaces. In one embodiment, the SPL types are arranged into several namespaces, which are all subnamespaces of, for example, System.NaturalLanguageServices or System.NaturalLanguage namespace. As used herein, "namespace" refers to a context in which names (identifiers) are defined. Within a given namespace, all names must be unique.

For the sake of clarity, the discussion below introduces the SPL types, introduces the LOM in detail, and then returns to detail the SPL. Throughout the text, examples are used, where appropriate, to illustrate the invention. For the most part, examples tend to derive from a simple natural language utterance, Send mail to Bob. Given this utterance, an application written according to the LOM and using the SPL can generate interpretations based on the text input. The generated interpretations can then be resolved against the natural language application to identify and execute actual interpretations of the instruction.

An Entity is an object of type Entity, meaning an entity can include data members, properties and methods. SPL Entities are objects whose type derives from class Entity and is used mainly to model the semantics of noun phrases and adjective phrases. SPL Entities may host frames or restrictions (both described below) via the "with" syntax. Additionally, SPL Entities may include an optional "Denoted By" clause, which introduces a privileged data member of type "Denoter" (described below). The privileged data member, introduced by the "Denoted By" clause, can be used by an SPL interpreter to map entities to actual natural-language words.

A Frame is a class, which models the semantics of semantic events, where the semantic event can be expressed either as verbs or nouns. SPL frames are classes that derive from Frame. In general, Frames can apply to Entities, so a Frame can have a "Denoted By" clause, as well as lists of "slots" (described below) containing frame arguments. Additionally, Frames may host restrictions via the "with" syntax. In one embodiment, head words for a Frame may be defined by a developer to create new Frame types. In an alternative embodiment, developers inherit from existing frames, and derive the desired headwords from inheritance. In another embodiment, developers can specify headwords in a manner similar to how denoters are specified.

Restrictions generally model oblique arguments, modifiers, and other semantic elements. SPL restrictions are classes that derive from class Restriction. Restrictions, like frames, have lists of slots containing arguments. Additionally, SPL Restrictions may host other Restrictions via the "with" syntax.

SPL commands are classes that derive from class Command. Commands are purely domain dependent, meaning that they depend on the specific natural language application to which they are associated. In general, domain dependent commands have no role in modeling the semantics of the input, and thus commands play no role in the LOM. Instead, commands model actions in the application.

Additionally, commands have an optional "uses" clause, which introduces a privileged data member of type Frame. The "uses" clause is the crucial link between the domain-independent input and the desired domain-dependent action.

Denoter objects are structs of type Denoter. In practice, a lexicon is created that maps from each word used as a denoter in a SPL program to a corresponding list of Denoters, so the Denoter object does not need to store a string list. There is one Denoter Object per natural language (an ENGLISH field, a JAPANESE field, and the like.). Denoter objects act as localization tables for entities. Like commands, denoter objects are purely domain dependent. However, Entity does have a field of type Denoter, which exists only so that the application can examine the Denoter object to determine why the Entity was suggested by an analysis engine.

The functional types in SPL are types that serve some modeling purpose, but that cannot be specialized. Additionally, other classes and types cannot be derived from the functional types.

The functional type "Phrase" encapsulates information about a portion of a text string input underlying some semantic object. Type Phrase allows software developers to perform ad hoc manipulation and examination of the original input string from inside structured representations of the semantics of that input string.

In one embodiment, the functional types "Slots" are objects of type Slot that hold entities, frames, restrictions or denoter objects, possibly along with some auxiliary information. For instance, slots corresponding to gaps in relative clauses contain entities marked as "backreferences". In an alternative embodiment, the Entity, Frame, or other reference is placed where a slot is expected. In another alternative embodiment, the Slot object is omitted along with its auxiliary information, and the Entity, Frame or other reference is used directly.

D3. LOM Types

Having reviewed the types that define the SPL semantic model structure, it is possible to discuss the LOM in detail. In general, the LOM types and the classes of linguistic expressions modeled by the types include Entities, Frames and Restrictions.

a. LOM Entities

While a large part, perhaps the majority, of an SPL programmer's job revolves around designing an array of domain entity types and gathering the correct localization information for each of those types, from the LOM's perspective, entities are straightforward. In many cases, the "head word" of the phrase is the head word of the entity. The head word normally corresponds to the lemma of the syntactic head of the phrase the entity models. The lemma denotes a canonical representation for different forms of a word. For example, the terms walks, walked, and walking share the lemma walk.

Regardless of the spoken language used, the general rule for all languages is that NPs become LOM entities. The head word of the entity is the lemma of the NP's head noun.

In general, coordination of entities is expressed in the LOM via the type "CoordinatedEntity". A code snippet of illustrating an instantiation of type CoordinatedEntity is shown in Table 1.

TABLE 1

CoordinatedEntity.

Entity CoordinatedEntity
{
    Entity entities[];
    CoordRelation relBetweenEntities;
}
enum CoordRelation
{
    And,
    Or,
    ExclusiveOr
}

The goal of the LOM with respect to coordination is to minimize semantically-irrelevant bracketing ambiguities. Thus, for instance, a text input of X and Y and Z is represented as the flat list X AND Y AND Z and is not ambiguous between the right-associative X AND [Y AND Z] and the left-associative [X AND Y] AND Z. When there is true bracketing ambiguity, however, the LOM preserves the ambiguity. For example, for the phrase show cars with 4WD and ABS or AWD, both 4WD AND [ABS OR AWD] and [4WD AND ABS] OR AWD are possibilities. Of course, in this particular case, only the second representation is likely to make sense, but that is for the application to decide, rather than the LOM.

Pronouns are modeled in the LOM as objects of type "PronounEntity". An illustration of an instantiation of a pronoun entity according to an embodiment of the present invention is shown in Table 2.

TABLE 2

PronounEntity.

entity PronounEntity
{
    Entity potentialAntecedents[];
}

The LOM provides an interface for anaphora resolution through the "potentialAntecedents" field within PronounEntity. The term "anaphora" refers to the relation between multiple words or phrases referring to the same Entity. The potentialAntecedents field can be optionally filled in with a list of previously-resolved Entity objects that are linguistically possible antecedents. The list is ranked in decreasing order of likelihood. The linguistic agreement information, which is the most important factor in anaphora resolution, can be accessed by the application developer through the object of type "AgreementInfo" that is attached to every Entity. An example of a struct AgreementInfo is provided in Table 3.

TABLE 3

STRUCT AgreementInfo struct AgreementInfo
{
    bool firstPerson;
    bool secondPerson;
    bool thirdPerson;
    bool singular;
    bool plural;
    bool feminine;

TABLE 3-continued

```
STRUCT AgreementInfo
        bool masculine;
        bool neuter;
        bool honorific;
        bool humble;
}
```

Only AgreementInfo fields that are unambiguously true with respect to a given entity are associated with that entity's AgreementInfo object. In other words, the LOM makes no attempt to represent disjunctive agreement features. For example, the term cat would have "thirdPerson" and "singular" associated with its AgreementInfo object. The phrase she is is associated with "thirdPerson", "singular", and "feminine" in its AgreementInfo object. In French, the term "vous" is associated with "secondPerson". In Spanish, the term perro is "thirdperson", "singular", and "masculine", each of which are unambiguously true with respect to the given entity perro, and therefore are associated with that entity's agreement object.

Demonstratives such as "this" and "that", which can be used as independent NPs, become objects of type DemonstrativeEntity. An illustration of an entity DemonstrativeEntity is provided below in Table 4.

TABLE 4

```
DemonstrativeEntity.

entity DemonstrativeEntity
{
        DemonstrativeType type;
}
enum DemonstrativeType
{
        Near,
        Middle,
        Far
}
```

Since objects of type DemonstrativeEntity are derived from Entity, they inherit the AgreementInfo objects, allowing words like this and that to be distinguished. In general, this inheritance allows the system to have the capability of distinguishing correctly between such elements in English, French, German, Japanese, Spanish, and numerous other languages.

Another related type is the NamedEntity type. The syntax for a NamedEntity is as follows.

namedentity OlapNamedEntity uses ExcelAddin.FuzzyOlapCubeRecognizer;

In general, NamedEntity types are based on a separately defined class that inherits from a NamedEntityRecognizer class. The NamedEntityRecognizer types are passed along with the schema, and an analysis engine can use them to call back into the client code to dynamically identify application object references in the utterance.

b. LOM Frames

In one implementation, for all languages, clauses become LOM Frames; however, this is not necessarily true for all implementations. Conceptually, a Frame comes from a clause, but there need not actually be a clause present in the input. The head word of the frame is the lemma of the verb heading the clause. For example, analyzing the phrase "Send mail to Bob" would result in "send mail" being associated with an LOM Frame, where "Send" is the lemma of the verb heading the clause and is therefore the head word of the frame.

It should be understood that the Restrictions can be conceptualized as providing for a default behavior. However, such behavior is not necessarily enforced. The functionality is implementation specific.

Slots can be filled by entities or frames, so default slots can be either noun phrases or clauses. In addition, NPs may be headed by an empty pronoun (PRO). If PRO points to referents in another clause, the head of that clause will be interpreted as the head of the NP entity. If PRO has no referents, it will be interpreted as some entity, (such as someone or something).

In one embodiment, assuming there is a subject contained in the clause, the subject of the clause fills the "Doer" restriction. If there is no subject, there is no "Doer" restriction. "Doer" represents a first participant in an event, with semantics loosely described as doer, agent, actor, instigator or cause of the event or state named by the verb. Examples of verb clauses where a portion of the clause maps to the "doer" restriction of the frame appear below in Table 5.

TABLE 5

Verb Clause with a Subject.

Instant message opens.
Robin is on my buddies list.
Amazon offers wish list capabilities.
[PRO] open the file
Having a program associated with a file ensures
        easy opening.

The underlined words or phrases are those that are mapped to the Doer slot. This is true in both transitive and intransitive frames, corresponding to transitive and intransitive verbs.

If there is an object in the clause, the object is mapped to a second slot of the frame called the "DoneTo" restriction representing the second syntactic participant in the event. The semantics may be loosely understood to refer to the object that is affected by the event or state named by the verb. The underlined phrases of Table 6 map to the "DoneTo" restriction.

TABLE 6

The "DoneTo" Restriction

Outlook has my buddies list.
Amazon offers wish list capabilities.
[PRO] open the file.
Preferences include having a program
        associated with a file.

In one implementation, indirect objects can be understood to be the beneficiaries of the action. In one embodiment, indirect objects may be mapped to a Beneficiary restriction. The Beneficiary restriction generally models verbal arguments that express the person on whose behalf or in whose place an event was performed. The beneficiary slot is illustrated briefly by the underlined pronouns contained in Table 7.

TABLE 7

Beneficiary Slot.

Open me a new file.
Play her some tunes

A Beneficiary restriction (or in an alternative embodiment, a "slot") may be set to the entity modeling a noun phrase that is interpreted as a beneficiary. Table 8 illustrates a code block of the beneficiary restriction.

TABLE 8

Beneficiary Retriction.

restriction Beneficiary<benef := Entity>
{
}

The beneficiary restriction, sometimes referred to as "benefactive", overlaps with allocation in English, especially on singular objects of "for" prepositional phrases. Some overlap may also occur in other languages. When applied to frames, the beneficiary restriction is apparent from the following sentence.

I baked a cake for my mother.
  PP[for]

In general, the beneficiary restriction models verbal arguments in most languages. Table 9 illustrates the beneficiary restriction in a few sample languages.

TABLE 9

Beneficiary Restriction.

ENGLISH:
  Preposition For
  Applies to indirect objects that are not
  Goals (cannot be paraphrased by a "to"
  prepositional phrase)
    I baked her a cake -> I baked a cake
    for her.
    NOT: I gave her a book (cf. I gave a
    book to her, cf. Goal)
    I baked a cake for her.
    I baked her a cake.
FRENCH
  Preposition pour
GERMAN
  Indirect objects:
    Ich schicke ihr eine Nachricht.
  Preposition für
    Das ist eine Nachricht für sie.
JAPANESE
  NP-☐☐☐☐NP
  NP-☐☐☐☐...VP
  Subjects of a fixed clausal (small clause)
  construction, comparable to the English
  bake a cake [for her to have]. In
  contrast, verbs that take a Goal argument
  mark it with the dative particle, e.g. give
  her-DAT book-ACC
SPANISH
  Preposition para
  Trajimos la lista de regalos para Fernando.

Generally, restrictions may be subjects, direct objects, indirect objects, oblique arguments, modifiers, and the like. In SPL, a frame can take any restriction (with exceptions noted below). However, the LOM uses the grammar to prefer restrictions in two ways. First, an oblique argument may be a restriction type associated with a Lexical Semantic Structure class of which the verb is a member (this is discussed in greater detail below). Second, an oblique argument may be idiosyncratically associated with an individual verb; that is, the argument does not bear any of the restriction relations to its clausal head. The arguments are assigned to the Default restriction (discussed below) and are identified by their lexical head.

Coordination of frames is done in two different ways, depending on the context. "Top-level" coordinated frames (i.e., those that come from matrix verbs) are represented as objects of type CoordinatedFrame, parallel to CoordinatedEntity (described above). An illustrative example is shown in Table 10 below.

TABLE 10

CoordinatedFrame.

frame CoordinatedFrame
{
  Frame          frames[];
  CoordRelation  relBetweenFrames;
}

Generally, frames that appear on entities (via the "with" syntax) behave as restrictions. As described below, that means that conjunctions are expressed by triggering multiple restrictions, while disjunctions are expressed by multiplying out the host entity into a CoordinatedEntity.

As previously discussed, in one embodiment, Frames may serve as restrictions on entities to model natural language relative clauses. When frames are attached to entities via the "with" keyword, the frame imposes a restriction on the entity, which is referred to as a "frame-based restriction". In a vast majority of cases, one slot in a frame corresponds to a natural language gap bound by the head noun. In the LOM, this translates into the frame-based restriction receiving a reference to its host entity in one of its slots. Inclusion of a reference to the host entity in a slot of the frame-based restriction can be referred to as a "backreference". Since such "backreferences" permit reentrance into the otherwise tree-like LOM representations, slots that correspond to gaps have their isBackreference flag set to true. (This flag is simply a convenience for processes that walk over LOM representations.) For example, in Table 11 below, a frame-based restriction is resolved against the phrase "files that Billy opened yesterday".

TABLE 11

Frame-Based Restriction

Entity$_1$(file)
  |
  open<Entity$_2$(Billy),{isBackreference}
    Entity$_1$(file)>
    Time ([1 day back] OFFSET FROM [now])

In table 12, a frame-based restriction is resolved against the phrase "people who work at Company".

TABLE 12

Frame-Based Restriction

Entity$_1$(people)
  |
  work< {isBackreference} Entity$_1$(people) >

TABLE 12-continued

Frame-Based Restriction

|
Location< Entity₂(Company) >

In table 13, a frame-based restriction is resolved against the phrase "people I have sent mail to".

TABLE 13

Frame-Based Restriction

Entity₁(people)
   |
   send<    PronounEntity₂(1st_pers,    sing)    ,
   Entity₃(mail)    >
   |
   Goal< {isBackreference} Entity₁(people) >

It is important to note that the reentrances introduced by frame-based restrictions cause difficulties for the resolution process of SPL. Specifically, an entity is not fully resolved (and thus in SPL does not technically "exist") until all of its restrictions have been fully processed. However, one of an entity's restrictions can be a frame that takes the entity itself in one of its slots. A situation thus arises where the entity object needs to be examined by the code that defines the frame, yet the entity remains in an undefined state until some point after the resolution of the frame finishes. This issue is discussed in greater detail below in Section E.4.

In an alternative embodiment, Frames do not have slots, but instead use "Doer" and "DoneTo" restrictions as described above. In such an instance, a new restriction may be defined based on the frame, and restriction clauses for "Doer" and "DoneTo" can be applied to that new restriction. Thus, restrictions present an alternative way of handling frame arguments. In the following discussion, for the sake of brevity, reference may be made to only one such implementation, but either implementation may apply.

c. LOM Restrictions

Unlike entities and frames, coordination of restrictions is not represented through the use of "compound" types such as CoordinatedEntity and CoordinatedFrame. Instead, the semantics of SPL are exploited to represent restriction conjunctions, while restriction disjunctions are reduced to entity or frame disjunctions.

SPL assigns a conjunction or intersection semantics to two restriction clauses successfully triggering sequentially on the same host; therefore, linguistic conjunction of material that is modeled with restrictions is handled by simply triggering two or more restrictions in sequence. Linguistic disjunction of material modeled with restrictions, on the other hand, has no convenient counterpart in SPL semantics. Such disjunctions, then, "bubble up" to the next entity or frame above the restriction (usually the host), giving rise to CoordinatedEntity or CoordinatedFrame objects at that level.

For instance, for the phrase "mail from Kim or to Robin", there is an entity host, "Entity(mail)", and two restrictions, "Source(Entity(Kim))" and "Goal(Entity(Robin))". Since the two restrictions are coordinated with the disjunction "or", the disjunction should bubble up to the host, "Entity (mail)", resulting in the mapping illustrated in Table 14.

TABLE 14

RESTRICTION COORDINATION

CoordinatedEntity([Entity(mail), Entity(mail)],
       |              |
       Source(Entity(Kim))
       Goal(Entity(Robin))
    Or
)

This code produces two copies of Entity(mail).

An Accompaniment restriction models an additional member or members in some group. Often, accompaniment can be paraphrased by a conjunction. For example, the phrase customers along with their birthdates can be paraphrased as customers and their birthdates. For reciprocal-event-denoting entities, the accompaniment restriction models an additional participant in the event. Often, such nominals have corresponding frames (e.g. correspond, meet, chat, and so on). The accompaniment restriction also models prepositional phrases in noun phrases such as correspondence with my manager, an appointment with Kim, meeting with Tim (emphasis added), a chat with Sue, and so on. An example of the syntax of an Accompaniment restriction according to an embodiment of the present invention is illustrated in Table 15.

TABLE 15

ACCOMPANIMENT.

restriction Accompaniment<accomp := Entity>
{
}

The Accompaniment restriction can also model additional who or what participants in the context of a Frame. For example, the phrase "chat with Robin" invokes the "Chat" frame with the phrase "with Robin" as an accompaniment restriction.

The accompaniment restriction may also be assigned to a slot within the entity modeling the noun phrase that is interpreted as accompanying the host. Alternatively, the accompaniment restriction can be set to the "who" or the "what" slot.

In some instances, it may be desirable to compile a list of cases of "with" as entity lists, which are semantically equivalent to conjunctions. To the extent that equivalent accompaniment expressions exist in other languages as well, it may be useful to compile entity lists for those expressions as needed.

With respect to possessives that can be modeled as accompaniment, it may be desirable include them in entity lists as well. For example, "email with attachments" is an accompaniment-style possession, as opposed to "email's attachments" which is a possessor-style possession. In some instances, these may be treated as linguistically complementary. Additionally, phrases such as "an email that has attachments" can also be modeled as accompaniment restrictions.

Subject reciprocals can also be folded into accompaniment restrictions. An example of a subject reciprocal is "John chatted with Mary" as compared with "John and Mary chatted". Lexically, these two expressions are easily identified. Similarly, object reciprocals, such as "Merge File A and File B" as compared with "Merge File A with File B", are readily identifiable. It may be desirable to incorporate such subject and object reciprocals into accompaniment normalization in the LOM.

The accompaniment restriction extends to many languages, particularly with respect to prepositional phrases such as "along with" or "together with". In French, German, Japanese, Spanish, and other languages, a similar accompaniment restriction can be employed. Table 16 illustrates such accompaniments.

TABLE 16

Accompaniment Restrictions (along|together) PP[with] (English)
((tout) ensemble) PP[avec] (French)
PP[mit] + Dative (German)
 "Er kommt mit den Kindern."
Entity Hosts: (Japanese)
 NP-□□ NP
 NP-□□□ NP
Frame hosts: (Japanese)
 NP-□... VP
 Np-□...□□□... VP
PP[con] (Spanish)

An allocation restriction, such as that illustrated in Table 17, generally models an entity to which the host entity is distributed or models an entity that exists or was created on the host entity's behalf.

TABLE 17

Allocation Restriction.

restriction Allocation<alloc := Entity>
{
}

When the allocation restriction models an entity to which the host entity is distributed, an example of such a restriction might be "online profile for each fund", "schools for linguistics", or "application for a job". The underlined portion illustrates the allocation restriction. When the allocation restriction models an entity that exists or was created on behalf of the host entity, the semantic utterance might be "a cake for my mother" or "party for my manager." In both instances, the allocation restriction adds specificity to the entity. Table 16 illustrates code for an embodiment of an allocation restriction. An allocation restriction can be set to the entity modeling the noun phrase that is interpreted as allocated to the host using the slots.

In general, the allocation restriction may apply to allocation to singular as well as plural entities. The allocation restriction is in complementary distribution with the Beneficiary in English. Only an entity hosts an allocation. Only frames host a beneficiary, especially on singular objects of for prepositional phrases. In English, this preposition may be used in a number of ways. For example, in packets for a specific destination it indicates a purpose, whereas in application for which you are enabling authorization checking it is a type of allocation. Similarly, tabs for taskpad views, checkbox for the type of service, and area code for Madison, Wis. all represent allocation restrictions. In German, für expresses allocation, inter alia. In Spanish, the corresponding preposition is para:the phrase "una escoba para la cocina" illustrates an allocation restriction.

An "AsBeing" restriction on a Frame models a property or capacity assigned to the object slot of the frame. Only modifier restrictions modeling an adjective phrase map into the restriction version. Table 18 provides two code samples of the AsBeing restriction.

TABLE 18

AsBeing Restriction.

restriction AsBeing<asbeing := Entity>
{
}
restriction AsBeing<asbeing := Modifier>
{
}

In general, the LOM models the semantic relationship between lemmas of an utterance. The "AsBeing" restriction attempts to model the prepositional phrase "as". For example, the phrase "Save the file as a text file" is similar to "Save the file to a text file". "Set my status as busy" is similar to "Set my status to busy." The AsBeing restriction models a property or capacity assigned to the object slot of the frame. Here, the AsBeing restriction models the restriction "as" to "text file", which is the property assigned to the object slot of the frame. Alternatively, it may be possible to apply this functionality to a Denoter, rather than to an Entity. Table 19 illustrates an example of the AsBeing object in English, German, Japanese, and Spanish.

TABLE 19

AsBeing Examples.

ENGLISH
 PP[as]: Save the file as text.
 Make me an administrator.
 Mark all messages unread.
GERMAN
 PP[als]: Speicher die Datei als Text.
JAPANESE
 -to complementizers
 -to site adverbials
SPANISH
 PP[for]: para A cardinal restriction is one that models cardinality as expressed by numeric quantifiers. Slots and fields may be set to the floating point value of the numeric quantifier. Indefinite articles such as "an" and "a" may be modeled as "one" in some cases. Table 20 illustrates a cardinal restriction.

TABLE 20

Cardinal Restriction.

Restriction Cardinal
{
 float number;
}

Additionally, it may be desirable in certain instances to block cardinal on units of time (such as "in 3 hours", and so on). With respect to time units in particular, blocking the cardinal restriction should not conflict with Time-type objects (at least in English) because the introduction of a time quantity typically requires a prepositional phrase, such as "in 3 hours" or "for 3 minutes", and so on. Table 21 illustrates some exemplary expressions that can be mapped to cardinal restrictions.

TABLE 22

Example Expressions illustrating Cardinal Restrictions.

ENGLISH
    3 cats
    ninety dollars
    2.5 kilos
FRENCH
    3 chats
    cinq francs
    2.5 kilos
GERMAN
    3 Mails
    fünf Euros
    2.5 Kilos
JAPANESE
    □□□□
    □□□□
    2.5□□
    □□□□...□□ (floating quantifiers)
SPANISH
    3 gatos Another type of restriction, "Comparison", models comparisons of an entity with another explicitly identified entity. The syntax for a Comparison restriction is illustrated in Table 23.

TABLE 23

Comparison Restriction.

Restriction Comparison<dimension := Modifier,
    refpoint := Entity>
{
}

The comparison restriction is not used for implicit comparisons, such as where one of the entities to compare is not explicitly referenced. For example, "a bigger file" suggests an implicit comparison, which does not invoke the comparison restriction.

The comparison restriction may be applied to a dimension slot, where the dimension is set to a modifier restriction modeling an adjective phrase. This modifier restriction will typically have a "degree" restriction with its degree field set to "more", "less" or "same", for example. A "refpoint" field is set to the entity to be compared with the host entity.

Depending on the specific implementation, superlatives that explicitly name a comparison class may require special attention. For example, the phrase the tallest girl in the class may result in the class being called out as a refpoint for comparison, or alternatively the class may be called out as a location on girl. Various other superlative expressions may also require special attention. For example, the phrase my daughter is tall for her age and the Spanish equivalent mi hija es alta para su edad present a similar problem from the perspective of the LOM.

Table 24 provides some exemplary expressions that can be modeled by the comparison restriction.

TABLE 24

Example expressions modeled by the comparison restriction.

ENGLISH
    a file bigger than mydoc.txt
    documents that are less relevant than
    mydoc.txt
    watches as expensive as the Rolex X-55J TABLE 24-continued Example expressions modeled by the comparison restriction.

FRENCH
    des livres plus chers que ce livre
GERMAN
    PP[als]
        Eine Datei, die kleiner ist als
        mydoc.txt.
    [ebenso/genauso/so/ [AJP] wie]
        Die Datei ist genauso gross wie
        mydoc.txt.
JAPANESE
    mydoc.txt□□□□□□□□□□□□□
    □□□□□X-55J□□□□□□□□
SPANISH
    un archive más grande que mydoc.txt A conditional restriction models a condition expressed within an utterance. Table 25 illustrates a conditional restriction syntax.

TABLE 25

Conditional Restriction.

restriction Conditional<condition := Frame>
{
    ConditionType type;
}

Like previous examples, the conditional restriction can be modeled in most languages, including English, French, German, Japanese and Spanish (among others).

A default restriction does not model any particular class of constructions, but simply provides an interface to portions of the underlying linguistic analysis that have not yet been claimed by other LOM objects. Table 26 provides an example of the default restriction syntax for one possible implementation of the present invention.

TABLE 26

Default Restriction.

Restriction Default
{
    LinguisticAnalysis analysis;
}

Another possible vaiant of the Default restriction takes a single Entity as its slot. This variant of the Default restriction makes it possible for any relationship between this single Entity and the object hosting the restriction.

It is important to note that in general a restriction can have patterns associated with it. Such pattern associations can enable the LOM consumer to communicate with an LOM producer (analysis engine) regarding which linguistic constructs to identify. A simple example would be string-based patterns. For example, a Source restriction usage could have a pattern of ["due to" +X] to ensure that an analysis engine (LOM producer) maps that pattern to a Source restriction. By applying pattern associations to the linguistic analysis, the programmer (author) can choose to do lower-level reasoning over the user input. Unlike other LOM types, there is no cross-linguistic normalization implied with the Default restrictions.

Depending on the implementation, it may be necessary to define a single interface (for example, "ILinguisticAnalysis") that can expose anything from full parsing results to simple strings. In general, patterns may correspond to different ways that parts of an utterance might be exposed through an ILinguisticAnalysis. In a preferred embodiment, there is a range of default restrictions, one for each kind of analysis engine.

A Degree restriction attaches only to modifier restrictions that model adjective phrases. Table 27 illustrates the syntax for the degree restriction and the DegreeType enumeration.

TABLE 27

Degree Restriction.

```
restriction Degree
{
    DegreeType degree;
}
enum DegreeType
{
    More,
    Most,
    Less,
    Least,
    Same,
    High,
    Low
}
```

The values of the DegreeType enumeration then represent various possible qualifications to the meaning of the adjective phrase. The degree field is set to the appropriate value.

In some instances, it may be desirable to recognize the low value of DegreeType by retrieving both a clausal negation and a high-type adverb at the same time. For example, the expression "not very big" refers to a low value of DegreeType expressed through a negation (not) and adverb (very). Ignoring the negation would lead to an incorrect interpretation of the utterance. Table 28 illustrates some exemplary phrases that can be modeled using the degree restriction.

TABLE 28

Example Phrases Implicating Degree Restriction.

ENGLISH
   More: big*ger*, *more* relevant
   Most: big*gest*, *most* relevant
   Less: *less* relevant
   Note that smaller is not modeled as "less big", but as "more small". The LOM does not model any notion of scalar antonyms.
   Least: *least* relevant
   Same: *as* big
   High: *very* big, *extremely* popular
   Low: *not very* big
GERMAN
   More: größer, relevanter, mehr relevant
   Most: größte/n, am Relevantesten
   Less: weniger relevant, weniger wichtig
   Least: wenigβte/n
   Same: genauso/ebenso relevant
   High: sehr klein, extrem dick
   Low: nicht sehr dick It will be understood by a worker skilled in the art that other Degree restriction types exist in English and German, and that such restriction types also exist in most languages. The Degree restriction can be accessed using almost any language.

A Direction restriction models a direction of motion or an orientation of spatial position. Table 29 provides an example of the Direction restriction and its associated enumerations.

TABLE 29

Direction Restriction and Associated Enumerations.

```
restriction Direction<landmark := Entity>
{
    DirType myDirType;
    OtherDirectionType other;
}
enum DirType
{
    Up,
    Down,
    Backward,
    Forward,
    Around,
    In,
    Out,
    Other
}
```

The Direction type ("DirType") field of the slot can be set to the appropriate enumeration value. In some instances, other enumerated values may be desirable. For example, the command "turn" has an unspecified direction; however, "turn" appears to expect a direction as an argument. Thus, it may be desirable to provide an enumerated value for "Unspecified" so as to distinguish such an expression from other, depending on the implementation. Values that are conflated in verbs may be stored as new object representations on the lexical entry. It is also important to understand that the Direction restriction includes objects of direction (prepositional phrases) and directional adverbs, independent of the attachment site. Table 30 provides some examples of phrases that can be modeled by Direction restrictions.

TABLE 30

Example Phrases Modeled by Direction Restriction

ENGLISH
   up (up, raise, elevate, increase)
   down (down, lower, decrease, plummet)
   forward (advance, proceed)
   backward (back, backward, retreat, recede, retract)
   around (rotate)
   in (insert)
   out (extract)
   other (diagonal, left, turn)
GERMAN
   up (hoch, anheben, erhöhen)
   down (runter, senken)
   forward (vorwärts, nach vorn)
   backward (rückwärts, zurück)
   around (drehen., rotieren)
   in (einfügen)
   out (extrahieren)

It will be understood by a worker skilled in the art that other Direction restriction types exist in English and German, and that such restriction types also exist in most languages.

An Example restriction models exemplars of an entity type, a frame or a restriction. Table 31 illustrates the syntax for each such Example restriction type.

TABLE 31

Example Restriction.

```
restriction Example<example := Entity>
{
}
restriction Example<example := Frame>
{
}
restriction Example<example := Restriction>
{
}
```

In some implementations, it may be desirable to have a SimilarTo restriction for attaching structures such as the following:

I want to find vendors, for example Volt.
I want to find vendors, Volt, for example.

In another embodiment, it may be desirable to provide an additional slot for the object (the what) for which the exemplar is an example. For example, the phrase This program exemplifies solid coding techniques may require an extra slot for modeling the phrase "solid coding techniques". In general, the Example restriction can be understood to model similes. Table 32 provides some phrases that can be modeled by the Example restriction.

TABLE 32

Example Phrases Modeled by Example Restriction.

```
ENGLISH
    "like"
    Show me cars like the Honda
    Which CEO dances like a monkey?
    What does a butterfly look like?
    "as"
    "such as"
GERMAN
    wie
SPANISH
    como
```

It will be understood by a worker skilled in the art that other Example restriction types exist in English, German and Spanish, and that such restriction types also exist in most other languages. The Example restriction can be accessed using almost any language.

An Extent restriction models an entity with respect to which some notion of extent in space is measured. Table 33 illustrates the syntax of the Extent restriction.

TABLE 33

Extent Restriction.

```
restriction Extent<extent := Entity>
{
}
```

In general, the extent field of the slot is set to the Entity that models the measure of the extent. In one embodiment, the object of the extent prepositional phrase is independent of the attachment site within the utterance. Table 34 provides an example of an English and a Spanish term that can be modeled by the Extent restriction.

TABLE 34

Example Phrases Modeled by Extent Restriction.

```
ENGLISH
    along
SPANISH
    por
    Mi hermana va por la calle San Juan.
```

A Goal restriction models a goal of motion (metaphorical or physical) or an end state of a change of state with respect to an Entity or a Frame. Table 35 illustrates the syntax of the Goal restriction according to an embodiment of the present invention.

TABLE 35

Goal Restriction.

```
restriction Goal<goal := Entity>
{
}
```

The Goal restriction can be associated with one or more enumeration values. The field "DirType" (defined in Table 29 above), for example, can be the enumeration values of the Goal restriction, which can be set to the appropriate enumeration value Table 36 provides some phrases that can be modeled by the Goal restriction.

TABLE 36

Example Phrases Modeled by Goal Restriction.

```
ENGLISH
    to
FRENCH
    à
GERMAN
    für
JAPANESE
    NP-□
SPANISH
    para
    Hay vuelos para La Paz todas las semanas.
```

It will be understood by a worker skilled in the art that other Goal restriction types exist in most languages. The Goal restriction can be accessed using most languages.

An Iteration restriction models repetition of an action. Table 37 illustrates the syntax of the Iteration restriction.

TABLE 37

Iteration Restriction.

```
restriction Iteration
{
    IterationType type;
    float        times;
}
enum IterationType
{
    Count,
    Never,
    Rarely,
    Sometimes,
    Often,
    Always
}
```

In one embodiment, the Iteration restriction may be incorporated into a Recurrence field of the time restriction. In general, the field of type Count signifies that the action is repeated a certain number of times (e.g. do [something] 5 times). When the type has this value, field "times" holds the number of iterations. If the type has other values, the type models modifiers that do not express a specific number of iterations. Thus, when type is set to count, it holds the number of iterations, and otherwise, type is ignored. Table 38 provides some terms and phrases that can be modeled by the Iteration restriction.

TABLE 38

Example Phrases Modeled by Iteration Restriction.

ENGLISH
    5 times
    never
    sometimes
    frequently
    seldom
FRENCH
    5 fois
    jamais
    souvent
    rarement
GERMAN
    5 Mal
    nie, niemals
    manchmal, ab und zu
    oft
    selten
JAPANESE
    5☐
    ☐☐
    ☐☐☐☐
SPANISH
    5 veces
    nunca
    algunas veces, de vez en cuando
    con frecuencia, frecuantemente
    raramente It will be understood by a worker skilled in the art that other Iteration restriction types exist in most languages. The Iteration restriction can be accessed using most languages.

A Location restriction models a physical or metaphorical location. Table 39 illustrates the syntax of the Location restriction.

TABLE 39

Location Restriction.

restriction Location<loc:= Entity>
{
}

Table 40 illustrates terms and/or phrases that can be modeled by the Location restriction.

TABLE 40

Exemplary Terms/Phrases Modeled by Location Restriction.

ENGLISH
    at
FRENCH
    à
GERMAN
    in/bei +Dative
    Er ist in der Stadt.
    Er ist bei Hamburg.

TABLE 40-continued

Exemplary Terms/Phrases Modeled by Location Restriction.

JAPANESE
    NP-☐

It will be understood by a worker skilled in the art that other Location restriction types exist in most languages. The Location restriction can be accessed using most languages.

A Means restriction models a means or device for accomplishing something for an Entity or a Frame. The syntax of the Means restriction is illustrated in Table 41.

TABLE 41

Means Restriction.

restriction Means<means := Entity>
{
}
restriction Means<means := Frame>
{
}

It will be understood by a worker skilled in the art that other Means restriction types exist in most languages. The Means restriction can be accessed using most languages. Example terms/phrases that can be modeled using the Means restriction are shown in Table 42.

TABLE 42

Example Terms/Phrases Modeled by Means Restriction.

ENGLISH
    with a knife
    employing a knife
    use a spreadsheet program
    by arriving early
FRENCH
    PP[avec]
GERMAN
    PP[mit]
    Er schneidet mit dem Messer
    benutzen, gebrauchen
    SUBCL[indem]
    Er gewinnt, indem er schnell rennt
JAPANESE
    NP-☐
    NP-☐☐☐☐
    VP-☐

A Measure restriction models a weight or measure of an object for a Frame or Entity. Table 43 illustrates the syntax of the Measure restriction according to an embodiment of the present invention.

TABLE 43

Measure Restriction.

restriction Measure<measure := Entity>
{
}
restriction Measure<measure := Frame>
{
}

It will be understood by a worker skilled in the art that other Measure restriction types exist in various languages. The Measure restriction can be accessed using most languages. Table 44 illustrates exemplary terms/phrases that can be modeled by the Measure restriction.

TABLE 44

Example Terms/Phrases Modeled by Measure Restriction.

ENGLISH
    Weight: three pounds
    Money: $4, fifty yen
    Distance: 3 yards
    Time: all day
FRENCH
    Weight: deux kilogrammes
    Money: un franc
    Distance: cinq kilometres
    Time: toute la journée
GERMAN
    Weight: drei Kilo
    Money: 4 DM.
    Distance: 3 Meter
    Time: den ganzen Tag A Modifier restriction may be considered a "catchall" (a "garbage dump") restriction in that it does not model a semantically coherent class of linguistic expressions. It instead captures the syntactical notion of "adjuncthood". In general, the Modifier restriction may model an adjective phrase, a noun phrase, or an adverbial phrase with respect to an Entity, a Frame, or a Restriction. In one implementation, a modifier slot is simply set to a denoter object constructed from the head word of the syntactic phrase being modeled. However, this implementation is not necessarily required in order to utilize the LOM. Table 45 illustrates a syntax of the Modifier restriction according to an embodiment of the present invention.

TABLE 45

Modifier Restriction.

restriction Modifier<mod := Denoter>
{
}

In general, Modifier restrictions model certain classes of linguistic modifiers in any context. While any linguistic modifier can become a modifier, Modifier restriction is intended as the primary LOM representation of only a subset of linguistic modifiers. That subset includes most or all adjective phrases, most or all noun phrase modifiers and some adverbial phrases. Many adverbial phrases, time expressions being one major example, find their primary LOM expression in other, more specific restrictions.

The Modifier restriction is unusual in that its slot contains a denoter object, rather than an Entity, Frame or Restriction. The Denoter object string is the head word of the modifier. The reason for this arrangement is that, while linguistic modifiers are semantically one-place functors over their hosts (the constituents that they modify) and are therefore similar to frames, in practice they are almost exclusively used as restrictions. Additionally, linguistic modifiers are almost never in other contexts where frames might appear. Rather than require cumbersome frame-based restriction syntax (something along the lines of with MyLargeFrame<this>) and the definition of a frame type for each desired modifier class, it is sufficient to specify only the Denoter object for a modifier class and take as the semantic argument the implicit restriction argument (such as the host object the restriction attaches to).

Predicative adjectives in relative clauses are represented the same way as the corresponding attributive use of that same adjective. So, "a large file" and "a file that is large" both become Modifier<large>.

This treatment of adjectives may not be appropriate for some languages, such as for JAPANESE, which has adjectives that behave syntactically indistinguishably from verbs. While nouns are very similar cross-linguistically, nouns are mapped to SPL entities. While verbs are also similar cross-linguistically, verbs are mapped to SPL frames. Adjectives, then, are somewhere in between nouns and verbs, and adjectives are not similar cross-linguistically.

Languages can be considered to exist on a continuum. On one end of the continuum, adjectives are not really a separate lexical category from verbs, such as in the Korean language. In this instance, adjectives are just stative, intransitive verbs. The Japanese language is similar to Korean in this regard, with adjectives behaving syntactically like verbs (although they are different morphologically). The English language and those languages that derive from Latin roots (such as the Euro languages) treat adjectives as a different category from verbs. On the other end of the spectrum, languages, such as Arabic, treat adjectives as nouns of a certain class. Rather than a word for "red", Arabic uses a noun meaning something like "a red one", such that the phrase "the book is red" becomes "the book is a-red-one."

In some embodiments, there may be a representation for predicative adjectives in matrix clauses. For example, the phrase "this file is personal" could be handled differently from "this file is text".

Additionally, it will be understood by a worker skilled in the art that other Modifier restriction types exist in various languages. The Modifier restriction can be accessed using most languages.

A Named restriction provides access to the denoter object of the host entity. This allows (for example, MyAlias and DL_MyAlias to be normalized to a single DLEntity without requiring the author to code for two different restrictions. Table 46 illustrates the syntax of a Named restriction according to an embodiment of the present invention.

TABLE 46

Named Restriction restriction Named<named := Denoter>
{
}
restriction Named<named := NamedEntity>
{
}
restriction Named<named := String>
{
}

In general, the Named restriction is set to the denoter object of the noun phrase name or the host entity. In some embodiments, the Named restriction may be used to provide some access to named entity attributes. In another embodiment, the Named restriction is merged into the Modifier restriction. In general, the Named restriction can present an already-present piece of information (such as the host entity's denoter object) as needed.

It will be understood by a worker skilled in the art that other named restriction types exist in various languages. The Named restriction can be accessed using most languages.

A Negation restriction models a semantic negation or logical NOT. Table 47 illustrates an example of syntax for the Negation restriction according to an embodiment of the present invention.

TABLE 47

Negation Restriction.

```
restriction Negation
{
}
```

In some embodiments, the Negation restriction may be presented as a separate restriction. In an alternative embodiment, the Negation restriction may be consumed either by a "with Negation" clause or by "!" (Not operator).

An Ordinal restriction models ordinal numeral and other modifiers (such as "previous") that express some notion of position in a sequence. Table 48 illustrates a syntax for the Ordinal restriction and its enumeration according to an embodiment of the present invention.

TABLE 48

Ordinal Restriction and Enumerations.

```
restriction Ordinal
{
    int         distance;
    ReferencePoint refPoint;
}
enum ReferencePoint
{
    First,
    Last,
    Current
}
```

In general, a distance field may be set to the signed integer distance from the reference point. Alternatively, a reference point field (refPoint) called first must indicate a non-negative distance. A distance value of zero (0) models first, a value of one (1) models second, and so on. A reference point field of last must have a non-positive distance. A distance value of zero (0) models last, a value of minus one (−1) models next-to-last, and so on. A current reference point distance may hold any integer value. A distance value of zero (0) models "current" status, a value of one (1) models "next", a value of minus one (−1) models "previous", and so on.

Table 49 provides phrases that can be modeled by the Ordinal restriction.

TABLE 49

Example Phrases Modeled by Ordinal Restriction.

ENGLISH
    first, 4$^{th}$
    last, next to last, 3$^{rd}$ from the end
    previous, current, next, two back, two ahead
FRENCH
    premier, 4$^{e}$
    dernier
GERMAN
    erst, 4$^{te}$
    letzte/r/s, vorletzte/r/s
    nächste/r/s, zwei _, zwei weiter
JAPANESE TABLE 49-continued Example Phrases Modeled by Ordinal Restriction.

□□, 4□□
    □□, □□□□2□□
    □□, □□, □□, 2□□□, □□□□
SPANISH
    primero, 4°
    last, next to last, 3$^{rd}$ from the end
    previo, _, proximo, dos _, dos mas It will be understood by a worker skilled in the art that other Ordinal restriction types exist in various languages. The Ordinal restriction can be accessed using most languages.

A Possessed restriction models a property, attribute or possession, and serves as a complement to the Possessor restriction (described below). Table 50 illustrates the syntax associated with the Possessed restriction according to an embodiment of the present invention.

TABLE 50

Possessed Restriction.

```
Restriction Possessed<possessed := Entity>
{
}
```

In general, the Possessed restriction models a property, attribute or possession. For example, the phrases email with headers, schools with linguistics programs and the like can be modeled by the Possessed restriction. In some instances, the Possessed restriction may be referred to as "having" an attribute, property, or possession. Table 51 provides some exemplary terms and phrases that can be modeled using the Possessed restriction.

TABLE 51

Example Terms/Phrases Modeled by Possessed Restriction.

ENGLISH
    with
        mail with "conference" in the subject line
        document with size greater than 1k
    of
        files of greater size
GERMAN
    RELCL
        Mail, die "Treffen" in der Betreffzeile hat
    mit
        Mail mit Anhang It will be understood by a worker skilled in the art that other Possessed restriction types exist in various languages. The Possessed restriction can be accessed using most languages.

A Possessor restriction complements the Possessed restriction. In general, the Possessor restriction models an entity's possessor, whether expressed by a full noun phrase or by a possessive pronoun. Table 52 illustrates the syntax of a Possessor restriction according to an embodiment of the present invention.

TABLE 52

Possessor Restriction.

restriction Possessor<possessor := Entity>
{
}

Table 53 provides exemplary terms/phrases that can be modeled by the Possessor restriction.

TABLE 53

Example Terms/Phrases Modeled by Possessor Restriction.

ENGLISH
    my, your, her, his, its, their
    of mine, of yours, of hers, of his, of its, of theirs
    (wheel) of the car
    Kim's, the computer's
    some instances of PP[of] 's
FRENCH
    mon, son, ta, sa, leur
    de moi, de toi, de lui, d'eux
    some instances of PP[de] 's
GERMAN
    mein, dein, sein, ihr, Ihr
    some instances of PP[von]
    some instances of genitive case
JAPANESE
    ☐☐, ☐☐, ☐☐☐, ☐☐☐☐
    some instances of NP-☐

It will be understood by a worker skilled in the art that other Possessor restriction types exist in various languages. The Possessor restriction can be accessed using most languages.

Another restriction that is modeled in the LOM is the Purpose restriction. The Purpose restriction models an anticipated outcome that is associated to a Frame. Table 54 illustrates some exemplary phrases/terms that can be modeled by the Purpose restriction.

TABLE 54

Terms/Phrases Modeled by Purpose Restriction.

ENGLISH
    for, in order to
FRENCH
    pour, afin de; de sorte que; de sorte à; de façon à
GERMAN
    um...zu
    so dass
SPANISH
    para, para que, con objeto de, con el fin de A Reason restriction models a rational motive for a belief or action that is associated with a frame or an entity. In one embodiment, the Reason and the purpose restrictions may overlap in scope. Table 55 illustrates exemplary terms/phrases that may be modeled by the Reason restriction.

TABLE 55

Terms/Phrases Modeled by the Reason Restriction.

ENGLISH
    because, in order to
FRENCH

TABLE 55-continued

Terms/Phrases Modeled by the Reason Restriction.

parce que ; à cause de ; en raison de
GERMAN
    fuer
    weil
    wegen
SPANISH
    por, porque, a causa de.

Both the Reason restriction and the Purpose restriction may be modeled in any number of languages. The exemplary terms/phrases listed above are not entended to serve as an exhaustive list, but rather to illustrate terms that might be modeled by the restrictions.

A SortOrder restriction models modifiers that describe the styles and/or methods of data ordering. Table 56 illustrates a syntax for the SortOrder restriction and its associated enumeration OrderType.

TABLE 56

SortOrder Restriction.

restriction SortOrder
{
    OrderType type;
    OrderCriteria criteria;
}
enum OrderType
{
    Default,
    Reverse,
    Increasing,
    Decreasing
}
enum OrderCriteria
{
    Default
    Alphabetic,
    Numeric,
    GoJuuOn,
    Iroha
}

In general, the field type may be default, reverse, alphabetic, numeric, increasing, decreasing, and so on. A default type models in default order, in any order, and so on. Reverse type models in reverse order (backwards). Alphabetic type models alphabetically (in alphabetical order). Numeric type models numerically (in numeric order). Increasing type models in increasing order. Decreasing type models in decreasing order.

Depending on the implementation, the SortOrder restriction may be put on entities for things like "alphabetical list". Additionally, verbs such as "alphabetize", "categorize", "group", "classify" and "index" may be modeled by the SortOrder restriction. In certain instances, it may be desirable to include two fields for modeling phrases like "reverse alphabetical order", "decreasing alphabetical order", and the like. Moreover, there may be different sort orders common to two different languages. While the enumerations listed in Table 56 are common to the English language, Japanese may have additional sort ordering that is common to the language. Table 57 illustrates exemplary phrases/terms that can be modeled by the SortOrder restriction.

TABLE 57

Terms/Phrases Modeled by the SortOrder Restriction.

ENGLISH
    in default order, in any order
    in reverse order, backwards
    alphabetically, in alphabetic order
    numerically, in numeric order
    in increasing order
    in decreasing order
FRENCH
    dans l'ordre par défaut; dans n'importe quel ordre
    par ordre inverse; en ordre inverse; dans l'ordre inverse
    alphabétiquement, par ordre alphabétique
    numériquement, par ordre numérique
    par ordre croissant ; par ordre ascendant;
    par ordre décroissant ; par ordre descendant
GERMAN [Babel]
    im Rückstellung Auftrag, in irgendeinem Auftrag
    im Rückauftrag, rückwärts
    in der alphabetischen Reihenfolge, alphabetisch
    im numerischen Auftrag, numerisch
    in zunehmendem Auftrag
    in abnehmender Reihenfolge
JAPANESE
    □□□□□□□□, □□□□□
    default-no-order-de,    favorite-order-ni
    □□□□□,    □□ or    □□□
    reverse-no-order-de    reverse-ni    opposite-ni
    □□□□□□□□ or    □□□□□
    alphabet-order-ni    ABC-order-ni
    □□□□
        number-order-ni
    □□□□□□□ or    □□□□□□
    small-number-order-ni    low-number-order-ni
    □□□□□□□ or    □□□□□□
    large-number-order-ni    high-number-order-ni
SPANISH
    ordenados por defecto, en el orden por defecto, en cualquier orden
    en orden inverso, al revés
    en orden alfabético, alfabéticamente
    en orden numérico, numéricamente
    en orden ascend(i)ente, de menor a mayor
    en orden descend(i)ente, de mayor a menor A Source restriction models a source or origin of an object. The syntax for the Source restriction is shown in Table 58.

TABLE 58

Source Restriction.

restriction Source<src := Entity>
{
}

In general, it will be understood by a worker skilled in the art that various Source restriction types may exist for multiple languages.

A StructureCriteria restriction models a notion, with respect to Frames, of operating over a set of objects in a structured manner. The StructureCriteria restriction models the criterion or criteria by which that operation proceeds. The syntax for the StructureCriteria restriction is shown in Table 59.

TABLE 59

StructureCriteria Restriction.

restriction StructureCriteria<criteria :=Entity>
{
}

In some implementations of the LOM, it may be desirable to include a restriction called "increment" for modeling phrases such as "in pairs", "5 at a time" and so on. These kinds of phrases contain nicely-normalizable numeric criteria that, depending on the implementation, may be important enough to include some specialized way of modeling them. Table 60 illustrates some terms and phrases that may be modeled by the StructureCriteria restriction.

TABLE 60

Terms/Phrases Modeled by Structure Criteria Restriction.

ENGLISH
    sort by subject, list by date
    display in rows
    transmit in 1KB blocks
    get my email one at a time
GERMAN
    sortieren nach Thema
    anzeigen
    senden/schicken The "Substitution" restriction models a participant in a semantic event where one term substitutes for another. One possible example, in French, is where a substitutes for pour as an adjunctive. An adjunctive is a type of adverbial indicating the circumstances of the action. Similarly, in Spanish, por is used as an adjunct, and para may be used with selected verbs.

Time may be treated as a restriction. In general, the Time restriction models time modifiers involving references to specific units of time or points in time that can be expressed as entities. For example, "after July $23^{rd}$" and "after Thanksgiving" can be modeled by Time restrictions. However, in some embodiments, phrases such as "after my computer boots up" are not modeled by the Time restriction. Similarly, ranges of time, such as "from 3:00 to 6:00" and "between morning and evening" can be modeled by the Time restriction. However, "while the defrag utility is running" may not be modeled by the Time restriction. Time expressions involving embedded clausal content are handled in the Conditional restriction. TABLE 61 illustrates a syntax and implementation of time as a restriction within the LOM.

TABLE 61

Time Restriction.

restriction Time
{
    BaseTime startTime;
    BaseTime endTime;
    BaseTime pointorSpan;
    Duration duration;
    TimeLength recurrence;
}
    abstract class BaseTime TABLE 61-continued Time Restriction.

```
{
}
abstract class AbsoluteTime : BaseTime
{
}
class NowAbsoluteTime : AbsoluteTime
{
}
class Analyzed AbsoluteTime : AbsoluteTime
{
        int        second;
        int        minute;
        int        hour;
        int        date;
        int        week;
        Weekday    weekday;
        Month      month;
        Int        year;
        Era        era;
        AmPm       ampm;
}
enum Weekday
{
        Unspecified,
        Monday,
        Tuesday,
        Wednesday,
        Thursday,
        Friday,
        Saturday,
        Sunday
}
enum Month
{
        Unspecified,
        January,
        February,
        March,
        April,
        May,
        June,
        July,
        August,
        September,
        October,
        November,
        December
}
enum Era
{
        Unspecified,
        BCE,
        CE,
        Heisei,
        Showa,
        Taisho,
        Meiji
}
enum AmPm
{
        Unspecified,
        Am,
        Pm,
        TwentyFourHour
}
class UnanalyzedAbsoluteTime : AbsoluteTime
{
        Denoter timeExpression;
}
        abstract class RelativeTime : BaseTime
        {
                BaseTime relativeTo;
        }
        class offsetRelativeTime : RelativeTime
        {
                Offset offset;
        }
```

TABLE 61-continued

Time Restriction.

```
class Offset
{
        Direction     direction;
        TimeLength    timeLength;
        Granularity   granularity;
}
enum Direction
{
        Unspecified,
        Forwards,
        Backwards,
}
enum Granularity
{
        None,
        Seconds,
        Minutes,
        Hours,
        Days,
        Weeks,
        Months,
        Years,
        Decades,
        Centuries,
        Millenia
}
class TimeLength
{
        float      amount;
        TimeUnit   unit;
        Denoter    otherUnit;
}
enum TimeUnit
{
        Other,
        Minutes,
        Hours,
        Days,
        Weeks,
        Months,
        Years,
        Decades,
        Centuries,
        Millenia,
        Mondays,
        Tuesdays,
        Wednesdays,
        Thursdays,
        Fridays,
        Saturdays,
        Sundays,
        Januaries,
        Februaries,
        Marches,
        Aprils,
        Mays,
        Junes,
        Julys,
        Augusts,
        Septembers,
        Octobers,
        Novembers,
        Decembers
}
class SubsetRelativeTime : RelativeTime
{
        AbsoluteTime subset;
}
class Duration
{
        TimeLength            timeLength;
        TimeLengthQualifier   qualifier;
}
enum TimeLengthQualifier
{
        None,
        MoreThan,
```

TABLE 61-continued

Time Restriction.

LessThan,
AtLeast,
AtMost,
Precisely
}

The Time restriction makes use of one or more fields and a large number of auxiliary data types as needed. Fields may include start time, end time, "point or span", duration, and recurrence. The start time field is set to a base time derived object expressing the starting point of a time span, such as "from 5:00" or "after tomorrow". If the start time field is null, then the time modifier modeled contains no overt expression of a starting point.

An end time field is set to a base time derived object expressing the ending point of a time span, such as "to 6:00" or "until Friday". If the end time field is null, then the time modifier modeled contains no overt expression of an ending point.

A point or span field is set to a base time derived object expressing a solitary time point or span expressed in a single phrase, as opposed to time spans expressed by overtly naming starting and ending points. For example, with respect to "tomorrow", the idea is that whether "tomorrow" is a single point on a time line or a 24-hour span of time depends on the context and the viewer's point of view. The LOM makes no attempt to disambiguate the term. If the point or span field is null, then the time modifier modeled contains no overt expression of a solitary time point or span.

A duration field may be set to a duration object expressing a length of a span of time without expressing the particular starting and ending points. For example, the phrase "for two hours" can be modeled by the duration field. If null, then the time modifier modeled contains no overt expression of duration. The duration inherent in a time span such as "from 4 pm to 6 pm" is not expressed as a duration object. In this case, there would be non-null values for start time and end time, but duration would be null.

A recurrence field is set to a time length object, expressing the interval between occurrences of a recurring event. For example, phrases, such as "daily", "weekly", "monthly", "the first Monday of every month" and so on, can be expressed as a time length object. If null, then the time modifier modeled is not interpreted as recurring.

In general, the Time restriction makes use of a large number of auxiliary data types. For example, BaseTime chains are objects derived from BaseTime, consisting of zero or more objects derived from RelativeTime and exactly one "root" object derived from AbsoluteTime. They are referred to as "chains" because each RelativeTime-derived object holds a reference to the next object in the chain, while the root AbsoluteTime-derived object holds no such reference.

AbsoluteTime derived types, such as NowAbsoluteTime, do not hold the reference to other objects in the chain. The NowAbsoluteTime derived type, for example represents the unanalyzable "now" of an utterance's speech time. The LOM does not attempt to resolve "now" into, for instance, 3:42:27 pm on Oct. 24, 2002.

AnalyzedAbsoluteTime is an AbsoluteTime derived-type that represents time point or spans that can be analyzed in terms of seconds, hours, days, years, and so on. For example, AnalyzedAbsoluteTime can be used to represent the time point "now" as 3:45, 10 May 2003, Wednesday at 9:30 am.

UnanalyzedAbsoluteTime is an AbsoluteTime derived-type that represents expressions that known to be time points, but which cannot be analyzed in terms of atomic time units. For example, holidays, seasons of the year, and abstract temporal concepts tend to fall into this category. For example, "Thanksgiving", "Election Day", "my birthday", "summer", and "this evening" are all phrases that are modeled as UnanalyzedAbsoluteTime.

There exist two RelativeTime-derived types: OffsetRelativeTime and SubsetRelativeTime. OffsetRelativeTime represents a positive or negative offset of a particular length of time from the referenced BaseTime-derived object. For example, the phrase "two days ago" is modeled as "[2 days back] OFFSET FROM [now]".

SubsetRelativeTime is a RelativeTime-derived type that represents a time point or span interpreted as being a subset of the enclosing time span expressed by the reference BaseTime-derived object. For example, expressions of time dimensions such as "at 5:00 on my birthday" can be modeled as equivalent to "[hour:5 min:0] SUBSET OF ["my birthday"]". It is important to note that a time reference such as "5:00 on Wednesday" can be captured by a single AnalyzedAbsoluteTime object, because the phrase can be decomposed into time units.

In some embodiments, it may be desirable to have more than one pair of StartTime and EndTime fields. For example, in order to capture expressions such as "from Monday to Friday from 4:00 to 5:00", two pairs of start and end time fields may be desirable in order to capture both ranges. In fact, for the above-expression, it may be desirable to have Time entities. Additionally, the parallels between the following expressions suggest that Time entities might be desirable.

Move the meeting [from 4:00 to 5:00].
Move the file [from Folder1]$_{source}$ [to Folder2]$_{Goal}$.

Additionally, EndTime should be distinguished from ordinary Goals, since not all structures that take Sources and Goals permit StartTime and EndTime to function as such. For example, a structure adapted to model the expression "Run a meeting [from 4:00 to 5:00]" may not permit StartTime and EndTime to function properly.

Another restriction is the Topic Restriction. With respect to Entity objects, the Topic restriction models arguments or modifiers that express what an entity is about or what it concerns or pertains to. A Topic restriction associated with a Frame models verbal arguments that express the subject or topic of the event. In general, the Topic restriction has a Slot set to the Entity or Frame that models the topic or subject. Alternatively, the Slot can take a string. Table 62 illustrates the syntax of a Topic restriction according to an embodiment of the present invention.

TABLE 62

Topic Restriction.

restriction Topic<topic := Entity>
{
}
restriction Topic<topic := Frame>
{
}

In some instances, it may be desirable to label the Topic restriction with a different name. Specifically, given the severe overloading (at least within the field of Linguistics) of the term "topic", it may be desirable to use other labels for this restriction. Some alternative labels might include, for example, "Concerning", "Regarding", "About", "Subject", "Theme", and so on. Table 63 provides some exemplary Terms/Phrases that can be modeled by the Topic restriction according to an embodiment of the present invention.

TABLE 63

Example Terms/Phrases Modeled by Topic Restriction.

ENGLISH
   about, on
   concerning ..., regarding ...
   remind Sandy <u>that Kim is coming tomorrow</u>
GERMAN
   über
   Zeige die Mail über den Hausbau.
   [bezüglich/bezgl.] +Genetive case
   Zeige Mail bzgl. des Hausbaus.
JAPANESE
   <u>NP-□□□□□ NP</u>
   <u>NP-□□□□ VP</u>

A Quantifier restriction models noun phrase quantifiers and partitive expressions such as two-thirds of. In general, the Quantifier restriction may include type or percentage fields. The type field may be a percentage, which is stored as a floating-point number, typically (but not necessarily) between zero and one. For example, the percentage type models one half of, 75% of, 200% increase, and the like. The type field may also model quantifiers that do not correspond to exact percentages. The terms "all" and "none" are enumerated as different "privileged" values that do not fall into this "other" type. The percentage field holds the percentage corresponding to the meaning of the quantifier if the type has a value of Percentage. Otherwise, the percentage field is ignored. Table 64 illustrates the syntax for the Quantifier restriction and its associated enumerations.

TABLE 64

Quantifier Restriction.

```
restriction Quantifier
{
                QuantifierType type;
                Float      percentage;
}
enum QuantifierType
{
                All,
                None,
                Some,
                Most,
                Many,
                Few,
                Percentage
}
```

In some implementations, it may be desirable to treat negations differently. Rather than enumerate terms such as "none", it may be desirable to handle negations as noun phrases. Table 65 illustrates some exemplary terms/phrases that can be modeled by the Quantifier restriction.

TABLE 65

Terms/Phrases Modeled by Quantifier Restriction.

ENGLISH
   All: all ((of) the), every, each (of the)
   None: no, none (of the)
   Some: some (of the)
   Most: most (of the), the majority of
   Many: many (of the)
   Few: few (of the), not many (of the)
   Percentage: a half of, ⅓ of, 40% of
GERMAN
   All: alle (Gen), jede/r/s
   None: keine/r/s (Gen)
   Some: manche/r/s (Gen)
   Most: die meisten (Gen), der Großteil (Gen)
   Many: viele (Gen)
   Few: wenige (Gen)
   Percentage: die Hälfte von(Gen), ⅓ von/ (Gen), 80% von/(Gen)

It will be understood by workers skilled in the art that the above-discussions with respect to exemplary terms and phrases is intended to illustrate domain and language independence, rather than to illustrate any particular limitation with respect to linguistic modeling. In general, the LOM can model any number of languages.

D4. Classes of Frames: Lexical Semantic Structure

The following discussion relates to one aspect of a possible implementation of an LOM object producer (analysis engine), which is referred to as a Lexical Semantic Structure (LSS). This particular aspect was developed in conjunction with the LOM, but numerous other implementations may be utilized to produce LOM objects. The LSS was also used in the design process for the types of the LOM.

Generally, the LSS identifies groups of frames and entities that share syntactic and semantic frames, which differ from the default patterns in one of the supported languages. In general, Lexical Semantics is a subfield of linguistics that deals mainly with word meaning. Lexical semantic structure (LSS) theory relates to the relationship of word meaning to sentence meaning and syntax. Additionally, LSS theory addresses the differences and similarities in lexical semantic structure between different languages.

In general, Frames have two default patterns: a transitive default pattern and an intransitive default pattern. The transitive default pattern links the Who slot to the subject position and the What slot to object position. By contrast, the intransitive default pattern lacks the What slot and object position. Both are illustrated in the following examples headed by a verb type.

[User]$_{Who}$ types [email address]$_{What}$.

[User]$_{Who}$ types.

Frames can vary from the default in both linking (how the slots of the frame are populated by the grammar) and argument structure (number of slots). For example, in one non-default linking type, the Unaccusative, classes of verbs have different linking patterns for the intransitive pattern, as seen in the frames below, headed by the verb increase.

[Users]$_{Who}$ generally increase [the font size]$_{What}$ of headers.
[The font size]$_{What}$ generally increases in headers.

In this case, the subject of the intransitive is the same as the object of the transitive, and is linked to the What slot. In Linguistics, these Unaccusative non-default linking types are sometimes referred to as "ergative" verbs, after their case-marking patterns in some languages. Such verbs generate an additional non-default linking pattern in the intransitive, in addition to the default linking pattern.

In another non-default linking type, ObliqueAsDefault, classes of verbs express a Who or What argument as an oblique argument. For example, reciprocals in ENGLISH express an additional Who or What participant as the object of an Accompaniment restriction.

Additional Who: I chatted with John~John and I chatted.
Additional What: I merged file A with File B~I merged File A and B.

Other languages express reciprocals as an additional pronominal argument, meaning an argument that relates to a pronoun or that identifies or specifies an object without describing the object. These are also treated under the Accompaniment restriction.

Many verbs have syntactically oblique arguments (marked by idiosyncratic prepositions) that seem to associate semantically with the What slot. That is, if the verb is intransitive, and the prepositional phrase does not fall semantically into one of the restriction categories, and the phrase can be paraphrased (or translated into another language) as a direct object, it may be treated as linking to the What slot. Several examples are provided to illustrate phrases that trigger the Oblique as default slot in Table 66.

TABLE 66

ObliqueasDefault.

Juan confía en Pedro -> 'John trusts Peter'
I'm waiting for MSN8 -> I'm awaiting MSN8.
Look for files on the internet -> Find files on the internet.

These may be associated with semantically coherent classes (hope for, watch for, wait for), or they may be individually marked on a set of verbs that take a certain preposition in this way, as a case-marker of sorts (e.g. find and look for).

Classes of verbs can vary from the default by having slots in addition to (or instead of) Who and What in the frame. Moreover, some classes of verbs link syntactic subjects or objects to restrictions in the LOM rather than to the Who or What slots. In other words, either or both the default slots may be replaced by a restriction.

SubjectAsRestriction patterns link subjects to a restriction rather than to the What slot. The verb "receive", for example, takes a Goal as subject.

[The website]$_{Goal}$ received the data.
[The garden] swarmed with bees.~Bees swarmed in the garden.

Similarly, the ObjectAsRestriction pattern projects frame in which the syntactic object is a Goal rather than a What. For example, the verb "enter" maps t a frame in which the syntactic object is a Goal or location, rather than a what.

Enter [the chat room]$_{Goal}$ (cf. Enter in(to) the chat room, Go in the chat room)

Frames can also vary from the default in semantically entailing one or more additional restrictions as obliques. AdditionalRestriction patterns link additional restrictions as oblique arguments or clausal complements, in addition to the default slots. For example, change of state verbs can take an additional Goal (as with the verb "reset"), or can take both a Source and a Goal (such as with the verb "change"), as shown below.

Reset [the default font]$_{What}$ [to Times New Roman]$_{Goal}$.
Change [the font]$_{What}$ [from Arial]$_{source}$ [to Times New Roman]$_{Goal}$.

Additionally, Frames can vary from the default in various ways, such as by combining one or more of the above non-default linking types (Unaccusative, SlotAsRestriction [subject or object], and AdditionalRestriction). Moreover, verbs can project multiple frames, which can be construed as taking different senses. The default frame holds for one sense of "enter", and SlotAsRestriction for another. The verb "enter" may be context sensitive.

Enter [the data]$_{What}$ (into the form).
Enter [the chat room]$_{Goal}$

The keyword "Keep" takes the default and three non-default frames, having different senses. For example, Default: Keep [the file]$_{What}$
AdditionalRestriction (Location): Keep [the file]$_{What}$ [on the desktop]$_{Location}$.
AdditionalRestriction (Goal): Keep [Bill Gates]$_{What}$ [from emailing me]$_{Source}$
Unaccusative: The data won't keep.

In general, it is desirable to have Lexical Semantic Structure frames across all supported languages, for verbs that differ from the default in at least one language. For the purpose of this disclosure, it is assumed that this is true for both transitive and intransitive verbs.

For some verbs (such as "expand", "increase", and so on), only the unaccusative pattern may be valid for the intransitive. For other verbs, unaccusative pattern linking is an additional option.

Table 67 illustrates some exemplary phrases/terms that can be modeled by LSS Frames with additional restrictions. In each example, the restriction replaces a default argument, or adds an argument to a frame. In principle, each restriction could appear in the subject position, in the object position, or as an additional oblique argument. A few restrictions add a participant to Who and What slots, as noted below. Related Noun Phrase (NP) frames are also given.

TABLE 67

Accompaniment Modeled by LSS Frames with Additional Restrictions

Accompaniment
   In subject position
      Meet: My daughter and I met
      Chat: My friend and I chatted.
   In object position
      Accompany: My daughter accompanied me to Minneapolis.

In English, the additional restriction is typically headed by the pronoun "with" or perhaps "against". A variety of verb subclasses select this pronoun or pronoun phrase on the relevant meaning. A sample is given below in Table 68.

TABLE 68

LSS Frames with Additional Restrictions

Abscond: The Enron executives absconded with the money.( )
Accommodate: indulge
Accredit: accredit, credit
Ache: ache, burn, itch
Arrange In English, the Accompaniment restrictions can also add participants to the Who and What slots. Although this is true for frames in which this restriction is a modifier, it is especially common with "reciprocal" verbs. Table 69 provides some examples of Oblique as a default slot.

TABLE 69

Oblique as a Default Slot.

Who
    Subject reciprocals
    Chat: I IMed with Mary ~ Mary and I IMed;
    chat, discuss, talk, visit
    Agree
    Alternate
    Unaccusatives: The file merged (together)
    with the data ~ The file and the data
    merged (together).
What
    Object reciprocals:
    Merge: I merged the files with the data, I
    merged the data and the files
    Acquaint: I familiarized them with the
    topic; acquaint In English, the additional restriction is headed by the PP "for" with respect to Allocation. A variety of verb subclasses take this PP on the relevant meaning. A sample is given below.

Adapt: Adapt the movie for the stage.

Allocate: Allocate funds for linguistics;

allocate, appropriate,

Appropriate: Appropriate funds for increased wages

Assign: Assign a day for the performance

Nominate: Nominate candidates for congress

Transcribe: Transcribe the music for trumpet

Train: Train for a marathon

A secondary predicate with respect to the AsBeing restriction can be utilized as an additional restriction. Some exemplary phrases are provided in Table 70 below.

TABLE 70

Secondary Predicate of the AsBeing Restriction.

Noun Phrase
    Make me administrator
Adjunctive Phrase
    mark messages low-priority
    judge the data correct
    mark that completed
    mark low priority
    judge the data correct
Pronoun Phrase (as) variant
    mark task one as done
    Mark messages as follow-up
    mark that as completed
    mark as low priority
    judge the data as correct
    Additional restriction
    Show my status as busy
    use as text file
    save as file.doc
    Log in as Administrator
    put this message as message number two Additional restrictions with respect to the Beneficiary restriction are shown in Table 71 below.

TABLE 71

Beneficiary with Additional Restrictions.

In object position
    Benefit: Relaxed stock option laws
    benefited Enron; benefit, gain, profit
    Unaccusative: Enron benefited from relaxed
    stock option laws
In indirect object position
    Benefit: Relaxed stock option laws
    benefited Enron; benefit, gain, profit
    Unaccusative: Enron benefited from relaxed
    stock option laws
Additional restriction
    PP-for and Indirect Object
    Build: arrange, assemble, bake
    Create: design, dig, mint
    Prepare: bake, blend, boil, clean, clear,
    cook, fix, fry...
    Performance: dance, draw, ding, play,
    recite...
    Get: book, buy, call, cash, catch Some of the restriction types may be non-applicable for verb frames. However, the additional restrictions may still be invoked, such as where a prepositional phrases introduces a comparison set.

Direction restrictions may require additional restrictions such as with the phrase "move the cursor up (the page)". Additionally, where the directional element is conflated in the verb itself (such as "the stocks rose/fell/advanced/retreated" or "rotate the picture"), additional restrictions may be required.

An LSS with an additional restriction can be understood from the following phrases, with the example restriction contained in the subject position.

This document exemplifies table construction Sample code illustrates possible applications.

The extent restriction typically falls within the object position or the additional restriction position. It is possible that all manner of motion type verbs may take an Extent object (e.g. "walk the mall", "crawl the web", "run the marathon" and so on). Example phrases that can be modeled by the Extent restriction are shown in Table 72.

TABLE 72

Examples of Phrases Modeled by Extent Restriction.

In object position
    The crawler traverses the web.
    The data in this spreadsheet spans several
    builds.
Additional restriction
    I want a border around this text.
    Maintain a uniform appearance throughout
    the web site.
    Run through the spec before the review.

A Goal restriction may require additional restrictions, particularly with respect to changing between classes or states. The scope of prepositional phrases that behave as Goals idiosyncratically with some verbs may vary according to implementation. Examples of a prepositional phrase that behave idiosyncratically as a Goal are "save as file.txt" ("save to file.txt") and "reschedule for 5:00" ("reschedule to 5:00").

Some verbs may need to take idiosyncratic goals, either in Bitrecs (if the Goal behavior is due to a single verb) or in LSS classes (if a class of items takes goals idiosyncratically). An additional goal may simply be added, and patterns can be pulled out from the lexicon into classes to address them as they are discovered.

The additional restrictions associated with location can be modeled as illustrated in Table 73 below.

TABLE 73

Location.

Keep, Stand, CausedGoalOfMotion
In subject position
    Locative alternation (Levin 2.3): The garden swarmed with bees (cf. Bees swarmed in the garden)
In object position
    Search: Canvass the neighborhood, Search the web
Additional restriction
    Transitive:
        Keep: Keep the file on the desktop (hold, keep, locate, store)
        Get: Find a book on Amazon.com
    Intransitive
        Stay: Stand here, Stay home The Means restriction may also be modeled with additional restrictions as shown in Table 74.

TABLE 74

Means.

Instrument Subject : The knife cut the cake
Additional restriction
    Adorn: adorn, festoon, decorate
    Adulterate: adulterate, alloy, pollute
    Anoint
    Afflict
    Aid: aid, assist, help
    Analogize
    Anoint
    Answer
    Arm
    Assail: attack, The SortOrder restriction may be modeled by additional restrictions as shown in Table 75.

TABLE 75

Sort Order.

ENGLISH
    Arrange alphabetically
    Additional restriction
        Arrange: sort alphabetically,
FRENCH
    par ordre alphabétique inverse
    du plus petit au plus grand [literally : from the smallest to the biggest]
    du plus grand au plus petit [literally : from the biggest to the smallest]

Similarly, the structure criteria restriction may be modeled by additional restrictions as shown in Table 76.

TABLE 76

StructureCriteria

ENGLISH
    Arrange by name (cf. SortOrder above), in date order
FRENCH

TABLE 76-continued

StructureCriteria

{catégoriser classer classifier filtrer grouper indexer ordonner regrouper réarranger réindexer trier}
    Classe les messages {par ordre alphabétique, alphabétiquement}
    'Sort the messages {in alphabetical order, alphabetically}'
    Regroupe mon courrier par date
    'Group/cluster my mail by date
    Trie les fichiers en fonction de la taille
    'Sort the files by size/ as a function of the size'
    Indexe la table sur le nom
    'Index the table on the name'

In general, classes that take a Time argument could be treated as classes that take a Measure restriction of type Time, although they can have the full time expression realized. For example, the following phrase can be modeled as a class that takes a time argument or a measure restriction of type Time: "I spent at least an hour from 9 to 5 every day for weeks looking for a piano."

Table 77 illustrates some exemplary Topic phrases that may be modeled with additional restrictions.

TABLE 77

Topic.

Spact: talk about X, talk X, remind X that Y, book on Martin Luther
In subject position
    Her finances don't concern you; concern
In object position
    Discuss: The article addresses adolescents in the 20$^{th}$ century; address, cover, discuss
Additional restriction
    PP[{about, concerning, on, regarding}]
    takes either NP objects (about cats) or clausal objects (about John coming to Seattle)
    PRPRTCL
    The object of address could also be the addressee, rather than the topic.

D5. Classes of Entities

This section provides a place to collect data on the types of entities supported as SPL libraries, such as Person Entities, Place Entities, and LSS Entities. Additionally, the SPL libraries may include classes of noun phrases (LSS entities) corresponding to each LSS frame class, particularly those that take additional restrictions.

The SPL libraries may also include Restriction classes. For each restriction, there is a (small) set of noun phrases that could be used to name the restriction. In SPL, these can be identified in a small set of structures as signaling the presence of the restriction slot filler. For example, when topic is the subject or object or the copula, the Topic restriction slot filler (in bold) is in the complementary position.

Find discussions where the economy is the topic.
Find discussions where the topic is the economy.

Similarly, when topic fills the AsBeing slot, the entity to which it attaches fills the Topic slot.

Find discussions that have the economy as a topic.

These structures should be normalized along with those identified as Topic restrictions.

Find discussions about/on/concerning/regarding the economy.

Synonyms like theme, matter, subject, issue, focus, and area could also be a TopicEntity. Moreover, developers can add to the entity class topic words that are more specific to their scenario, such as "subject in an email application."

E. Semantic Programming Language (SPL)

E1. Architecture.

SPL is a specialized programming language and with an accompanying runtime platform that allows application developers to build rich, natural language (NL) enabled, command and control (C&C) functionality for their application. (See Appendix I for a discussion on command and control scenarios that SPL can enable and the kind of commands that can be enabled, for example, for Outlook.)

SPL is an authoring solution to facilitate the derivation of meaning from utterances and to facilitate action based on that meaning. SPL is designed to scale to complex utterances without the developer having to bear the burden of that scalability. It is SPL's goal to facilitate authorship for both speech and text input without adding a lot of extra burden on the developer. Specifically, it is desirable to provide a NL authoring tool that allows developers with little or no knowledge of linguistic/semantic analysis to develop NL applications. In general, the SPL is designed to minimize differences between authoring for speech input and authoring for text input. However, due to speech recognition problems, some differences will likely have to be surfaced to the developer.

While the NL application can be written to interface with the analysis engines according to the LOM without the SPL, such programming is difficult, requires greater knowledge of linguistics by the developer, and more housekeeping with respect to lexical structures. In the end, the SPL facilitates development by abstracting specific elements so the developer can focus on the application's functionality, rather than the analysis component.

This is the whole point behind specialized programming languages, which free the developer from having to do the housekeeping and plumbing so he/she can concentrate on the task at hand (in this case, that's NL enabling applications). SPL allows the developer to express the fundamentals of the programming space in a natural and intuitive way.

In general, the semantics of natural language are complex and inherently ambiguous. Humans employ a great deal of world knowledge and context to understand and disambiguate meaning. In fact, humans do this understanding and disambiguation so naturally that we are often not consciously aware of the process.

For an application to be able to act on the meaning of an utterance, it not only has to decide what the semantics of an utterance mean to the application, but it must also have the authority to disambiguate meaning according to its own knowledge and context. Therefore, SPL provides the developer with the ability to reason about the application domain and to have that reasoning affect the semantic analysis in a deep and meaningful way. This deep integration with application-specific reasoning is intrinsically built into the SPL.

At a high level, in one embodiment, SPL's approach is to have the developer author against only the semantics of an utterance, not the syntax. Back door ways to access the syntax may be provided in some implementations. This is achieved through the LOM (discussed above in Section D). Briefly, the LOM models the semantics of an utterance (what is said) in a domain independent way. In many ways, the SPL programming model embodies this semantic model.

Through the resolution of an utterance against a SPL program, SPL builds the strongly typed, domain-dependent model of what is said that is bound to entities in the application. It is also worthy to note that, because the semantics are separated from the syntax, multilingual support is much easier to achieve.

SPL consists of two main pieces. The first is a language that is strongly-typed, procedural, event-driven, and object-oriented. In one embodiment, the SPL is based on C# (an object-oriented and type-safe programming language for building enterprise-scale applications) very familiar to mainstream developers today. In an alternative embodiment, the SPL is written entirely in C# through the use of attributes. In designing SPL, it was important that SPL not be a new approach to programming. Developers' existing knowledge and experience are leveraged, not invalidated. The second piece is a runtime that builds the domain-dependent model of what was said, in accordance with SPL's language semantics.

SPL enables developers to bind semantic meaning of an utterance with an existing application interface or object model, without impacting the existing application. While SPL does allow developers to write code that reasons about domain knowledge in place, the developer is also free to write that code in any programming language, including any Microsoft® .NET® programming language since SPL compiles to the .Net Common Language Runtime.

SPL's basic constructs are entities (nouns), frames (verbs), restrictions (relationships between entities), commands (application task entry points), NamedEntities and Denoters. These are the main first-class types of SPL. The language is command-centric by design, since it is designed for Natural Language-enabling Command and Control (C&C) functionality in applications.

Before discussing the SPL framework in detail, a simple SPL example is detailed in order to provide a mental picture for understanding the rest of the disclosure in context. Table 78 illustrates the SPL code that handles the "send email to Bob" command scenario. This command scenario will be revisited multiple times through the remainder of the disclosure.

Starting at the highest level with the 'command', it should be understood that the SPL code is written to the LOM model previously introduced (see Section D). Commands are authored against frames. Frames are objects that usually represent verbs. Basic frames, those that represent one verb, are supplied by the analysis system. A developer may also define his or her own verb frames, a feature discussed in greater detail in a section detailing Frames.

TABLE 78

"Send Mail To Bob" SPL Code.

```
//Bolded tokens are keywords or reserved
//words.
command SendMailCommand uses
MySendFrame<DoneTo.what := MailEntity>
{
    on resolve
    {
// begin resolution clause,
//invoked before resolution begins
    begin
    {
        // Do application specific initialization
        //or fail if we don't want further
```

TABLE 78-continued

"Send Mail To Bob" SPL Code.

```
            //resolution against this command
            //(eg the application is not in the
            // correct context/state).
        }
    // success resolution clause, invoked
    //when resolution of the utterance against
    //this object succeeds.
    success
    {
    // Do application specific task execution
    // (generate url or xml, run the command,
    //pop up dialogs, and so on)
    }
    // failed resolution clause, invoked when
    // resolution against this object failed
    failure
    {
    // Do task specific cleanup (free resources,
    //pop up dialogs, and so on)
    }
    }
}
```

The SendMailCommand defines an application task entry point that uses the MySendFrame where the object being sent (the 'DoneTo.what' slot) is a MailEntity. The command encapsulates the task, allows the developer to perform specific initialization and cleanup, and provides the platform with an entry point into the application.

Table 79 illustrates the SPL code for MySendFrame.

TABLE 79

MySendFrame.

```
Frame    MySendFrame   :   send<DoneTo.what   :=
MailEntity>
{
on resolve
{
begin
{
// do app specific initialization or fail
}
//RecipientEntity is defined somewhere in
//the program
with restriction Goal<goal := RecipientEntity>
{
//Code is only executed if there is a valid Goal
// relationship between MySendFrame and
// RecipientEntity in the utterance.
//
// Do application specific reasoning to bind to
// application objects, set state, or reject the
// resolution.
}
success
{
}
failure
{
}
}
}
```

The MySendFrame code block defines an application specific frame, MySend, that inherits from the domain independent basic "send" frame (provided by the platform) and subtypes the 'DoneTo.what' to a MailEntity. The 'DoneTo.what' is the object being sent.

The semantics of sending 'to Bob' are captured by the Goal restriction (provided by the platform, e.g. the SPL based on the LOM), which is linked to 'send' via the 'with restriction' clause. In addition to this linking, the entity that is being sent "to Bob" is also grounded to a RecipientEntity.

As previously discussed, Restrictions are typed semantic relationships, usually between entities. The SPL platform provides a predefined base-set of relationships. Developers can subtype the base-set of restrictions to create their own relationships. Some examples of predefined restrictions are Location ("mail in Inbox"), Time ("delete after 3 days"), Possessor ("Bob's book") and Topic ("mail about cats").

One important thing about restrictions is that the variations in syntax are normalized by the semantic platform. For example, Topic can be expressed in multiple ways semantically: "mail about cats", "mail with cats as the subject", "mail regarding cats", "mail with subject cats", and the like. Different languages express the semantics of Topic differently. These variations are normalized by the semantic platform so that developers just have to program against the Topic restriction, rather than against each possible semantic variation.

Table 80 illustrates the syntax of MailEntity according to an embodiment of the present invention.

TABLE 80

MailEntity.

```
Entity MailEntity denoted by MailWords
{
    on resolve
    {
        begin
        {
        }
        success
        {
        }
        failure
        {
        }
    }
}
denoter MailWords
{
    Japanese := noun("□□□□□"), noun("□□□□□");
    English := noun("mail"), noun("email"),
    noun("electronic mail");
}
```

In this example, MailEntity is defined and is denoted by a list of words. The words that denote are usually defined separately, typically in their own file (such as a localization file).

Like frames, entities can also have restrictions applied to them. Table 81 illustrates the syntax of an entity with restrictions.

TABLE 81

Entity with Restrictions.

```
entity MailEntity denoted by MailWords
{
    with restriction Location<loc :=
    MailFolder>
    {
    }
}
```

From a developer's perspective, this syntax declares that mail items can have the property (restriction) of being in a MailFolder. From an entity-relationship perspective, the MailEntity and MailFolder are related via the Location relationship. At runtime, an instance of MailEntity with the Location restriction represents the set of mail items that are restricted to being in a particular MailFolder.

Figure 4:
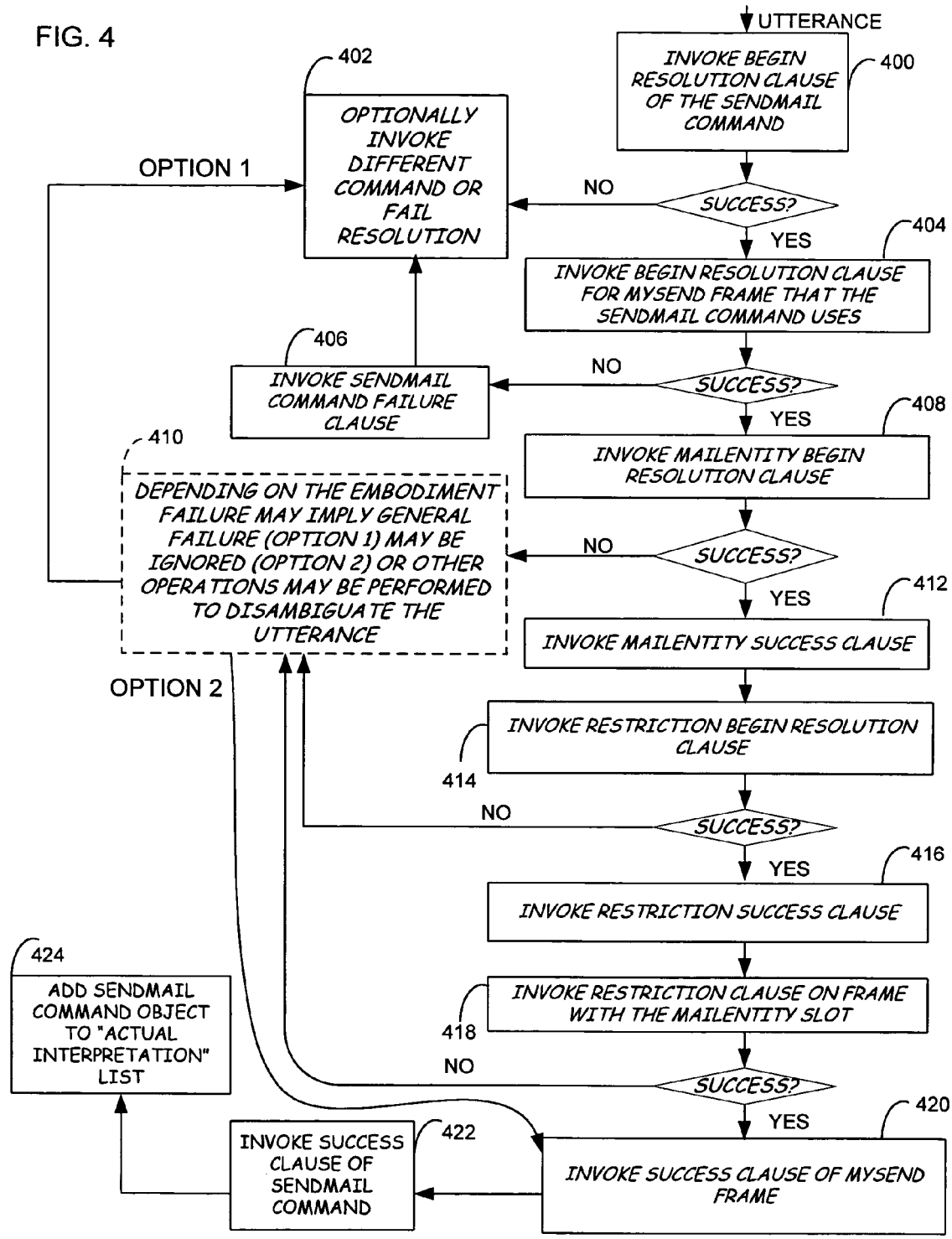
FIG. 4 is a simplified flow diagram of a process of executing a send mail command according to an embodiment of the present invention.

For the utterance "send mail to Bob" or "send Bob mail", the SPL runtime platform resolves against the SendMail-Command command. FIG. 4 illustrates a flow diagram tracing resolution through a SendMailCommand code according to one embodiment of the present invention. It should be understood by a worker skilled in the art that resolution of a command will vary according to the implementation. For example, referring to Table 78, each of the Begin, Success, and Failure clauses are optional. The OnResolve clause may contain any one of the clauses, any combination of the clauses, or none of the clauses, depending on the specific implementation.

For the purpose of the flow diagram in FIG. 4, it should be understood that the analysis engine has already mapped the utterance to types defined in the declarative schema and derived from the LOM. Denoter objects, for example, have already been considered by the analysis engines. Additionally, it is assumed that the code contains a Begin clause, a Success clause and a Failure clause for each element. It is also important to note that some details are omitted from the flow diagram, in part, because such details are implementation specific and would unnecessarily complicate the discussion.

Referring now to FIG. 4, upon receiving an utterance, the begin resolution clause of SendMailCommand is invoked (block 400). If begin resolution clause does not succeed, a different command may be invoked or (optionally) the Interpreter may simply fail resolution, depending on the specific implementation and depending on other commands that may be available in the application (block 402).

If the begin resolution clause of the SendMail Command is invoked successfully, the SPL Interpreter invokes the begin resolution clause for a MySend Frame that the SendMail Command uses (block 404). If the begin resolution clause for the MySend Frame fails, the SendMail Command failure clause is invoked (block 406), and the SPL interpreter can optionally invoke a different command or fail resolution (block 402).

If the begin resolution clause for the MySend Frame succeeds, the MailEntity Begin Resolution clause is invoked (block 408). If the invocation of the begin resolution clause for the MailEntity fails, then what happens next is largely implementation specific. As shown, depending on the specific implementation, failure of the MailEntity begin resolution clause may imply general failure (option 1), may be ignored (option 2), or may result in other operations to disambiguate the utterance (block 410). These "other operations" may include attempting to use a different restriction clause for the part of the input that is being resolved. The restriction clause can even be for a different restriction entirely, due to ambiguities.

If failure is understood to imply general failure (option 1), then the SPL interpreter optionally invokes a different command or fails resolution (block 402). If failure is ignored (option 2), then the SPL interpreter may simply invoke the success clause of the MySend frame (block 420), invoke the success clause of the SendMail Command (block 422), and add the SendMail Command Object to the "actual interpretation" list (block 424). If other operations are required by the developer code, then the SPL interpreter may perform further processing, including communications with the natural language analysis engines and/or call backs to the client application to attempt to disambiguate the utterance.

If the invocation of the begin resolution clause of the MailEntity succeeds, the MailEntity success clause is invoked (block 412). Next, the Restriction begin resolution clause is invoked (block 414). If the Restriction begin resolution clause fails, then the flow proceeds to block 410 (described above). If the begin resolution clause of the Restriction succeeds, the Restriction success clause is invoked (block 416). The Restriction clause is then invoked on the MySend Frame with the MailEntity slot (block 418). If this invocation fails, once again the flow proceeds to block 410 (described above). If the invocation succeeds, the success clause of MySend Frame is invoked (block 420), the success clause of the SendMail Command is invoked (block 422), and a SendMail Command object is added to the "actual interpretation" list (block 424).

It should be understood that the code blocks lead to virtually infinite permutations, depending on the application and on the developer. In one embodiment, a default for any failed resolution may be to invoke the failure clause and stop execution. In another embodiment, the developer may wish to instantiation partial objects so that the application can utilize the domain context to resolve ambiguities and to perform partial execution of the utterance. Numerous possibilities can be imagined wherein in each clause, the developer is free to write code to perform application specific functions.

In a preferred embodiment, RecipientEntity could be authored with a Named restriction clause taking a RecipientName as a slot. RecipientName would be a NamedEntity defined such that instances of recipient names would have been located in the entire user input before semantic processing was performed. This enables a robust recognition of RecipientEntity instances.

Assuming that "Bob" is a valid RecipientEntity, as previously mentioned, RecipientEntity is defined somewhere within the program. In this instance, the "with restriction" is within the MySendFrame used by the SendMailCommand. The code inside the "with restriction" clause is invoked. The code inside of the "with restriction" provides some flexibility to the developer to reject this restriction. If the clause succeeds, then the restriction is accepted. Otherwise alternative "with restriction" clauses may be invoked in succession until one of them succeeds, and if none of them do then the restriction is ignored. In an alternative embodiment, if a resolution clause fails, a fail resolution is invoked. Finally, the success clauses of MySendFrame and SendMailCommand are invoked, in that order (blocks 420 and 422).

In general, it will be understood by a worker skilled in the art that restrictions and other objects within the LOM and implemented by the SPL can be configured to invoke any number of functions or processes, either on success or failure. The flow diagram is a simple illustration to show how an exemplary flow might proceed. However, numerous other variations are anticipated and are as numerous as the potential client application to which the present invention may be applied.

During this resolution process, a connected graph is produced. Each entity is a node of the connected graph, and the relationships between the entities are defined by the LOM and validated against the application domain. It will be understood by a worker skilled in the art that the nodes and relationships are strongly typed. The connected graph represents what was said in the language of the domain.

It is important to note that the existence of the SPL objects (commands, entities, frames, and restrictions) is determined by authored code in conjunction with the semantic analysis. In general, resolving against a frame, entity, command, or restriction, involves determining the existence/validity of these objects with respect to the application domain. The objects do not really exist (are not valid) until their constraints are satisfied. An analogy of this can be drawn with C# object construction. In C#, objects can have constructors for which developers can write code to throw an exception. The exception prevents the object's existence if some constraint is not met.

The "system" invokes these constructors when it attempts to create the object. Thus, the authored code in the constructor can determine the class's existence. Conceptually, SPL resolution of its core types takes this concept a step further, formalizes it, makes it richer, and makes it a native part of the system. The constraints that must be satisfied are a combination of domain authored knowledge and semantic analysis of the utterance.

D3. Inheritance.

Concept encapsulation and compositionality are achieved through traditional object-oriented techniques (such as object reuse, inheritance, polymorphism, and the like). For example, to model "send mail to Bob" and "send instant message to Bob", we can declare MySendFrame to take a super type of MailEntity and InstantMessage. Table 82 illustrates the MySendFrame according to an embodiment of the present invention.

TABLE 82

MySendFrame.

```
Entity ItemEntity
{
}
entity MailEntity : ItemEntity
{
}
entity InstantMessage : ItemEntity
{
}
frame MySendFrame: send<DoneTo.what :=
ItemEntity>
{
    on resolve
    {
        with restriction Goal<goal :=
        RecipientEntity>
        {
        }
    }
}
```

It is then possible to define separate commands for "send mail" and "send instant message" as follows.

command SendIMCommand uses MySend<DoneTo.what :=InstantMessage>;

command SendMailCommand uses MySend<DoneTo.what :=MailEntity>;

The concept of "sending item to Recipient" is encapsulated by MySendFrame and can be reused by SendIMCommand and SendMailCommand. It is also possible to reuse MySendFrame compositionally. An example of this is provided in Table 83.

TABLE 83

MySendFrame.

```
entity MailEntity
{
    on resolve
```

TABLE 83-continued

MySendFrame.

```
    {
        with frame MySendFrame <DoneTo.what :=
        this>;
    }
}
```

In a broad sense, the above discussion captures the semantics of "mail sent to Bob."

In general, SPL provides the ability for developers to reason about the application domain and to have that reasoning affect the analysis in a deep and meaningful way. SPL allows this reasoning to be done declaratively and procedurally. Referring again to the MailEntity syntax, the syntax establishes declarative constraints that say MailEntity is an entity that is denoted by a list of words specified in Mail-Words, and it can be restricted to being in a MailFolder location. Table 84 illustrates the MailEntity.

TABLE 84

MailEntity.

```
entity MailEntity denoted by MailWords
{
    on resolve
    {
        with restriction Location<loc :=
        MailFolder>;
    }
}
entity MailFolder denoted by FolderWords
{
    on resolve
    {
        with restriction Named<name :=
        string>;
    }
}
```

Utterances such as "mail in Foo", "mail located in folder Foo", and the like succeed against MailEntity since the Named restriction clause on MailFolder accepts all strings.

In some instances, it may be desirable to write code to determine if "Foo" is really a currently valid folder in the current user's mailbox. The only way to do this is to write procedural code to check the validity of "Foo" at runtime. Table 85 illustrates the syntax for a MailFolder entity that checks the validity of a Folder name at runtime.

TABLE 85

MailFolder with Procedural Check Code.

```
entity MailFolder denoted by FolderWords
{
    on resolve
    {
        bool haveName = false;
        on success
        {
            return haveName;
        }
        with restriction Named<name := string>
        {
            haveName             =
```

TABLE 85-continued

MailFolder with Procedural Check Code.

```
        IsValidFolderName(Named.name);
        return haveName;
      }
    }
}
```

If "Foo" is not a currently valid folder, then resolution of MailFolder fails. Depending on the specific implementation details, failure may imply a general failure. Alternatively, failure of a restriction may lead to the restriction being ignored. In one embodiment, if the MailFolder resolution fails, then MailEntity also fails and so on up the resolution chain (e.g. implying general failure). In a preferred embodiment, if the resolution of MailFolder fails, then the MailFolder restriction is simply ignored. It will be understood by a worker skilled in the art that this is a simplified example. Much more complicated validity checks may be used, depending on the implementation.

Another way to achieve this effect would be to create a NamedEntity type FolderName, and use that as the slot of the Named restriction.

A nice side effect of invoking the clauses (begin, success, failure, and with restriction) is that the developer can write code to bind the semantic objects to application objects. For example, in the Named restriction clause, the developer can write code to get a reference to a folder application object if the name is valid. Table 86 illustrates the syntax for such a reference.

TABLE 86

Code to Bind Semantic Objects to Application Objects.

```
entity MailFolder denoted by FolderWords
{
    MAPIFolder folder;
    on resolve
    {
        with restriction Named<name:=string>
        {
            folder=GetFolder(name);
            if(folder==null) return false;
        }
    }
}
```

This syntax effectively binds an application specific object, MAPIFolder, to the semantic object, MailFolder.

In general, developers can easily write code to reason about their application context and state at key points in the analysis. This reasoning can affect the end resolution analysis. For example, to determine if "Bob" is a valid recipient or not, the developer can write code that goes to a database of current users of the system. If not, the developer could write code to handle the failure. For example, the developer can display a pop-up window or dialog for user clarification, generate restatement, and the like, right at the point of failure. By providing immediate feedback to the user at the point of failure, the system fosters the appearance of a smart, well-developed application.

Alternatively, the developer can write code at the top level SendMailCommand to prevent resolution against the command if the application is not in an appropriate state. This deep integration between semantic analysis and reasoning about domain knowledge is very important to understanding and disambiguating natural language.

By allowing developers to write code in clauses to reject resolutions, SPL enables the developer to make early rejections of incorrect analyses. In general, the author can assert a lot of control over the interpretations that succeed and those that fail. In some instances, it may be desirable for the author to reject some interpretations at early stages of the process. In general, the earlier the author can disambiguate (remove ambiguities), the easier it is for the application to manage ambiguity. Less ambiguity means fewer interpretations. Any application authored for natural language must have some mechanism for managing multiple interpretations. The author either writes code to evaluate the sanity of interpretations as the interpreter is deciding, or writes code that occurs after semantic analysis is done to disambiguate and pick among the set of interpretations (post processing). It is not hard to see that the former would be easier to manage and code for.

Additionally, it is believed that the earlier interpretations can be rejected, the faster and more accurately the best interpretation can be found.

In some instances, authors may wish to reject interpretations later in the process. Rejecting interpretations earlier quite often involves making call backs into the client application to examine state and/or context and to reason about the application's object model. If the call backs need to go over a network, then making frequent call backs can cause the system to operate slowly. For example, transmission delays could render the system unusable. SPL allows the author to have complete control over when and what call backs to make. Thus, the developer can decide for himself (herself) what the right balance of call backs and post-analysis disambiguation logic is, depending on the nature of the client application.

Alternatively, in some implementations, the developer may want to reason about the entire resolution before deciding whether to reject resolutions or not. There could be cases where the pieces in isolation cannot determine success or failure and global reasoning over the resolved tree is required.

SPL lets the developer choose how to balance early versus late rejection depending on their needs and the needs of the client application.

As previously discussed, the resolution of the frames, restrictions, and entities by the SPL runtime is essentially building a domain dependent model of an utterance. This statement warrants elaboration.

In natural language, a syntactic construct can be used to express a multitude of meanings. As a very simple example, consider the preposition "on" followed by a noun. For example, consider the phrase "on Foo". The phrase "on Foo" can refer to a Location (as in "book on table") or it might mean Topic (as in "book on Seattle"). To determine which phrase is correct, the phrase must be disambiguated. This disambiguation can only be done by the application. For example, Table 87 illustrates the syntax for enabling Amazon.com.

TABLE 87

Book Seller Syntax.

```
entity BookEntity denoted by "book"
{
    on resolve
    {
```

TABLE 87-continued

Book Seller Syntax.

```
        with restriction Topic<topic := string>;
        }
}
```

When resolving "book on Foo", the semantic analysis would not produce the Location object since BookEntity only understands Topic. The resolved model of what was said will not contain Location. This "directing" is even more evident in the modeling of coordination (and/or), negation, and clauses.

For coordination, the SPL code defines how entities and their modifiers are distributed over conjunction and disjunction. For the utterance, "find mail and notes created yesterday", the possible modeling choices include:
1. Find (mail created yesterday) and (notes created yesterday).
2. Find (mail) and (notes created yesterday).
3. Find (mail created yesterday) and find (notes created yesterday).
4. Find (mail) and find (notes created yesterday).

How "created yesterday" and "find" are distributed with its entities, "mail" and "notes", is determined by the authored code. The possible readings are even greater for utterances containing both conjunction and disjunction. It is not necessary for the author to understand all possibilities. Authors just think in terms of the semantics of their application. For example, as a SPL author, it is possible to code the FindMailCommand such that my FindMailCommand only understands entities of type MailEntity and my FindNotesCommand only understands entities of type NotesEntity. Furthermore, MailEntity does not have the notion of creation time (this is just for illustration purposes), but NotesEntity does. Therefore, for the above utterance, "find mail and notes created yesterday", the semantic analysis will only produce reading 4 from the above list.

For negation, the authored code determines how negation scope ambiguity is modeled. For example, take the utterance, "Don't allow mail from Joe". The phrase can be interpreted as follows:
1. Don't allow mail from Joe (block it instead): negation scoped "allow";
2. Don't allow mail from Joe (but allow messages from him): negation scoped over "mail"; or
3. Don't allow mail from Joe (but allow mail from someone else): negation scoped over "Joe".

The authored SPL program determines how the negation is scoped and modeled. The semantic analysis engines provide all the possible readings.

For clauses, the authored code determines whether the clause is modeled as a frame-based restriction (restrictions that are headed by verbs) or as one of the predefined restrictions. For example, "book that discusses Foo", the clause, "that discusses Foo", can be modeled as a Topic restriction or it can be modeled as a frame-based restriction on "book". Table 88 provides an example of the syntax for the BookEntity.

TABLE 88

BookEntity.

```
Entity BookEntity denoted by "book"
{
    on resolve
    {
        with frame discuss<DoneTo.what := string>;
    }
}
```

In general, from the perspective of the SPL, the role of the SPL program is to define a natural language semantic model of the application's domain. The role of the semantic analysis is to map utterances to that SPL Program-defined model in accordance to the analysis engines' understanding of linguistics.

From platform's point of view, the role of the semantic platform is to define a highly abstract, domain-independent object model of what is said. From this perspective, the role of the SPL code is to pick from the possibilities the platform provides.

In general, the resolution of a SPL program can be understood as building the domain-dependent semantic model of what is said. In the process of building this domain-dependent model, domain-independent objects become strongly typed and can be anchored (mapped) to the application's objects.

E2. Type System

In general, the core SPL types are commands, frames, entities, and restrictions. These are called resolvable types because they require resolution semantics to determine their existence.

```
[resolvable type]
{
    on resolve
    {
        begin
        {
        }
        success
        {
        }
        fail
        {
        }
    }
}
```

Everything within the "on resolve" clause has to do with resolution semantics. The begin, success, and fail clauses are all optional. There can be at most one of each clause in the "on resolve".

The begin clause is invoked at the beginning of resolution of the resolvable type. By default, the clause returns 'true'. The developer can return 'false' which signals to the SPL interpreter to stop resolution against this type. This means the resolution fails, and the fail clause is invoked. The begin clause is a convenient place for the developer to do initialization and to check whether the application is in an appropriate context/state to process the type.

The success clause is invoked when resolution against the type succeeds. This is where the developer can write code to cleanup resources or to package up the resolution result. The developer can still reject the resolution by returning false.

The fail clause is invoked when resolution fails to succeed. Like the begin and success clauses, the fail clause can return 'false' which will effectively make the failed resolution of the type succeed.

In one embodiment, all resolvable types, except for the command, can have any number of restriction clauses. This is discussed in more detail with respect to Slots and "with restriction/Frame clauses". In an alternative embodiment, all resolvable types, including the command type, can have any number of restriction clauses. Each of the resolvable types (Commands, Frames, Entities, and Restrictions are discussed in detail below.

Commands are Natural Language (NL) enabled tasks supported by the client application. During development of the client application, authors create commands to describe the actions they want to handle. Commands provide the semantic analysis with task entry points into the application. SPL resolution begins at the command and recurses down the tree. Commands are invoked in response to user commands. This is analogous to the way Windows events such as mouse click are invoked in response to a user clicking a mouse. Table 89 shows the syntax of the command declaration according to an embodiment of the present invention.

TABLE 89

Command Declaration.

Command CommandName uses FrameObject <optional slots>
{
}

For example, "Command SendMailCommand uses MySendFrame" defines a SendMailCommand object that uses the MySendFrame object. Commands essentially wrap frame objects. Only one frame object can be specified in a command.

The begin clause in a command is a useful place to check whether the application is in an appropriate context and/or state to process the command. This allows for very early rejection of a command based on application knowledge.

In the success clause, the developer can directly execute the command or package up whatever data is needed to execute the command. This packaged data can be in the form of a URL, an XML description of the task, a delegate to the function that can execute the command, and the like. The author can still do additional reasoning in the success clause and reject the interpretation by returning a value of "false". This is useful because it permits the author to reason globally about the whole utterance. In other words, the author can look at the completely resolved semantic tree to see if the resolution as a whole is coherent. The pieces may be coherent independently or in a limited context, but they may not make sense together.

An "Unknown" command handles utterances that do not map to an authored command. In one embodiment, SPL enforces the existence of this command.

Frames generally refer to verbs. There are two types of Frames: basic frames and composite frames. A basic frame refers to one verb. For example, the frame find refers to the verb "find". A composite frame is a grouping of multiple verbs, which generally have the same meaning. The composite frame and its multiple verbs can be thought of as a synonym lists. In general, the semantic platform provides a predefined set of basic frames, one for every verb. For consistency, the convention is the names of the basic frames are lower-case, and they have the same name as their corresponding lexical word. By contrast, a name of a composite frame begins with a capital letter. The semantic platform provides a set of composite frames that are common. For example, the platform can provide a Search composite frame that groups together "find", "search", "look" and "rummage".

Table 90 illustrates the syntax for defining a basic frame.

TABLE 90

Basic Frame.

frame FrameName denoted by "word" behaves as VerbClass
{
}

For example, the syntax for the find frame is shown in Table 91.

TABLE 91

Find Frame.

frame find denoted by "find" behaves as DefaultVerbClass
{
}

This syntax defines a basic frame, find, that is denoted by the lexical word, "find", and that behaves in the DefaultVerbClass. The term "find" is referred to as a denoter that denotes the frame, find. The semantic platform defines a set of verb class behaviors that covers all verbs. A large majority of verbs have behaviors that are part of the DefaultVerbClass.

The lexical words do not have to appear inline. In fact, in order to support multiple languages, it is recommended that the words do not appear inline. They should be defined in their own object. Table 92 illustrates the syntax for a defined denoter object.

TABLE 92

Denoter Object.

denoter FindWord
{
    English := "find";
    French := "chercher";
}

By listing the denoter terms separately in this manner, rather than inline with the frame definition, the language dependent elements are separated nicely from the language independent ones.

All basic frames that are provided by the semantic platform are defined in SPL code in this manner. Developers can also define their own verbs this way. For example, in one embodiment a developer can define a fop base class as follows:

frame fop denoted by "fop" behaves as DefaultVerbClass;

Alternatively, in a preferred embodiment, a developer can define a fop base class as follows:

frame fop denoted by "fop;

It is believed that a very large majority (around 95%) of the verbs will have their linguistic realizations as the lexical words themselves. In most cases, there will be a fairly direct translation to the other languages. For verbs that do not behave in this manner across languages, a mechanism is provided in the denoter class to specify linguistic realization of those verbs.

As mentioned above, composite frames are groupings of verbs. They are essentially synonym lists. In creating composite frames, only the denoters of the frames used in the groupings are "inherited" by the composite frame.

SPL provides developers with the ability to create their own groupings from basic and composite frames. An example is provided in Table 94

TABLE 94

Composite Frame.

frame CompositeName groups frame$_1$, ..., frame$_n$
except frame$_x$, ..., frame$_y$
{
}

Essentially, this declaration establishes a logical union of all the denoters of the frames specified in the groups clause, removes duplicates, and then removes the denoters of the frames specified in the except clause. The except clause is optional. For example, Table 95 illustrates a composite frame containing an except clause in the definition.

TABLE 95

Composite Frame with Except Clause.

frame MySearchFrame groups Search, fop except find
{
}

This defines a MySearchFrame that groups together the denoters of Search and fop except for the denoters of find frame.

Derived frames can also be created that inherit from other frames, either basic frames or composite frames. Table 96 illustrates the syntax for a Derived frame.

TABLE 96

Derived Frame.

Frame DerivedFrame : BaseFrame<slot$_1$, ... , slot$_n$>
{
}

The subject of Inheritance is discussed in greater detail in Section E3 below.

Entities are the objects that can be referred to, either by name or by a description, in the application. Entities can be concrete things, like file items and email items, but they can also represent abstract concepts, such as color, texture and so on. Entities are usually denoted by lexical words. Table 97 shows the syntax for declaring an Entity.

TABLE 97

Entity Declaration.

entity EntityName denoted by "word$_1$", ..., "word$_n$"
{
}
For example:

TABLE 97-continued

Entity Declaration.

entity MailEntity denoted by "mail", "electronic mail", "email"
{
}

Like frames, it is recommended that the denoters are not specified inline in order to support multiple languages. Table 98 provides an example of such denoters.

TABLE 98

Denoters entity MailEntity denoted by MailWords
{
}
denoter MailWords
{
    Japanese := noun("□□□□□"), noun("□□□□□");
    English := noun("mail"), noun("email"),
    noun("electronic mail");
}

The denoted by clause allows authors to specify a list of natural language words that denote the entity. The denoted by clause is the means by which the developer grounds entities to lexical words. Entities do not need to be denoted by a word or a group of words. Entities can be described by their restrictions. The developer does not need to specify the various forms of a word (such as "file" and "files"), because the forms are taken care of by the semantic platform. Additionally, the denoters do not need to be specified in the utterance in order for the entity to succeed. However, if a denoter is contained in the utterance, the denoter must match one of the denoters in the entity's list.

In some embodiments, it may be desirable that the denoter is optional at the declaration. Additionally, it may be desirable, in some implementations, to add obligatory denoters (words that must be contained in the utterance for the entity to succeed). The presence of an "obligatory" denoter can be enforced through code contained in the success clause. Table 99 shows an example of an obligatory denoter enforced through the success clause.

TABLE 99

Obligatory Denoter Enforce through Success Clause.

entity MailEntity denoted by MailWords
{
    on resolve
    {
        success
        {
            if (this.Denoter == null)
                return false;
        }
    }
}

In general, restrictions are typed semantic relationships. The platform provides a predefined base set of relationships. One of the most important things about restrictions is the normalization of variations in syntax, both within a language and across languages. Restrictions are semantic, not syntactic. Thus, the restrictions allow the developer to code against semantics of the language, not the syntax. Restrictions greatly ease the authoring burden and make enabling for other language possible.

Some restrictions come with system-defined slots that have specific meanings. The discussion of the LOM in section D above provided code samples and some discussion of slots. Some common restrictions are listed below in Table 100.

TABLE 100

List of Common Restrictions.

| Restriction Syntax | Application |
|---|---|
| Doer<who := Entity> | Applies to frames. It represents the entity doing the action. Examples: "Bob opened the file", "the file was opened by Bob". |
| DoneTo<what:= Entity> | Applies to frames. It represents the entity that the action is being done to. Examples: "open the file", "the file was opened". |
| Location<loc:=Entity> | Models the semantics of being located somewhere. Examples: "mail in Inbox", "file located on the desktop". |
| Time | Models actual time expressions, i.e. expression that can be converted into a point and/or span in time. Examples: "delete after 3 days", "mail from yesterday", "schedule for tomorrow from 1–3 pm". |
| Topic<topic := Entity>, Topic<topic := string> | Models subject matter. Examples: "book about dogs", "book regarding dogs", "book with the subject dogs". |
| Source<src := Entity> | Models object or source. Examples: "mail from Bob" |
| Order | Examples: "sort in alphabetical order", "display in reverse order by name" |
| Cardinal | Example: "3 files" |
| Ordinal | Example: "first file" |
| Means<instrument := Entity> | Examples: "search using Google", "open with Word" |
| Possessor<owner := Entity> | Examples: "my book", "Bob's book" |
| Accompaniment | Example: "meeting with Bob" |
| Degree | Examples: "almost in the box", "extremely red", "very large", "more to the left" |
| Negation | Examples: "not from Bob", "don't send mail", "except for Bob" |
| Named<name := string> | This represents the name of an entity. Examples: "Inbox folder", "file named foo.txt" |
| Modifier<mod := Denoter> | This represents adjectival modifiers. Examples: "large file", "school bus" |

There is a special restriction called a Default restriction. The Default restriction is fired by the SPL runtime when there is an unresolved or unrecognized restriction on the resolvable type.

Developers create their own restrictions by inheriting from one of the predefined set of restrictions, by creating a frame based restriction, or by specifying a pattern.

In general, restrictions can be applied to entities and to frames, as well as to other restrictions. As a general rule, SPL does not enforce whether applying a certain restriction makes semantic sense. SPL makes some exceptions either to simplify the semantic modeling or to reduce the ambiguity. The exceptions are presented in Table 101 below.

TABLE 101

SPL Exceptions.

1. Degree restriction is only allowed on restrictions.
2. Doer and DoneTo restrictions are only allowed on frames.
3. Negation is not allowed on entities.

Restrictions are applied to a type using the following syntax: with restriction RestrictionName<$slot_1$:=type, . . . , $slot_n$:=type>;

The arguments in the angle brackets are called slots. The "with restriction" statement is called the restriction clause. The label "restriction" was chosen to avoid certain problems. For example, restrictions could be labeled "properties", but properties does not always work as a descriptor. For example, one can think of "mail in Inbox" as "mail with the property of being in the Inbox folder". However, this same relationship does not exist with quantifiers, such as cardinals and ordinals. The phrase "three files" is not equivalent to "files with the property of three". Moreover, the word "property" is already used in conventional programming paradigms (e.g. "properties of a list box"). It is generally desirable not to overload the term "properties", and the same holds true for the word "attribute".

Instead, Entity is intended to convey the notion of sets. The "entity" declaration in SPL is really specifying a set of entities, and applying restrictions is restricting that set. For example, the syntax for declaring a MailEntity denoted by Mail entity MailEntity denoted by "mail"

is a declaration of an object that represents the set of all mail items. Table 102 illustrates the syntax for a restriction applied to an entity.

TABLE 102

Restriction Applied to an Entity.

Entity MailEntity denoted by "mail"
{
    on resolve
    {
        with restriction Location<loc := MailFolder>;
    }
}

Here, the set of mail items is restricted to a MailFolder location.

Applying restrictions to frames should be viewed as restricting that action (Frames typically model verbs or actions). Table 103 illustrates a Frame with a restriction.

TABLE 103

Restriction on a Frame.

frame MyOpen : open<DoneTo.what := FileEntity>
{
    on resolve
    {
        with restriction Means<instrument :=

TABLE 103-continued

Restriction on a Frame.

```
            NotepadEntity>;
        }
}
```

Here, the Means restriction is applied on MyOpen frame, thereby restricting the open file action to use Notepad.

The same applies to restrictions on restrictions. For example, the Cardinal restriction represents cardinality of an entity. The phrase "3 files" means any 3 files. However, the cardinality can be restricted by an Ordinal, as in "first 3 files". Table 104 illustrates a restriction applied on a restriction.

TABLE 104

Restriction on Restriction.

```
restriction OrdinalCardinal : Cardinal
{
    on resolve
    {
        with restriction Ordinal;
    }
}
```

Here, the restriction clause restricts the cardinal by applying an ordinal.

In general, resolvable types, except for commands, can have any number of restrictions applied to them. Each restriction type can be applied multiple times as long as the signature is unique. Table 105 shows a Frame having multiple restrictions with unique signatures.

TABLE 105

Frame with Multiple Restrictions.

```
frame MyOpen : open<DoneTo.what := FileEntity>
{
    on resolve
    {
        with   restriction   Means<instrument   :=
            NotepadEntity>;
        // valid restriction clause
        with   restriction   Means<instrument   :=
        MSWordEntity>;
        // invalid restriction clause because
        //the signature is not unique
        with   restriction   Means<instrument   :=
        NotepadEntity >;
    }
}
```

The order in which the restriction clauses fire is dependent on the semantic analysis. In general, the order is based on a combination of linguistic evidence, statistical ranking, and domain-dependent learning. Mechanisms may be added, in certain implementations, to force a deterministic order. The SPL runtime fires the restriction clauses in accordance to SPL's language semantics and the semantic analysis.

As mentioned above, slots are the arguments that appear in angle brackets (<>). Slot syntax is used to subtype the slots at point of use. The SPL has a plurality of predefined slots of restrictions. For example, the semantic system defines a Goal restriction as follows:

Goal<goal :=Entity>

The goal slot has the base Entity type, and can be referred to as a domain-independent specification. When the developer applies this domain-independent Goal to a resolvable type, the developer can subtype the goal slot at the point of application. Table 106 shows the syntax of Frame containing a subtyped goal slot.

TABLE 106

Frame with Subtyped Goal Slot.

```
frame send denoted by "send"
{
    on resolve
    {
        // models "send to ContactItem"
        with restriction Goal<goal := ContactItem>;
    }
}
```

Here, the developer has sub-typed the goal slot to a ContactItem (ContactItem must be an entity type).

In the code of the restriction clause, the restriction can be accessed as an object. Table 107 shows the syntax for accessing the restriction as an object.

TABLE 107

Accessing Restriction as Object.

```
with restriction Goal<goal := ContactItem>
{
    item = Goal.goal;
}
```

In general, the resolvable types can be conceptualized using an analogy to C++ templates. The Goal restriction, for example, can be thought of as a template Goal class with a goal data member of generic type. Then, the pseudo C++ code for the above Goal restriction clause is as follows:
bool OnGoalClause
(GoalTemplateClass<ContactItem>Goal);

The SPL compiler enforces proper sub-typing of the goal slot.

Consumers of the resolvable types may want to sub-type the type's restriction clauses. For example, consumers of the above send frame may want to subtype the goal slot of its Goal restriction clause using slot syntax as follows:
command MySendCommand uses send<Goal.goal :=MyContactItem>;

Since there can be many Goal restriction clauses applied to the send frame, the developer must be able to specify which one is being referred to.

Another kind of restriction is the AsProperty restriction. The asproperty attribute allows consumers of resolvable types to subtype slots of restriction clauses using the slot syntax. This attribute is specified at the restriction clause as shown in Table 108.

TABLE 108

AsProperty Attribute.

```
frame send denoted by "send"
{
    on resolve
    {
```

TABLE 108-continued

AsProperty Attribute.

```
        with asproperty restriction Goal<goal
            := ContactItem>;
        }
    }
}
```

Here, the developer of the send frame declares that the Goal restriction clause of the send frame can be sub-typed by consumers using slot syntax as follows:

command MySendCommand uses send<Goal.goal :=MyContactItem>;

This declaration says, MySendCommand uses the send frame and sub-types the Goal restriction clause of the send frame to be MyContactItem.

Generally, the asproperty attribute also allows code in the send frame to access this Goal object using property syntax. All resolvable types have a RestrictionCollection property which allows code to get at its currently resolved collection of restrictions. With the asproperty attribute, the marked restriction can be accessed using property syntax as shown in Table 109. For example:

TABLE 109

Accessing Marked Restriction Using Property Syntax.

```
frame send denoted by "send"
{
    ContactItem item;
    on resolve
    {
        with asproperty restriction Goal<goal
            := ContactItem>;
        success
        {
        // normal syntax
            if
            (this.RestrictionCollection("Goal
            ").count > 0)
            {
                item =
                this.RestrictionCollection("
                Goal")[0].goal;
            }
        // property syntax
            if (this.Goal.goal != null)
            {
                item = this.Goal.goal;
            }
        }
    }
}
```

Additionally, only one restriction of each type can be marked with the asproperty attribute, regardless of the type of the restriction slot as shown in Table 110 below.

TABLE 110

AsProperty Restriction Limitations.

```
frame send denoted by "send"
{
    on resolve
    {
        with asproperty restriction Goal<goal
            := ContactItem>;
        // illegal
        with asproperty restriction Goal<goal
```

TABLE 110-continued

AsProperty Restriction Limitations.

```
            := UserItem>;
        }
    }
```

However, the syntax can be changed by the developer to allow more than one restriction of a type to be marked with the asproperty attribute as follows:

restriction Goal2: Goal<goal:=UserItem>;

This eliminates the problem and allows the frame to resolve as shown in Table 112 below.

TABLE 112

Restriction Syntax.

```
frame send denoted by "send"
{
    on resolve
    {
        with asproperty restriction Goal<goal
            := ContactItem>;
        // the slot usage here is not
        // necessary, but is good for
        //documentation purposes.
        with asproperty restriction Goal2<goal
            := UserItem>;
        //The clause could have been written
        // as: "with asproperty restriction
        //Goal2;"
    }
}
```

It is important to understand, with respect to the ordering of the slots in restriction clauses, that some restrictions are defined with system slots. For example, the Goal restriction is defined with a goal slot. When sub-typing the Goal restriction at the point of use (i.e. at the restriction clause), the system slots must be specified first as shown in Table 113.

TABLE 113

Ordering of Slots.

```
restriction Goal2 : Goal<goal := Item>
{
    on resolve
    {
        with      asproperty      restriction
            Modifier<mod := Denoter>;
    }
}
frame send denoted by "send"
{
    on resolve
    {
        // illegal
        with asproperty restriction Goal2<
            Modifier.mod := MyDenoters,
            goal := ContactItem >;
        // legal
        with asproperty restriction Goal2<
            goal := ContactItem,
            Modifier.mod := MyDenoters >;
    }
}
```

Entities that have restriction clauses marked with asproperty can have those restriction clauses sub-typed at the point of use. Suppose, for example, ContactItem had a Location restriction clause marked with asproperty, as shown in Table 114.

TABLE 114

Location Restriction Marked AsProperty.

```
frame send denoted by "send"
{
    on resolve
    {
        with asproperty restriction Goal<
        goal := ContactItem<Location.loc :=
        DerEntity>>;
    }
}
```

Restriction clauses can also be marked obligatory, meaning that the clause must be executed and succeed or else the resolution of the type fails. In order for the clause to succeed, the following criteria must be satisfied:

1. The restriction must be in the utterance;
2. The declarative constraints of the clause (the types of the slots) must be met; and
3. The procedural constraints in the clause (the code) must evaluate to true.

An example is provided in Table 115 below.

TABLE 115

Obligatory Restriction.

```
frame send denoted by "send"
{
    on resolve
    {
        with obligatory restriction Goal<goal :=
        ContactItem>;
    }
}
```

The syntax of the frame in Table 115 declares that, in order for the send frame to resolve successfully, there must be a ContactItem as the goal of "send" in the utterance. So, "send mail" will not resolve but "send to Bob" will, if "Bob" is a resolved ContactItem.

E3. SPL Inheritance

Inheritance is allowed on entities, frames, and restrictions. Currently, commands do not support inheritance. Generally, there does not appear to be a need to support inheritance in commands (at this time). Commands are task entry points that do not require inheritance.

All the "inheritable" code is in the frame that the command uses. As previously discussed, except for the resolution semantics in the on resolve clause, the resolvable types are just normal objects. Outside of the on resolve clause, SPL adopts C# inheritance semantics, which are well-known in the art. For the purpose of this discussion, the disclosure focuses on the inheritance semantics within the on resolve clause which does not follow traditional (C#) inheritance semantics. However, it may be desirable, in certain implementations, to vary from conventional C# inheritance semantics for enabling specific functionality in real applications using inheritance. For the purpose of simplicity, the discussion does not delve into all such possibilities, choosing to err on the prescriptive side in an attempt to keep the discussion simple.

First, it is important to understand scoping within functions, restriction clauses, and variables in the on resolve clause. Table 116 shows syntax for a Mail Entity in order to facilitate the discussion of scope.

TABLE 116

Mail Entity.

```
entity Mail
{
    int x;
    on resolve
    {
        int y;
        with restriction Goal<goal := Entity>;
        void foo( );
    }
    void bar( );
}
```

Variables defined in the on resolve scope are accessible to restriction clauses in the on resolve scope but not accessible outside of the on resolve clause. In the above example, integer y is accessible in the Goal restriction clause and in the function foo( ), but is not accessible in the function bar( ).

Functions declared in the on resolve clause are private to the clause, meaning that such functions are not accessible outside of the on resolve clause. Thus, foo( ) would not be accessible in bar( ). Restriction clauses are also private to the on resolve clause, and therefore not accessible outside of it.

Variables declared in the type's scope are accessible to clauses and functions in the on resolve clause through use of the outer keyword. For example, integer x is accessible in the Goal restriction and in function foo( ) as outer.x. Functions declared in the type's scope are accessible to the on resolve clause. Thus, the function bar( ) is accessible in the Goal restriction and in the function foo( ) as outer.bar( ).

The on resolve clause can be conceptualized as an extended constructor, such that everything pertaining to the constructor is private to the constructor. This implies that a derived class cannot call any of the restriction clauses in the base class.

Entities are allowed to inherit from one other entity. No multiple inheritance of entities is allowed. Denoters of the base entity are merged into the denoters of the derived entity. There is no hierarchy in the merged denoter lists (the denoters are flattened) as shown in Table 117.

TABLE 117

Merged Denoter Lists.

```
entity MailEntity denoted by "mail", "email"
{
}
entity MyMailEntity denoted by "electronic mail"
: MailEntity
{
}
```

The denoter list of MyMailEntity will consist of "mail", "email", and "electronic mail".

At the definition, the derived entity can also sub-type the base entity's restriction clauses that are marked with asproperty. For example, if MailEntity had a Location restriction clause marked with asproperty, then the MyMailEntity definition can be as follows:

```
entity MyMailEntity denoted by "electronic mail":
    MailEntity<Location.loc := MyEntity>
{
}
```

This code block says that MyMailEntity inherits the Location understanding of MailEntity but adds more specificity to the actual location.

Like entities, frames can only inherit from one other frame. No multiple inheritance is allowed. In the definition, the derived frame cannot specify any groupings of frames. Composite frame and frame inheritance are separated. It may be possible to handle inheritance for Frames in the same was as for Entities. In composite frames, for example, the denoter lists are grouped together. In some instances, it may be desirable to enforce the requirement that all the frames belong to the same behavioral class when the frames are grouped. If the frames in the groupings do not need to belong in the same LSS class, then frames and entities could be handled the same way.

Like frames and entities, derived restrictions can only inherit from one other restriction. Sub-typing of restriction clauses of the base restriction can also happen at the definition of the derived restriction.

Restriction clauses of a particular restriction type are tried in the derived-type before going to the base-type. This also applies to Default restriction as shown in Table 118 below.

TABLE 118

Default Restriction.

```
entity MailEntity denoted by "mail", "email"
{
    with restriction Location<loc := Entity>
    {
    }
    with restriction Default
    {
    }
}
entity MyMailEntity denoted by "electronic mail"
: MailEntity
{
    with restriction Location<loc := MailFolder>
    {
    }
    with restriction Default
    {
    }
}
```

When resolving a Location restriction on MyMailEntity, the order of firing restriction clauses is as follows:
1. MyMailEntity.Location
2. MailEntity.Location
3. MyMailEntity.Default
4. MailEntity.Default There is currently no notion of public/private restriction clauses and no notion of overriding restriction clauses. In part, this is because overriding restriction clauses makes little sense given that the restriction clauses are used for resolving the class and that the clauses are private to the on resolve clause. However, it may be desirable to allow restriction clauses to be overridden in certain implementations.

Depending on the implementation, it may be necessary to allow the derived class (during resolution) to access members (methods and variables) in the base class. Since the base class is not yet resolved, this may be problematic. If the derived class is not allowed to access members of the base class until the base class is resolved, the derived class must be prevented from being polymorphically set to the base during resolution (through assignment, passing to functions, and the like). In either case, derived classes may be allowed to directly invoke restriction clauses on the base before the base is resolved.

Inheritance can be utilized to add more understanding to existing entities. Referring again to the above MailEntity code of Table 118, it is important to note that the MailEntity only understands Location restriction. It is possible to create an entity that leverages the authored Location logic in MyMailEntity and adds the Topic understanding. Additionally, restriction clauses of the same type as the base may be added as shown in Table 119 below.

TABLE 119

MyMailEntity.

```
entity MyMailEntity denoted by "electronic mail"
: MailEntity
{
    with restriction Location<loc := MailFolder>;
}
entity MailEntityWithTopic : MailEntity
{
    with restriction Topic<topic := string>
    {
        // deal with topic
    }
    // Handle locations in MyMailFolder. All
    other locations
    // will go to base
    with restriction Location<loc := MyMailFolder>
    {
    }
}
```

When a restriction clause is invoked and is rejected by the authored code in the clause, the interpreter then invokes a restriction clause, in the current type or in any of its polymorphic-ally equivalent super types. To be considered polymorphic-ally equivalent, the restriction types and the types of its slots must both be polymorphic as shown in Table 120 below.

TABLE 120

Polymorphism.

```
entity SlotEntity2 : SlotEntity1;
entity MyEntity
{
    with restriction Location<loc := SlotEntity2>
    {
    /* Since this fails, the interpreter will
    *automatically invoke the subsequent
    *Location clause, without resolving the
    *slot again, since they are polymorphic-
    *ally equivalent.*/
    return false;
    }
    with restriction Location<loc := SlotEntity1>
    {
    /* This code can be invoked with
```

TABLE 120-continued

Polymorphism.

```
    SlotEntity2 acting polymorphically as
    SlotEntity1. If this clause fails, the
    interpreter will not automatically invoke
    the Topic restriction below since Topic is
    not equivalent to Location even though the
    slots are equivalent.*/
    }
    with    restriction    Topic<topic    :=
    SlotEntity1>
    {
    }
}
```

Although they are not exactly equivalent, it is possible to use inheritance instead of sub-typing at the slots as shown in Table 121.

TABLE 121

Inheritance.

```
entity MailEntity denoted by "mail"
{
        with asproperty restriction Location<loc :=
        MailFolder>
        {
        }
}
entity MailEntity2 : MailEntity<Location.loc :=
MyMailFolder>
{
}
entity MailEntity3 : MailEntity
{
    with restriction Location<loc:= MyMailFolder>
        {
        }
}
```

When resolving "mail in Inbox" against MailEntity3, the MailEntity3.Location clause will take precedence over MailEntity.Location clause. In this case, there are two Location restriction clauses for MailEntity3. However, there is only one Location clause for MailEntity2. The sub-typing at the slots can be interpreted as saying that Location for MailEntity2 should be evaluated by MailEntity's Location restriction clause but with MyMailFolder type.

It is important to note that caution should be used when declaring restriction clauses with the obligatory attribute. Obligatory clauses must fire and succeed in order for the type to resolve successfully. If a base type declares a clause as obligatory, then the derived class must ensure that it does not handle determinations that should go to the base. Derived types cannot invoke restriction clauses of their base type. Instead, derived types depend on normal resolution semantics to invoke the obligatory restriction clauses in the base.

E4. Resolution Semantics.

The resolution semantics of SPL are implemented by the SPL runtime. The runtime builds the domain-dependent model of the utterance, in accordance with SPL's language semantics. The runtime resolves the natural language command against the authored SPL types, abiding by the rules of linguistics and the SPL language.

Figure 5:
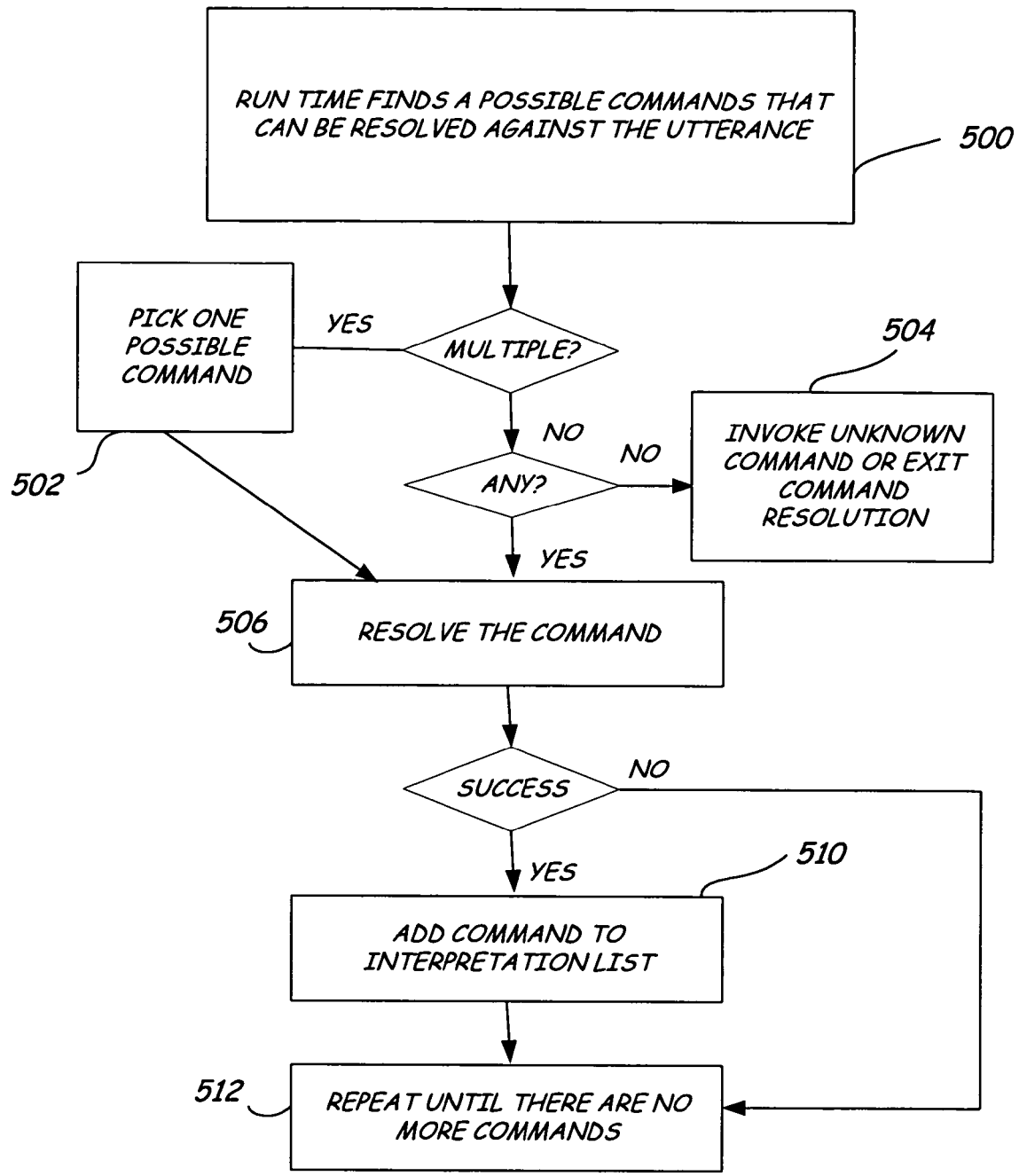
FIG. 5 is a simplified flow diagram of a type resolution according to an embodiment of the present invention.

In one embodiment, resolution of the types is performed using a top down approach. FIG. 5 illustrates a simplified flow diagram of a top down approach to a type resolution according to an embodiment of the present invention. First, the runtime finds a possible command that can be resolved against the utterance (step 500). If there are multiple possible commands, one command is chosen for resolution (step 502). If no command is found, the Unknown command is invoked (step 504). If one or more commands are found, the run time attempts to resolve the found command (step 506). If the command resolution fails, the runtime advances to the next command in the list and repeats steps 502–510 until there are no more possible commands. If the command resolution succeeds, the command is added to an interpretation list (step 510). Finally, the runtime repeats steps (step 502 through 510) until there are no more possible commands contained in the utterance or until a specified number of requested interpretations is reached (step 512).

It should be understood by a worker skilled in the art that numerous variations in the resolution process are possible. For example, in certain instances, failure of a resolution may constitute a general failure, which causes the program to exit the resolution. In other instances, failure may result in an invocation of a failure clause of the type, which may or may not result in failure of the resolution. Additionally, within the failure clause, the success clause and the begin clause, program developers are free to insert application specific code, which allows the framework to be adapted in countless ways. For example, a developer might insert code in a failure clause to return a "success" flag, such that failure of the resolution does not result in a failure. The failed resolution might be ignored or other program code might cause the process to call back to the client application to disambiguate a particular resolution and so on. It should be understood that the figures are intended to provide an example, but are not intended to exhaust the possible implementations.

Figure 6:
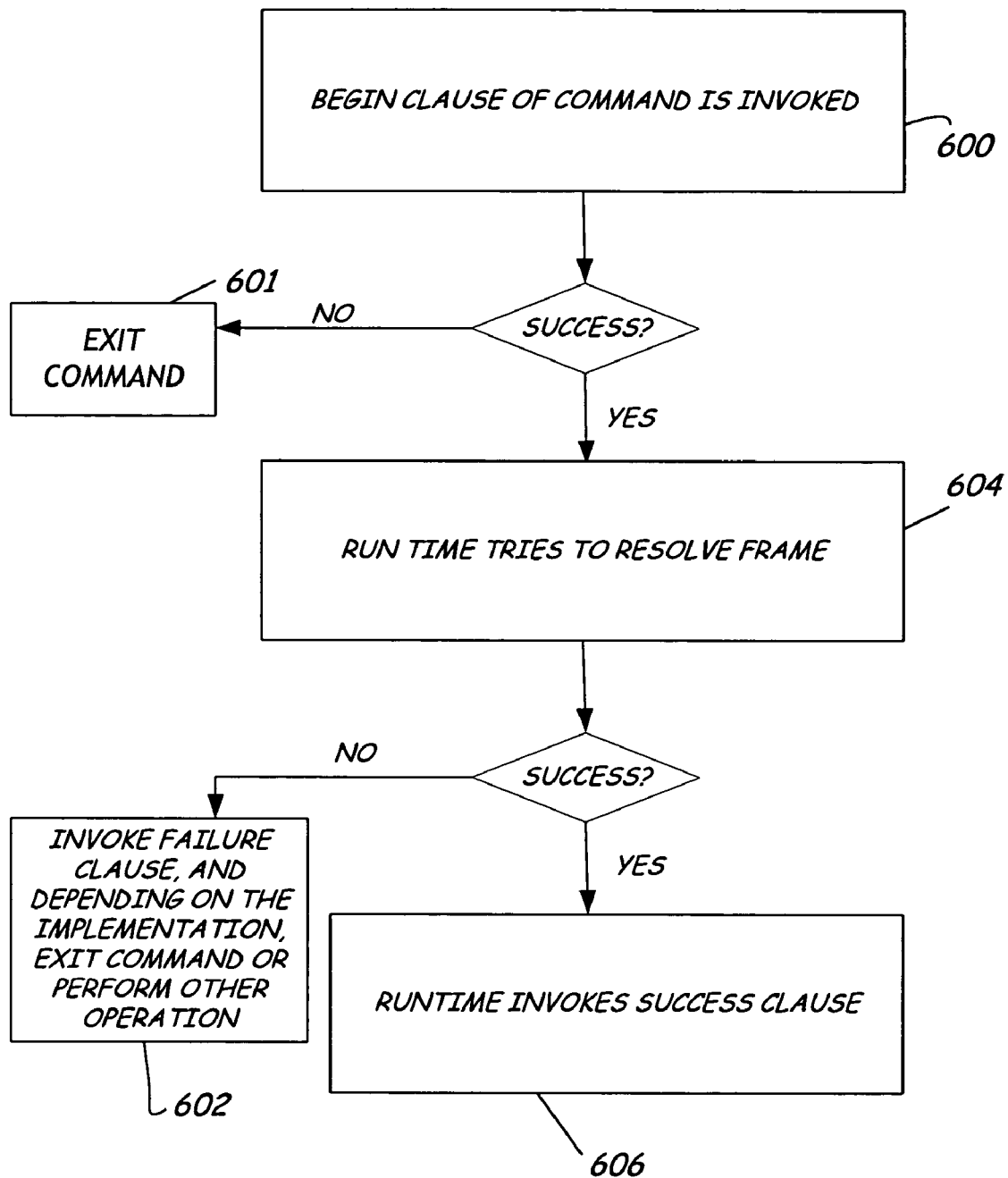
FIG. 6 is a simplified flow diagram of a command resolution according to an embodiment of the present invention.

As shown in FIG. 6, one possible embodiment of command resolution proceeds as follows. The begin clause of the command is invoked (step 600). If the begin clause fails, the runtime exits the command (step 601). If the begin clause succeeds, the runtime attempts to resolve the frame (step 604). If frame resolution fails, the frame failure clause is invoked, and depending on the implementation, the runtime may exit the command or perform another operation (step 602). Otherwise, the runtime invokes the success clause (step 606).

As previously discussed, the semantic programming language of the present invention allows the program developer to exert control over the operation of the various elements. Thus, the resolution semantics of the present invention can be modified in countless ways to implement operations that are desirable for a particular application. Thus, when a resolution fails, in some instances it may be desirable to ignore the failure and proceed. In other instances, it may be desirable to take steps to disambiguate the resolution so that the resolution can succeed (such as by calling back to the client application). In still other instances, it may be desirable to simply exit the resolution if resolution fails.

Figure 7:
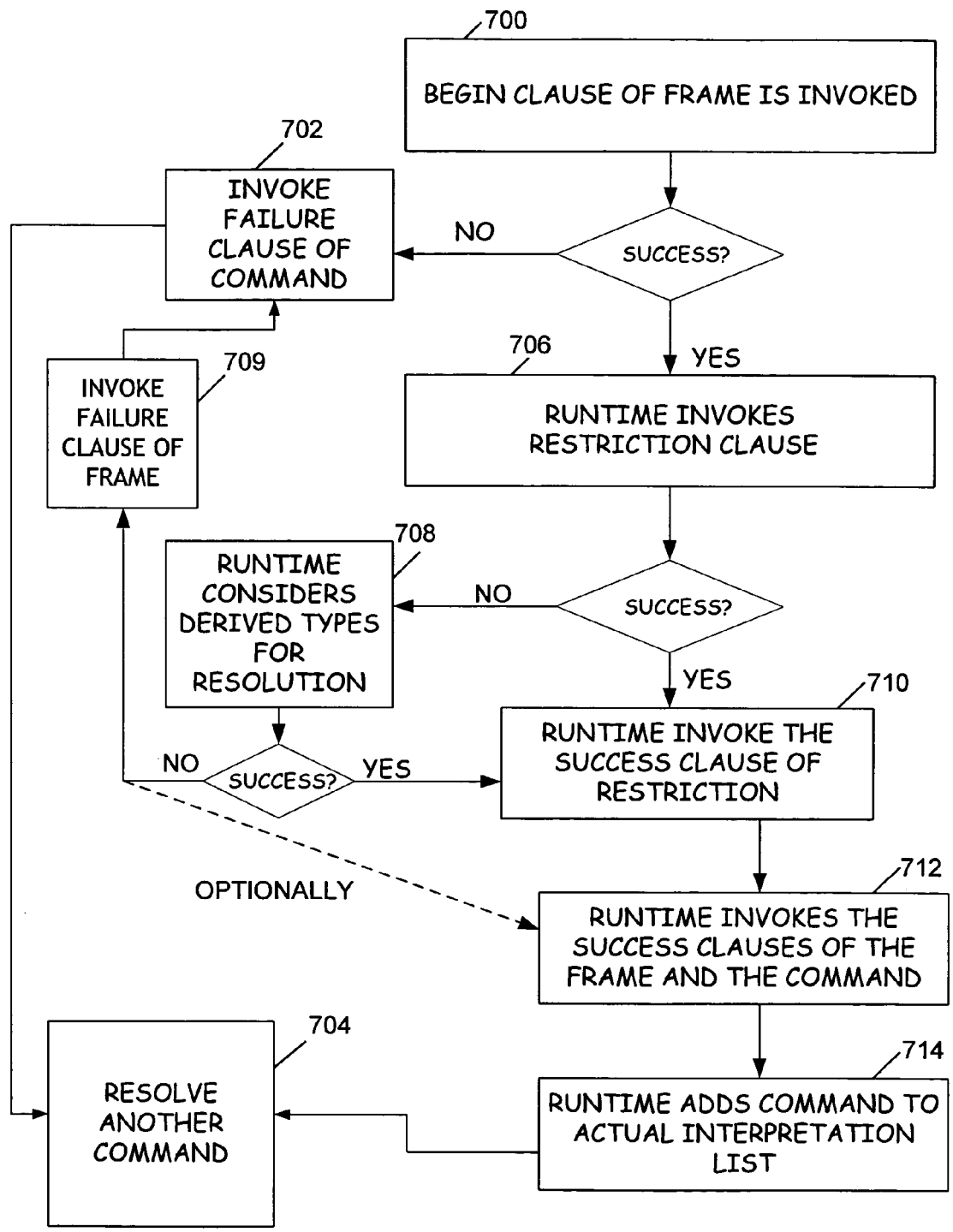
FIG. 7 is a simplified flow diagram of frame resolution according to an embodiment of the present invention.

As shown in FIG. 7, in one embodiment, frame resolution proceeds as follows. The begin clause of the frame is invoked (block 700). If the frame resolution fails, the failure clause is invoked (block 702), and the runtime optionally resolves another command (block 704).

If the frame resolution succeeds, the runtime attempts invoke the Restriction clause (block 706) (corresponding to blocks 408 and sequence in FIG. 4). If the Restriction clause fails resolution, the runtime considers any derived types for resolution (block 708). For example, given an entity type Item with derived types Mail and Notes, a clause on another type SendItem that takes an Item could be resolved by an instance of Mail or Notes.

If the runtime fails to invoke successfully a derived type, depending on the implementation, a failure clause of the frame may be invoked (block 709) and then the failure clause of the command may be invoked (block 702).

Alternatively, the Restriction clause may simply be ignored. If the Restriction clause is ignored, the runtime invokes the success clauses of the frame and command (block 712). The runtime then adds the command object to the "actual interpretations" list (block 714), and attempts to resolve another command (block 704).

If the runtime successfully invokes the Restriction clause (block 706) or succeeds in finding a Derived type for resolution (block 708), the runtime invokes the success clause of the Restriction (block 710). The runtime then invokes the success clauses of the frame and of the command (block 712) and adds the command object to the "actual interpretations" list (block 714). The runtime then attempts to resolve another command (block 704) until resolution on all possible commands has been attempted.

As previously mentioned, the process flow is intended for illustrative purposes only, and is in no way exhaustive of the many possible implementations. In practice, the resolution process is at least partially, if not largely, determined by the specific implementation. Thus, as indicated, the failure of the restriction resolution may cause a general resolution failure (as indicated by blocks 709 and 702), or restriction resolution may simply be ignored and the command resolution proceeds. In another embodiment, a failed restriction (if the Restriction is obligatory, for example) might cause the runtime to call back to the client application or send flow control information to the analysis engines to try to disambiguate the command. Such decisions are largely implementation specific, and therefore, programming constructs of the semantic programming language can be used to facilitate natural language programming to optimize natural language processing to fit the specific implementation.

Figure 8:
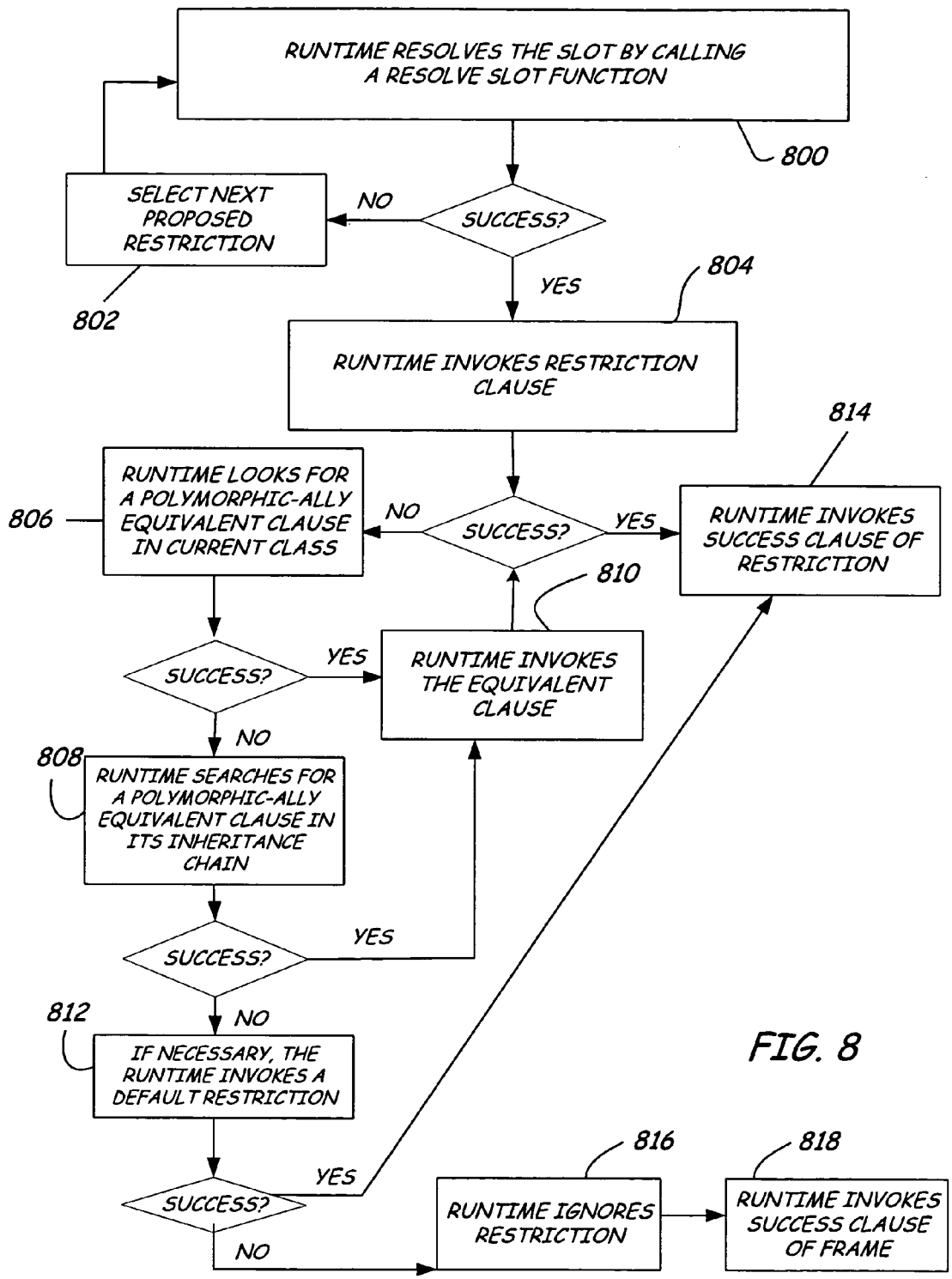
FIG. 8 is a simplified flow diagram of restriction clause resolution according to an embodiment of the present invention.

As shown in FIG. 8, one possible embodiment of restriction clause resolution proceeds as follows. For each proposed restriction, if there are any restriction slots for the restriction, the runtime resolves each slot by calling a ResolveSlot function (block 800). If the ResolveSlot function fails, the runtime selects the next proposed restriction (block 802), and attempts to resolve the slot by calling the ResolveSlot function (block 800) again. If the ResolveSlot function succeeds (either the first time or on one of the next proposed restrictions), the runtime invokes the restriction clause (block 804).

If the restriction clause fails, the runtime looks for a polymorphic-ally equivalent clause in the current class (block 806). If a polymorphic-ally equivalent clause is not found in the current class, the runtime searches for one within its inheritance chain (block 808). If a polymorphically equivalent clause is found, the runtime invokes the equivalent clause (block 810). The runtime repeats (block 808) until no more equivalent clauses are found or until an equivalent clause succeeds.

If necessary, the runtime invokes the Default restriction (block 812). If all restriction clauses resolve successfully, the runtime invokes the success clause (block 814). Otherwise, the runtime ignores the Restriction (block 816) and invokes the success clause of the frame (block 818).

In an alternative embodiment, if the default restriction clause fails, the restriction is simply ignored. Resolution still succeeds, unless this is a Named or Negation restriction as discussed above.

It is important to note that a restriction clause can fire multiple times on the same resolvable type. For example, the command "show files in c: in temp folder" has two Location restrictions on "file" entity ("in c:" and "in temp folder"). Currently, the only enforced order of resolution of the restriction clauses are that the Doer and DoneTo restrictions on frames are resolved first (in that order), and the Default restriction is resolved last. However, it may be desirable to enforce ordering on other types, such as Negation and Named.

Figure 9:
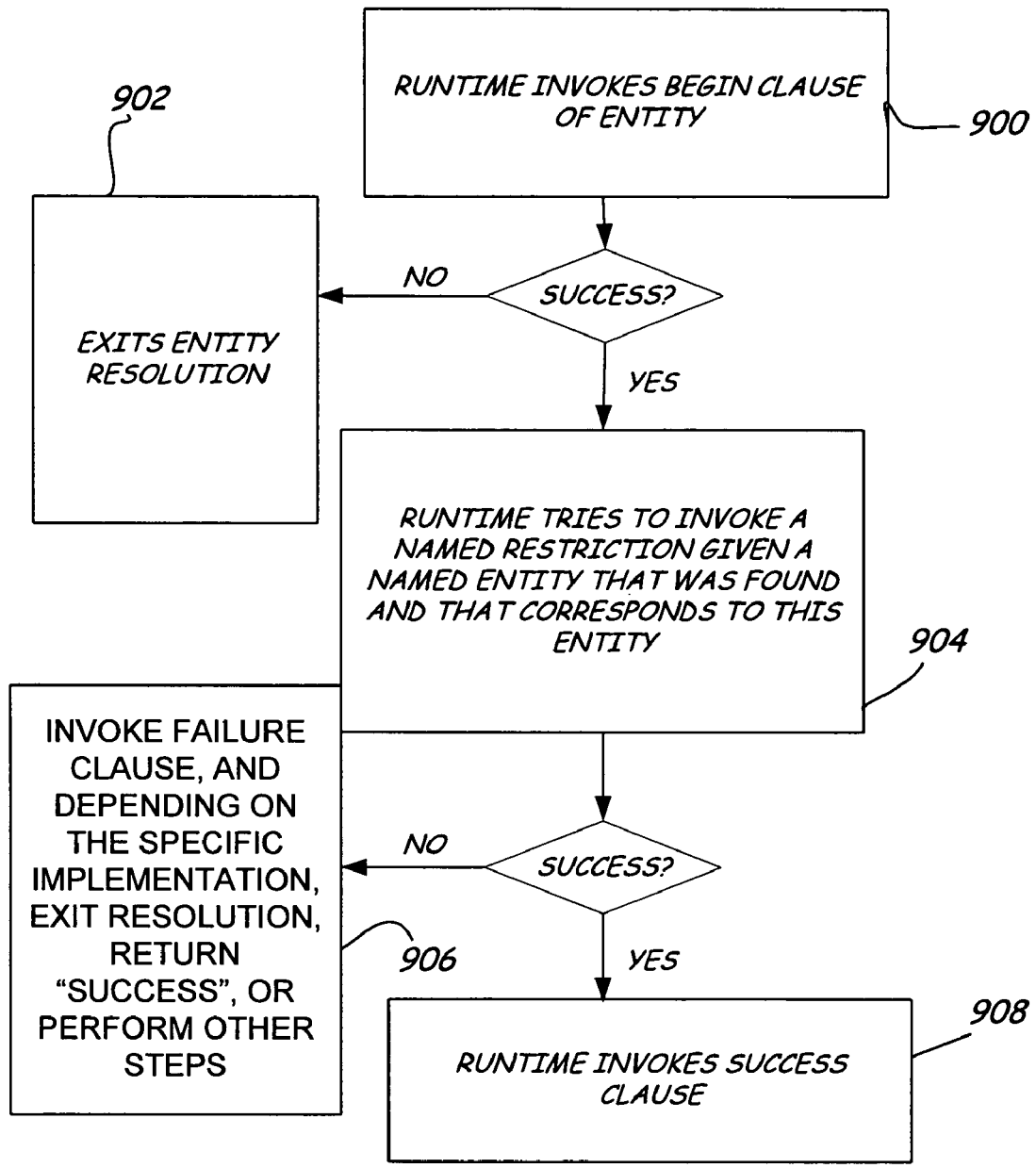
FIG. 9 is a simplified flow diagram of an entity resolution process according to an embodiment of the present invention.

As shown in FIG. 9, in one embodiment, NamedEntity resolution proceeds as follows. The runtime invokes the begin clause of an Entity (block 900). If this fails, the runtime exits the Entity resolution (block 902). If the begin resolution clause of the Entity succeeds, the Runtime tries to invoke a named Restriction given a NamedEntity that was found and that corresponds to the Entity (block 904). It is important to note that block 904 encompasses multiple resolution steps, but which are omitted here for simplicity.

If the invocation of the named restriction fails, the failure clause of the Entity is invoked and the runtime exits (block 906). If the invocation succeeds, the runtime invokes the success clause of the Entity (block 908).

It should be appreciated that the programming language of the present invention can be utilized to alter the resolution steps in countless ways. For example, a success resolution clause may be modified to return a "false" or "failure" under certain circumstances. Similarly, a failure resolution clause can be programmed to return a "true" or "success", depending on the specific implementation. Thus, the examples presented herein are not intended to be limiting, but rather are offered to illustrate one possible implementation of resolution semantics. Numerous variations are anticipated, and it is expected that programmers will adapt the resolution to meet the needs of the specific natural language application.

The Default restriction is used to resolve restrictions not handled by the authored code and/or restrictions not understood by the runtime. The Default restriction is invoked once per resolvable type, and is always invoked last. There can only be at most one Default restriction per resolvable type.

The object model under Default may vary according to implementation. In one embodiment, the Default object model provides a lattice of tokens (elements, items or spans) of text with their proposed restrictions. The tokens do not need to be contiguous within the lattice. For example, suppose we have the following tokens in an utterance: $token_1$, $token_2$, and $token_3$. Under Default, the runtime can produce the lattice shown in Table 122.

TABLE 122

| Lattice Produced Under Default. |
|---|
| Span[0] |
|     Tokens = {$token_1$ $token_2$} |
|     Hypothesis[0] |
|         RestrictionType = $restriction_i$ |
|         SucceededResolution = boolean |
| ... |
|     Hypothesis[n] |
|         RestrictionType = $restriction_j$ |
|         SucceededResolution = boolean |
| ... |

TABLE 122-continued

Lattice Produced Under Default.

```
Span[n]
    Tokens = {token₁ token₃}
    Hypothesis[0]
        RestrictionType = restrictionᵢ
        SucceededResolution = boolean
    ...
    Hypothesis[n]
        RestrictionType = restrictionⱼ
        SucceededResolution = boolean
```

The raw text is always available. The SPL can provide authors with information about whether a token in the text participated in a successful resolution or not.

Figure 10:
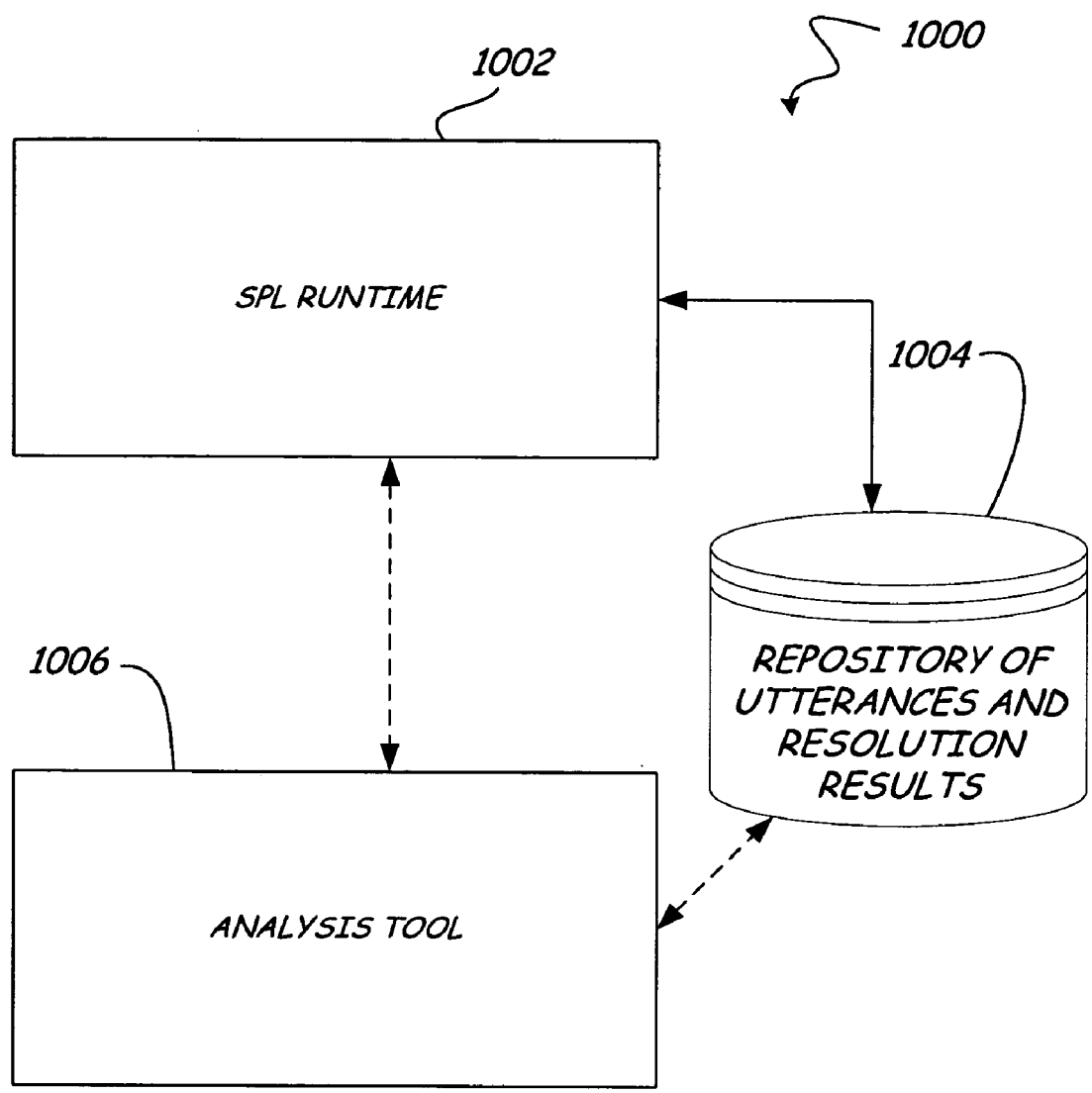
FIG. 10 is a simplified block diagram of an intelligent system according to an embodiment of the present invention.

Statistical semantic modeling and learning can play a role in SPL. The order in which restriction clauses are invoked can be dependent on some statistics based on linguistic evidence, statistical ranking (e.g. SGM), and automatic learning. As shown in FIG. 10, the system 1000 includes a runtime 1002 and a database 1004. In general, the runtime 1002 can manage the database 1004, which is a repository of utterances and resolution results. The data in this repository can be mined and analyzed (off-line) by an analysis tool 1006 (for example) after a certain threshold of resolutions has been reached. The information in the database 1004 can be analyzed by the analysis tools 1006, and the results can then be fed back to the runtime 1002 to improve its selection and order of commands to resolve and its order of invoking the restriction clauses. As a result, resolutions can be made to perform better and faster, without changes to authored code, as more utterances are resolved. In a broad sense, the system 1000 is an intelligent system that is capable of improving its performance without requiring recoding.

In one embodiment, advanced authors can manage and program against the repository. In another embodiment, advanced authors can return a probability representing a confidence level from clauses instead of just a true/false value. While this may complicate the programming model, the ability to derive a confidence level instead of a boolean value allows the author to participate statistically in the semantic analysis.

Generally, ambiguity is surfaced to the author and dealt with by the author in the SPL client application. Ambiguity not dealt with by the code results in multiple interpretations. The runtime ranks the interpretations and returns to the application up to a maximum number of interpretations specified by the application. In one embodiment, the list of interpretations is returned synchronously (as part of the API call). In another embodiment, the interpretations are returned asynchronously using events.

The runtime prunes semantically equivalent interpretations from the list. Additionally, the runtime provides a default implementation for determining semantic equivalence of two interpretations. The default implementation can be overridden by the author.

In one embodiment, semantic equivalence is determined by comparing the strings generated by restating the semantic interpretation. However, other techniques may also be utilized to determine equivalence.

In general, developers do not have to write code to deal with all the possible restrictions that may occur in an utterance. Authors just code for the restrictions they want to understand and to handle. Un-authored/unhandled restrictions are dropped. In other words, un-authored/unhandled restrictions are ignored as if they did not occur in the utterance. The only exceptions are the Negation and Named restrictions, which must be handled.

The semantics are implemented using inheritance. The resolvable types all inherit from a base class. Thus, there is a base Entity, a base Frame, and a base Restriction class. The base resolvable type has one restriction clause, Default, as shown in Table 123.

TABLE 123

Base Resolvable Type

```
[resolvable type]
{
    with restriction Default
    {
        // if the unhandled/unresolved restriction
        is a Negation
        // or Named, then fail the resolution.
        // Otherwise, the restriction clause
        succeeds.
        //
            if
            (Default.TopHypothesis.RestrictionType
            == Negation ||
            Default.TopHypothesis.RestrictionType
            == Named)
            {
            return false;
            }
            else
            {
            return true;
            }
    }
}
```

The Default restriction in the base resolvable types succeeds for all restrictions except for Negation and Named. Table 124 shows syntax for a Mail Entity.

TABLE 124

```
entity MailEntity denoted by "mail"
{
    on resolve
    {
        with restriction Location<loc :=
        MailFolder>;
    }
}
```

For an utterance such as "mail received yesterday", the SPL runtime tries to resolve "received yesterday" against the authored restriction clauses of MailEntity. Since "received yesterday" will not map to the Location restriction and since there is no Default restriction clause in MailEntity, the SPL runtime tries to resolve "received yesterday" against the base of MailEntity, which is Entity. The Default restriction clause in Entity returns true; and therefore, MailEntity resolution succeeds. The resolution succeeds as if only "mail" was recognized in the utterance, "mail received yesterday".

If this is not the desired behavior, then the developer can easily write code to reject unrecognized/unhandled restrictions as shown in Table 125.

TABLE 125

MailEntity with Code to Handle Unrecognized Restrictions.

```
Entity MailEntity denoted by "mail"
{
    on resolve
    {
        with restriction Location<loc :=
        MailFolder>;
        // reject everything not recognized
        with restriction Default
        {
            return false;
        }
    }
}
```

Here, the Default restriction clause in MailEntity is tested before the base Entity is invoked. Therefore, "mail received yesterday" will not resolve successfully against MailEntity.

In general, everything outside the scope of on resolve is handled according to conventional C# rules. Code within resolution clauses is also C# code. Thus, it is possible to view the resolvable types as specialized C# classes with special code for determining their constructions.

E5. Programming The LOM

Programming the LOM involves using the restrictions provided by LOM to achieve intended outcomes. This can best be understood by exploring some examples. Thus, the following discussion presents a number of examples, explores in detail the more complicated semantic modeling restrictions and clauses (such as coordination, comparisons, negation, and the like), and discusses some "best" practices. Details about what kinds of utterances generate which restrictions and the information the restrictions contain was previously discussed above in section D.

Not all restriction types of the LOM are exposed to SPL. SPL focuses on the restriction types to command and control scenarios. LOM, by contrast, has much broader applicability. As new releases are made available, it will be easier to expose a previously uncovered semantic relationship as a new restriction type than to try to narrow or modify an exposed restriction type in subsequent releases for reasons of backward compatibility. In the discussion below, we concentrate mostly on how to use the restrictions for modeling in SPL code. In general, the restrictions surface to the developer as class libraries, similar to the Framework Class Library (FCL) for Net runtime by Microsoft®.

The Accompaniment restriction models an entity accompanying the host. Accompaniment is allowed on Entities and Frames. Some examples include meeting with my manager, chat with Bob, email with attachments, and merge File A with File B. The Accompaniment restriction contains one system slot, accomp, of type Entity representing the entity that accompanies the host. The author can constrain the type of entities that can accompany the host as shown in Table 126.

TABLE 126

"email with attachments"

```
entity MailEntity denoted by "email"
{
    on resolve
    {
        with restriction Accompaniment<
        accomp := AttachmentEntity>;
```

TABLE 126-continued

"email with attachments"

```
    }
}
```

The AsBeing restriction picks out some property of the DoneTo.what entity that the verb operates on. The AsBeing restriction is allowed on Frames. Some examples include "show status as busy", "save as text file", and "make the font large". The AsBeing restriction has one system slot, restr, which represents the restriction that is being picked out. Instead of allowing any restriction type to fill the slot, the type of the restriction is restricted to particular restriction types. The restriction is limited to particular types by providing overloaded AsBeing restrictions that take the various supported types in its system slot. The following restrictions are supported (for example):
AsBeing<restr :=Modifier>: "mark message as low priority"
AsBeing<restr :=Possessor>: "make this file mine"
AsBeing<restr: =Ordinal>: "put this message first"

In some embodiments, phrases such as "log in as my manager" may resolve successfully. However, this would require that Entities be permitted as a slot type.

The AsBeing restriction defines a 3-place relationship between the verb, its DoneTo.what entity, and the restrictions on this entity. Although SPL does not enforce strong binding of this relationship, a best practice would be to enforce the relationship as shown in Table 127.

TABLE 127

"show my status as busy".

```
denoter BusyWords
{
    English := "busy";
}
entity StatusEntity
{
    on resolve
    {
        // models "busy status", "status is busy"
            with restriction Modifier<BusyWords>;
    }
}
/* The following AsBeing restrictions model
"show status as busy" with varying levels of
strength of binding.*/
frame      ShowStatusFrame<DoneTo.what       :=
StatusEntity>
{
    on resolve
    {
    /* Here, we're not making a strong binding
    to the DoneTo.what nor to its modifiers*/
        with restriction AsBeing<BusyWords>;
    /* Here, we declare stronger binding (2-
    place) with the modifiers of StatusEntity,
    but we're not making a strong link to the
    DoneTo.what of the verb.*/
        with                 restriction
        AsBeing<typeof(StatusEntity.Modifier.mod)>;
    /* Here, we declare a very strong binding
    (3-place) with the frame's DoneTo.what
    entity and its modifier.*/
        with restriction AsBeing<
        typeof (DoneTo.what.Modifier.mod)>;
    }
}
```

A Cardinal restriction models cardinality as expressed by numeric quantifiers (for example, "3 files"). The Cardinal restriction is allowed on entities. There is a member on Cardinal object, Cardinal.number, which gives the actual cardinal value as shown in Table 128.

TABLE 128

"3 email"

```
entity MailEntity denoted by "email"
{
    int CountOfEmail;
    on resolve
    {
        with restriction Cardinal
        {
            CountOfEmail = Cardinal.number;
        }
    }
}
```

The Comparison restriction models comparison of an entity with another explicitly-identified entity. It is not used for expressions such as "a bigger file", where the entity or entities to compare to are left implicit. There are two system slots defined for Comparison: dimension, which is the dimension the comparison is being performed in, and compareTo, which is the entity being compared to. For example, for "bigger file than mydoc.txt", "bigger" is the dimension of comparison and "mydoc.txt" is the compareTo entity. The dimension is a Restriction type. In general, the Comparison restriction allows a comparison of two entities on some property of the entities.

Some examples of comparison include "a book more about cats than dogs", "mail larger than 10 KB", and "make font smaller than 12 pts". In some embodiments, it may be desirable to enforce a requirement that the dimension restriction have a Degree modifier attached to it. For example, the phrase "file big than mydoc.txt" should not resolve because the dimension restriction is not a restriction type.

A Degree restriction models the degree of a restriction, and is allowed on restrictions. It groups together words like very, extremely, slightly, almost, more, less, most, and least. Some examples include "almost in the box", "extremely red", "very large", and "more to the left". The grouped words are categorized into a set representative of "degreeness". The types of degree are as follows:

More: bigger, more relevant

Most: biggest, most relevant

Less: less relevant

Least: least relevant

Same: as big

High: very big, extremely popular

Low: not very big

It should be noted that "smaller" is modeled as "more small" and not as "less big".

For utterances like "10 KB larger file", this is modeled as "10 KB" (Modifier) modifying "more" (Degree) and the combined "10 KB more" concept modifying "large". By contrast, the utterance "10 KB large file" is modeled as two Modifier restrictions, "10 KB" and "large", on "file" entity (equivalent to "large, 10 KB file"). Table 129 shows denoter syntax for a denoter list of lexical words that denote "large" and syntax for a File Entity to which those restrictions are applied.

TABLE 129

"LARGE".// lexical words that denote "large"

```
denoter LargeWords
{
    English := "large", "big"
}
/* Defines a Degree that must have some
MeasureEntity modifying it. This models
utterances like "10KB more"*/
restriction ExtentDegree : Degree
{
    on resolve
    {
        with      obligatory      restriction
            Modifier<mod := MeasureEntity>;
    }
}
/* Define a Modifier restriction where the
modifiers must be LargeWords */
restriction LargeModifier : Modifier<mod :=
LargeWords>;
/* Defines a LargeModifier restriction that must
have a Degree restriction. This models
utterances like "larger", "less large", and
"very large" */
restriction LargeDegreeModifier : LargeModifier
{
    on resolve
    {
        with obligatory restriction Degree;
    }
}
/* Defines a LargeModifier that must have a
ExtentDegree restriction. This models "10KB
larger"*/
restriction      LargeExtentDegreeModifier      :
LargeModifier
{
    on resolve
    {
        with      obligatory      restriction
            ExtentDegree;
    }
}
//And applying those restrictions to an entity:
entity FileEntity denoted by "file"
{
    on resolve
    {
        // "large file"
        with restriction LargeModifier;
        // "10KB file"
        with restriction Modifier<mod :=
            MeasureEntity>;
        // "larger file", "extremely large
        file", "less large file", and the like
        with restriction LargeDegreeModifier;
        // "10KB larger file"
        with                          restriction
            LargeExtentDegreeModifier;
        // "larger file than mydoc.txt"
        with restriction Comparison<
            dimension := LargeDegreeModifier,
            compareTo := FileEntity>;
        // "10KB larger file than mydoc.txt"
        with restriction Comparison<dimension
            :=
            LargeExtentDegreeModifier,
            compareTo := FileEntity>;
    }
}
```

Generally, it is not necessary to create separate restriction types for "more large" and "10 KB larger". They all could have been placed under LargeModifier. Then consumers, such as FileEntity, simply check LargeModifier's RestrictionCollection property for the existence of "10 KB more" and "more" in the utterance if desired as shown in Table 130.

TABLE 130

Large Modifier

```
Restriction LargeModifier : Modifier<mod :=
LargeWords>
{
    on resolve
    {
    with restriction Degree;
    with restriction ExtentDegree;
    }
}
entity FileEntity denoted by "file"
{
    on resolve
    {
    /*"large file", "larger file", "10KB larger
    file"*/
    with restriction LargeModifier
        {
        if
        (LargeModifier.RestrictionCollection ("Degre
        e").count > 0)
        {
        ...
        }
        ...
        }
    }
}
```

A Doer restriction represents the entity doing the action, and is allowed on Frames. For example, "Bob opened the file" or "the file was opened by Bob" both trigger the Doer restriction. The Doer restriction contains one system slot, 'who', of type Entity which represents the actual doer.

Usually, when the frame is used by commands, the Doer is the computer. But, when the frame is used as a frame-based restriction (e.g. "file opened by Bob"), then the identity of the doer becomes relevant. The author can use the Doer restriction to constrain the type of the doer.

All base frames will have the Doer restriction defined with asproperty to allow easy sub typing at the consumer site as illustrated in Table 131.

TABLE 131

Base Frame (open)

```
frame open denoted by "open" behaves as
DefaultVerbClass
    {
    on resolve
    {
        with asproperty restriction Doer<who
        := Entity>;
    }
    }
// Use open frame but don't constrain the type
//of Doer.who
command OpenFileCommand uses open
{
}
entity FileEntity denoted by "file"
{
    on resolve
    {
        // constrain the entities who can open
        //files to FileUserEntity
        with   frame    open<Doer.who    :=
        FileUserEntity>
        {
        }
    }
}
```

The DoneTo restriction represents the entity that the action is being done to. For example, "open the file" and "the file was opened" invoke the DoneTo restriction. It contains one system slot, what, of type Entity representing the object of the action.

All base frames will have the DoneTo restriction defined with asproperty to allow easy sub typing at the consumer site as shown in Table 132.

TABLE 132

Base Frame Open.

```
// base frame, open
frame open denoted by "open" behaves as
DefaultVerbClass
{
    on resolve
    {
        with asproperty restriction Doer<who
        := Entity>;
        with asproperty restriction DoneTo<who
        := Entity>;
    }
}
// Define a command that uses the open frame and
//constrains the DoneTo.what to a FileEntity
command OpenFileCommand uses open<DoneTo.what :=
FileEntity>
{
}
```

The Goal restriction models the endpoint of an action or modification. The Goal restriction is allowed on Frames. Some examples include "send mail to Bob", "change password to XXX". It has one system slot, goal, of type Entity representing the endpoint as shown in Table 133.

TABLE 133

"send mail to Bob"

```
frame MySendFrame : send<DoneTo.what := MailEntity>
{
    on resolve
    {
        with    restriction    Goal<goal    :=
        RecipientEntity>;
    }
}
```

The Iteration restriction models repetition of action, and is allowed on Frames. For example, "print 3 times" triggers the Iteration restriction shown in Table 134.

TABLE 134

Iteration Restriction.

```
// "print 3 times"
frame PrintFrame : print
{
    int NumberOfIterations;
    on resolve
    {
        with restriction Iteration
        {
        NumberOfIterations = Iteration.Number;
        }
    }
}
```

The Location restriction models the semantics of being located somewhere. The Location restriction is allowed on frames and entities. For example, "mail in Inbox", "file located on the desktop", and "search the web" all trigger the Location restriction. It has one system slot, loc, of type Entity representing the actual location as shown in Table 135.

TABLE 135

Location Restriction.

```
frame SearchFrame : search // "search the web"
{
    on resolve
    {
        with restriction Location<loc := WebEntity>;
    }
}
```

The Means restriction is allowed on frames, and is discussed in detail in the LOM in section D. The Modifier restriction is allowed on Frames, Entities and Restrictions. The Modifier restriction represent adjectival modifiers, such as "large file", "school bus", "font that is red", and "print slowly". It has one system slot, mod, of type Denoter representing the adjectives. For noun-noun compounds, such as "MSN consumer application", this can be modeled as:

Modifier("MSN") and Modifier("consumer") on Entity("application");
Modifier("MSN consumer") on Entity("application");
Modifier("MSN") and Entity("consumer application"); and/or
Entity("MSN consumer application")

The Named restriction represents the name of an entity. Some examples include "Inbox folder", "file named foo.txt", "file with the name foo.txt", "open foo.txt" and "the file foo.txt". The system slot, name, is the actual name as shown in Table 136.

TABLE 136

"file named foo.txt"

```
entity FileEntity denoted by "file"
{
    on resolve
    {
        with restriction Named<name := string>
        {
            // Named.name contains "foo.txt"
        }
    }
}
```

A Negation restriction on the host means the host is negated, and not that its restriction clauses are negated. Some examples include "don't allow mail from Joe" and "mail not from Joe". Table 137 shows the syntax for a Frame with negation.

TABLE 137

Frame with Negation

```
// "look on the table"
frame LookFrame : look
{
    on resolve
    {
        with restriction Negation
        {
            // models "don't look"
        }
```

TABLE 137-continued

Frame with Negation

```
    }
}
restriction NegatedLocation : Location<loc := TableEntity>
{
    with restriction Negation
    {
        // models "not on the table"
    }
}
```

If the utterance has a negation but the SPL code does not have a Negation restriction clause, the utterance will fail resolution. This is unlike other restrictions where they are simply dropped if not authored.

Negation restriction is not allowed on entities. For the SPL, the "universe" in which the entity occurs depends on how the entity is being used, so negation of the entity is not necessary. For example, in an utterance such as "Display everything but the mail," the universe is everything the application can display, and not necessarily every entity that the application models. In the utterance "don't allow mail from Bob," the universe of things that one can allow or disallow might very well be restricted to mail only, so the negation of mail shouldn't make sense in this context. For this reason, entity negation will be handled by consumers of the entities using "!" syntax.

Negation scope disambiguation is determined by the SPL code. For example, "don't look on the table" can have the following negation scope ambiguities:

Don't look on the table (but sit on it instead): negation scoped over look frame;
Don't look on the table (but look under it): negation scoped over Location restriction; or
Don't look on the table (but look on the chair): negation scoped over Location.loc entity.

Which semantic interpretation is resolved depends on how the code is authored. In fact, depending on the authored code, all those readings may resolve successfully, thus producing multiple interpretations. The runtime usually has preferences of scope ambiguity so the multiple interpretations are ranked. Table 138 models negation.

TABLE 138

Negation Scoped

```
// Negation Scoped over "Look"
// "don't look on the table (but sit on it)"
frame LookFrame : look
{
    on resolve
    {
        with restriction Negation;
        with restriction Location<loc := TableEntity>;
    }
}
// Models negation scoped over Location
// "don't look on the table (but look under it)"
frame LookFrame : look
{
    on resolve
    {
        with restriction NegatedLocation<loc := TableEntity>;
    }
```

TABLE 138-continued

Negation Scoped

```
}
// Models negation scoped over
// Location.loc entity -- "don't look on the
// table (but look on the chair)"
frame LookFrame : look
{
    on resolve
    {
        with restriction Location<loc :=
        !TableEntity>;
    }
}
```

The "!" (NOT) syntax can also be applied to frames and restrictions as a short-hand notation as shown in Table 139.

TABLE 139

```
// The following negations on look are
//equivalent. The first does not allow authors
//to insert imperative code to handle the
//negation whereas the second one does (i.e. at
//the Negation clause of LookFrame.
command NegatedLook uses !look;
frame LookFrame : look
{
    on resolve
    {
        with obligatory restriction Negation;
    }
}
command NegatedLook2 uses LookFrame;
restriction NegatedLocation : Location<loc :=
TableEntity>
{
    on resolve
    {
        with obligatory restriction Negation;
    }
}
// Similarly, the following negated Locations
// are equivalent, except for the ability to
//have code in the Negation clause.
frame LookFrame : look
{
    on resolve
    {
        with restriction !Location<loc :=
        TableEntity>;
        with restriction NegatedLocation;
    }
}
```

The Ordinal restriction models ordinal numerals and other modifiers such as previous that express some notion of position in a sequence. Some examples include "first file", "third book", and "last email". Ordinal restrictions can be applied to other restrictions as well, such as for example, "first 3 books", which is modeled as Ordinal("first") restriction modifying Cardinal("3") restriction as shown in Table 140.

TABLE 140

Ordinal Restrictions.

```
// models "first 3"
restriction OrdinalCardinal : Cardinal
{
    int Position;
    on resolve
```

TABLE 140-continued

Ordinal Restrictions.

```
    {
        with obligatory restriction Ordinal
        {
            Position = Ordinal.distance;
        }
    }
}
entity FileEntity denoted by "file"
{
    on resolve
    {
        // "first file"
        with restriction Ordinal;
    }
}
```

The Possessor restriction models the entity's possessor, and is applied to entities. Some examples include "my book" and "Bob's book". The system slot, owner, of type Entity represents the possessor of the entity. If the possessor is explicitly uttered, as in "Bob's book", then "Bob" will be resolved against the owner slot. If the possessor is a pronoun, as in "her file", then the runtime will attempt to resolve the pronoun through anaphora resolution. If this anaphora resolution fails to find a possessor entity, then the owner slot will be null. Table 141 shows the syntax for the Possessor restriction.

TABLE 141

Possessor Restriction.

```
entity FileEntity denoted by "file"
{
    on resolve
    {
        with restriction Possessor<owner :=
        Entity>;
    }
}
```

The Quantifier restriction is allowed on Entities, and models a quantity expression. Some examples include "all files", "a few books", and "one third of the page". The following are the quantifier types:
All: all ((of) the), every, each (of the)
None: no, none (of the)
Some: some (of the)
Most: most (of the), the majority of
Many: many (of the)
Few: few (of the), not many (of the)
Percentage: a half of, ⅓ of, 40% of In some embodiments, there may exist a hierarchical relationship between Quantifier and Cardinal.

The SortOrder restriction models styles of sorting. Some examples are "sort in alphabetical order" and "display in reverse order by name". This restriction is discussed in detail above with respect to Table 56.

The Time restriction models actual time expressions, namely time expressions that can be converted into a point and/or span in time. Examples include "delete after 3 days", "mail from yesterday", and "schedule for tomorrow from 1–3 pm". The Time restriction was previously discussed in detail in section D above.

The Topic restriction models subject matter. Some examples include "book about dogs", "book regarding dogs", and "book with the subject dogs". It has one systems slot, topic, of type string representing the topic string. This restriction was discussed previously in detail in section D above. Table 142 shows a BookEntity code block with a Topic.

TABLE 142

BookEntity.

```
// book about dogs
entity BookEntity denoted by "book"
{
    on resolve
    {
        with restriction Topic<topic :=
        string>
        {
            // topic will contain the topic
            string, "dogs"
        }
    }
}
```

Conjunction ("and") and disjunction ("or") can occur for commands, entities and restrictions. Conjunction and disjunction fall under the heading of Coordination. In general, the ambiguity in coordination comes from how entities and modifiers are distributed over conjunction and disjunction and from bracketing ambiguity in utterances with multiple "and" and "or" operators. Like Negation, this disambiguation is determined by the authored code. For example, with respect to the utterance "find mail and notes created yesterday", the SPL author can model this as follows:

a. (Find (mail created yesterday) AND (notes created yesterday)).
b. (Find (mail) AND (notes created yesterday)).
c. (Find (mail created yesterday)) AND (Find (notes created yesterday)).
d. (Find (mail)) AND (Find (notes created yesterday)).

How "created yesterday" and "find" are distributed with its entities, "mail" and "notes", is determined by the authored SPL code. For illustration purposes, let's suppose the author codes a FindMailCommand that only understands entities of type MailEntity and a FindNotesCommand that only understands entities of type NotesEntity. Furthermore, the authored code provides that MailEntity does not have the notion of creation time, but NotesEntity does as shown in Table 143.

TABLE 143

Coordination.

```
command FindMailCommand uses find<DoneTo.what :=
MailEntity>;
command FindNotesCommand uses find<DoneTo.what
:= NotesEntity>;
entity MailEntity denoted by "mail"
{
}
entity NotesEntity denoted by "notes"
{
    on resolve
    {
        with frame CreateNotesFrame;
    }
}
frame CreateNotesFrame : create<DoneTo.what :=
NotesEntity>
{
    on resolve
```

TABLE 143-continued

Coordination.

```
    {
        with restriction Time;
    }
}
```

With this authored code, for the utterance, "find mail and notes created yesterday", the semantic analysis only produces reading (d) from the above list ("Find (mail) and find (notes created yesterday)"). The SPL author does not need to understand all possibilities. The author can just think in terms of the semantics of their application (e.g. MailEntity does not understand creation time but NotesEntity does).

Coordinated entities are represented as a list of entities linked together with a coordination type, either "and" or "or". All entities in the list must be linked together with the same coordination type. Furthermore, all entities in the list must be of the same programming type (e.g. all MailEntity elements).

As a general rule, the runtime will not produce multiple interpretations to model bracketing ambiguities resulting from coordination of the same type. Rather, entities coordinated together with the same type of coordination (i.e. either all with "and" or all with "or") are modeled as a flat list, and it is left to the application to decide on appropriate bracketing if it matters. For example, take the utterance "find mail and books and files". This could mean "find mail and (books and files)" or "find (mail and books) and files". This bracketing ambiguity is not modeled, meaning that only one possible reading will be produced, assuming all entities are of the same SPL type. This utterance is modeled as a flat list where the order of the elements reflects the order in the utterance.

However, with mixed "and" and "or", the runtime produces multiple readings to model the bracketing ambiguity. Depending on the authored code, these multiple readings may or may not result in multiple resolved interpretations. With respect to the utterance "find mail or books and files", since lists of elements must be coordinated with the same coordination type, the following runtime produces the following possible readings (assuming that "mail", "books", and "files" are resolved to the same SPL type and that the Find command takes a list of entities):
(Find (mail OR books)) AND (Find (files))
(Find (mail)) OR (Find (books AND files))
The "find" is distributed over the "and" and over the "or".

In general, mixed "and" and "or" operators are not common in utterances, so producing multiple interpretations to model bracketing ambiguity should not be too onerous.

In some configurations, it may be necessary to implement Entity lists, which can be specified by the consumers of the entity using [] syntax as shown in Table 144.

TABLE 144

Entity Lists.

```
command FindMailCommand uses find<DoneTo.what :=
[MailEntity]>;
entity MailEntity denoted by "mail"
{
    on resolve
    {
        with restriction Location<loc :=
```

TABLE 144-continued

Entity Lists.

```
            [MailFolder]>;
    }
}
```

An interpretation represents a resolved interpretation of the utterance against the SPL program. Each resolved interpretation contains at least one resolved command. An utterance can result in multiple commands for an interpretation. For example, "find file foo.txt and print it", there are two commands in this utterance. The commands in an interpretation are linked together with some condition. Currently, they are linked together by a coordination type, either AND or OR (Other modeling contionals are also possible). The commands in the interpretation do not need to be of the same resolved type.

The following discussion examines various coordination examples to see how elements are distributed over conjunction and disjunction and how the authored code models the coordination. The discussion also examines coordination for commands, entities, and restrictions. For a given utterance, the possible readings are shown to illustrate the ambiguity and distribution.

To reiterate, the SPL author thinks about the semantics of their application (e.g. my Find command can operate over a list of MailEntity). The runtime tries to map the utterance into what is authored in accordance with its linguistic understanding of the rules of distribution of elements over conjunction and disjunction. The code sample in Table 145 is used for the examples presented below.

TABLE 145

Example Code.

```
command OpenMailCommand uses open<DoneTo.what :=
MailEntity>;
command OpenFileCommand uses open<DoneTo.what :=
FileEntity>;
command ReplyMailCommand uses reply<DoneTo.what
:= MailEntity>;
command    CreateMailCommand    uses
create<DoneTo.what := MailEntity>;
entity MailEntity denoted by "mail": ItemEntity
{
    on resolve
    {
        with    restriction    Source <src    :=
        SenderEntity>;
        with    restriction    Location<loc    :=
        MailFolder> ;
    }
}
entity NotesEntity denoted by "notes" :
ItemEntity;
entity JournalEntity denoted by "journal items"
: ItemEntity;
entity FileEntity denoted by "file";
// This entity is here for polymorphism at
//CreatedItemsFrame
entity ItemEntity
{
    on resolve
    {
        with                restriction
        CreatedItemsFrame<DoneTo.what :=
        this>;
    }
}
// models "created yesterday"
```

TABLE 145-continued

Example Code.

```
frame CreatedItemsFrame : create<DoneTo.what :=
ItemEntity>
{
    on resolve
    {
        with restriction Time;
    }
}
```

The above code resolves the command "Find mail from Bob and delete them" as follows:

FindMailCommand<MailEntity$_1$("mail from Bob")> AND DeleteMailCommand<MailEntity$_1$>

The command "Find and/or delete mail from Bob" is resolved to have four interpretations as follows:

Interpretation 1: "mail from Bob" is distributed over the "and"/"or".

FindMailCommand<MailEntity$_1$ ("mail from Bob")> AND/OR DeleteMailCommand<MailEntity$_1$>

Interpretation 2: "mail from Bob" is not distributed over the "and"/"or".

FindMailCommand<MailEntity$_1$(empty)> AND/OR DeleteMailCommand <MailEntity$_2$("mail from Bob")>

Interpretation 3: "mail from Bob" is not distributed over the "and"/"or". This interpretation results from the authored code, not from coordination ambiguity. Since there are 3 "find" commands and the "empty" entity is a valid entity, a bare "find" can resolve to any of those commands.

FindNotesCommand<NotesEntity$_1$(empty)> AND/OR DeleteMailCommand <MailEntity$_1$("mail from Bob")>

Interpretation 4: same as Interpretation 3

FindJournalCommand<JournalEntity$_1$(empty)> AND/OR DeleteMailCommand <MailEntity$_1$("mail from Bob")>

All of the listed interpretations are possible against the above authored code.

The command "Find mail from Bob and/or delete" is resolved against the above-authored code and results in two possible interpretations as follows:

Interpretation 1: "mail from Bob" is distributed over the "and"/"or"

> FindMailCommand<MailEntity₁ ("mail from Bob")> AND/OR
> DeleteMailCommand<MailEntity₁>

Interpretation 2: "mail from Bob" is not distributed over the "and"/"or"

> FindMailCommand<MailEntity₁("mail from Bob")> AND/OR
> DeleteMailCommand <MailEntity₂(empty)>

The only difference between the phrase in this example and that of the previous example is the command "delete" that has the empty MailEntity. Both interpretations are possible with the above authored code.

The command "Open file and reply or create mail" is resolved against the code, resulting in the following possible interpretations:

Interpretation 1: "mail" is distributed over "or" to attach to "reply"

> OpenFileCommand<Entity1("file")> AND
> ReplyMailCommand<Entity₂("mail")> OR
> CreateMailCommand<Entity₂>

Interpretation 2: no distribution of entities

> OpenFileCommand<FileEntity₁("file")> AND
> ReplyMailCommand<MailEntity₁(empty)> OR
> CreateMailCommand< MailEntity₂ ("mail")>

Interpretation 3: "file" is distributed over "and" to attach to "reply". This reading will not be resolved against the above authored code because there is no "reply" command that takes FileEntity.

> OpenFileCommand<FileEntity₁("file")> AND
> ReplyMailCommand<FileEntity₁> OR
> CreateMailCommand< MailEntity₁("mail")>

The command "Open file or reply and create mail" results in three possible interpretations as follows:

Interpretation 1: "file" is distributed over "or" to attach to "reply". This reading will not resolve against the above authored code because there is no "reply" command that takes "FileEntity".

> OpenFileCommand<FileEntity₁("file")> OR
> ReplyMailCommand<FileEntity₁> AND
> CreateMailCommand< MailEntity₁("mail")>

Interpretation 2: "mail" is distributed over "and" to attach to "reply"

> OpenFileCommand<Entity1("file")> OR
> ReplyMailCommand<Entity₂("mail")> AND
> CreateMailCommand<Entity₂>

Interpretation 3: no distribution of entities

> OpenFileCommand<FileEntity₁("file")> OR
> ReplyMailCommand<MailEntity₁(empty)> AND
> CreateMailCommand< MailEntity₂ ("mail")>

In general, the 'and' for restrictions is implied by the semantics of SPL. For example, the command "find mail from Bob and in Inbox" causes two restrictions to fire on MailEntity, a Source restriction and a Location restriction. Therefore, the following discussion examines disjunction for restrictions.

In addition to the above code, we'll add a FindMailListCommand that understands a list of MailEntity using the following line of code.

> command FindMailListCommand uses find<DoneTo.what := [MailEntity]>;

The command "find mail from Bob or created yesterday" resolves to the following interpretation:

Interpretation 1: "mail" distributed over the "or". This results in a list of MailEntity.

> FindMailListCommand <[
> MailEntity₁("mail from Bob") OR
> MailEntity₂("mail created yesterday")]>

If FindMailListCommand did not exist or did not resolve successfully, then "find" will be distributed over the entities to create two FindMailCommands:

> FindMailCommand<MailEntity₁("mail from Bob")> OR
> FindMailCommand<MailEntity₂("mail created yesterday")>

The command "find mail from Bob or created yesterday and in Inbox" is interpreted as follows:

Interpretation 1: bracketing of (mail from Bob or created yesterday) with "in Inbox" distributed over the bracketing, i.e. over "or".

> FindMailListCommand <[
> MailEntity₁("mail from Bob and in Inbox") OR
> MailEntity₂("mail created yesterday and in Inbox")]>

Again, if FindMailListCommand did not exist or did not resolve successfully, then the "find" would be distributed over the entities to create two FindMail-Commands.

Interpretation 2: bracketing of (mail created yesterday and in Inbox). Because "mail from Bob" is connected with disjunction, there is no distribution of it over the bracketing.

---
FindMailListCommand <[
MailEntity$_1$("mail from Bob") OR
MailEntity$_2$("mail created yesterday and in Inbox")]>
---

Again, if FindMailListCommand did not exist or did not resolve successfully, then the "find" would be distributed over the entities to create two FindMail-Commands.

Interpretation 3: no bracketing of the modifiers and "mail" is distributed over all modifiers.

---
FindMailListCommand <[
MailEntity$_1$("mail from Bob") OR
MailEntity$_2$("mail created yesterday") AND
MailEntity$_3$("in Inbox")]>
---

Again, if FindMailListCommand did not exist or did not resolve successfully, then the "find" would be distributed over the entities to create two FindMail-Commands.

In addition to the above commands, a general FindCommand is added that can find a list of mail, notes, and journal items. The FindCommand is shown in Table 146.

TABLE 146

Find Command.

command FindCommand uses find<DoneTo.what :=
[GeneralEntity]>;
entity GeneralEntity denoted by "mail", "notes",
"journal items" : ItemEntity
{
   on resolve
   {
      with restriction Source<src :=
      SenderEntity>;
   }
}

The addition of this command does increase the number of interpretations as can be seen from the examples below.

The command "Find mail and/or notes created yesterday" results in the following intepretations.

Interpretation 1: "created yesterday" distributed over the "and"/"or".

---
FindCommand<[
GeneralEntity$_1$("mail created yesterday")
AND/OR
GeneralEntity$_2$("notes created yesterday")]>
---

Interpretation 2: no distribution of "created yesterday".

---
FindCommand<[
GeneralEntity$_1$("mail") AND/OR
GeneralEntity$_2$("notes created yesterday")]>
---

If FindCommand did not exist or did not resolve successfully, then the "find" would be distributed over the conjunction, giving us the following two more interpretations:

Interpretation 3: same as 1 but with "find" distributed over the entities

---
FindMailCommand<MailEntity$_1$("mail created yesterday")> AND/OR
FindNotesCommand<NotesEntity$_1$("notes created yesterday")>
---

Interpretation 4: same as 2 but with "find" distributed over the entities

---
FindMailCommand<MailEntity$_1$("mail")> AND/OR
FindNotesCommand<NotesEntity$_1$("notes created yesterday")>
---

The command "Find mail from Bob and/or notes created yesterday" results in the following potential interpretations.

Interpretation 1: unlike example 1, there is no distribution of modifiers.

---
FindCommand<[
GeneralEntity$_1$("mail from Bob") AND/OR
GeneralEntity$_2$("notes created yesterday")]>
---

Interpretation 2: if the FindCommand did not resolve, then we get distribution of "find" over the entities.

---
FindMailCommand<MailEntity$_1$("mail from Bob")> AND/OR
FindNotesCommand<NotesEntity$_1$("notes created yesterday")>
---

The Command "Find mail, notes, or journal items created yesterday" results in the following potential interpretations.

Interpretation 1: "created yesterday" distributed over "mail", "notes", and "journal items".

---
FindCommand<[
GeneralEntity$_1$("mail created yesterday") OR
GeneralEntity$_2$("notes created yesterday") OR
GeneralEntity$_3$("journal items created yesterday")]>
---

Interpretation 2: no distribution of modifiers

```
FindCommand<[
  GeneralEntity₁("mail") OR
  GeneralEntity₂("notes") OR
  GeneralEntity₃("journal items created
  yesterday")]>
```

If FindCommand did not exist or did not resolve successfully, then the "find" would be distributed over the conjunction, resulting in the following two additional interpretations:

Interpretation 3: same as 1 but with "find" distributed over the entities

```
FindMailCommand<MailEntity₁("mail created
yesterday")> OR
FindNotesCommand<NotesEntity₁("notes created
yesterday")> OR
FindJournalCommand<JournalEntity₁("journal
items created yesterday")>
```

Interpretation 4: same as 2 but with "find" distributed over the entities

```
FindMailCommand<MailEntity₁("mail")> OR
FindNotesCommand<NotesEntity₁("notes")> OR
FindJournalCommand<JournalEntity₁("journal
items created yesterday")>
```

The Command "Find mail and notes or journal items created yesterday" results in bracketing issues. Because of the mixed conjunction types (i.e. both "and" and "or" appear in the utterance) and the presence of "find" commands that take both lists of entities and the singleton entities, there is a potential for many interpretations. It is therefore good practice not to have commands that take list of some entity as well as commands that take that singleton entity. The code is authored so as to generate as many interpretations as possible.

Interpretation Set 1: no distribution of "created yesterday"
bracketing of "mail" and "notes

```
FindCommand<[GeneralEntity₁("mail") AND
GeneralEntity₂("notes")]> OR
FindJournalCommand<JournalEntity₁("jour
nal items created yesterday">
```

In this instance, it may also be necessary to produce an interpretation with FindCommand taking ony one element in the place of FindJournalCommand.

bracketing of "notes" and "journal items"

```
FindMailCommand<MailEntity("mail")>
AND
FindCommand<[
  GeneralEntity₁("notes") OR
  GeneralEntity₂("journal items created
  yesterday")]>
``` no bracketing

```
FindMailCommand<MailEntity("mail")>
AND
FindNotesCommand<NotesEntity("notes")>
ORFindJournalCommand<JournalEntity("jo
urnal items created yesterday")>
```

Interpretation Set 2: distribution of "created yesterday" over "or" to attach to "notes"
bracketing of "mail" and "notes

```
FindCommand<[
  GeneralEntity₁("mail") AND
  GeneralEntity₂("notes created
  yesterday")]> OR
  FindJournalCommand<JournalEntity₁("jour
  nal items created yesterday">
``` bracketing of "notes" and "journal items"

```
FindMailCommand<MailEntity("mail")>
AND
FindCommand<[
  GeneralEntity₁("notes created
  yesterday") OR
  GeneralEntity₂("journal items created
  yesterday")]>
``` no bracketing

```
FindMailCommand<MailEntity("mail")>
AND
FindNotesCommand<NotesEntity("notes
created yesterday")> OR
FindJournalCommand<JournalEntity("jour
nal items created yesterday")>
```

Interpretation Set 3: distribution of "created yesterday" over all entities
bracketing of "mail" and "notes

```
FindCommand<[
  GeneralEntity₁("mail created
  yesterday") AND
  GeneralEntity₂("notes created
  yesterday")]> OR
  FindJournalCommand<JournalEntity₁("jour
  nal items created yesterday">
``` bracketing of "notes" and "journal items"

```
FindMailCommand<MailEntity("mail
created yesterday")> AND
```

-continued

```
FindCommand<[
   GeneralEntity₁("notes    created
   yesterday") OR
   GeneralEntity₂("journal items created
   yesterday")]>
``` no bracketing

```
FindMailCommand<MailEntity("mail
created yesterday")> AND
FindNotesCommand<NotesEntity("notes
created yesterday")> OR
FindJournalCommand<JournalEntity("jour
nal items created yesterday")>
```

In some instances, it may be desirable to permit the developer to specify his or her own mapping between various linguistic phenomenon to the restrictions. It may also be desirable to provide "pre-analysis" programming where the patterns affect what restrictions are fired, as opposed to the "post-analysis" programming in Default. In general, it is desirable to allow a range of patterns from string-based to linguistically-based.

In one embodiment, a general mechanism is provided for specifying patterns that are used internally by LOM developers and externally by SPL developers. External developers should be allowed to use range of patterns, from simple to complex.

In one embodiment, applying patterns will be like using C# attributes as shown in Table 147.

TABLE 147

Applying Patterns.

```
entity FlightEntity
{
   [MyPattern("departing from")]
   with restriction Source<src := City>
   {
   }
}
```

In general, the present invention is intended to be as open as possible, allowing developers to create their own patterns, that perhaps are independent of any predefined set. This allows developers to bypass the formalized semantic relationships (i.e. restriction types) and create their own as desired.

With respect to modeling conditionals, in some embodiments, modeling conditional commands may be very valuable. Some simple examples include "if Bob sends me mail, delete it", "page me when mail comes from Bob", "move the file to c:\docs after copy it", and "warn me before permanently deleting a message".

In general, the mechanism to model this should be similar to that of coordinated commands. In an alternative embodiment, conditionals may be surfaced through a special restriction type.

In some embodiments, authors may want to reason about multiple restrictions in a restriction clause in order to provide narrower interpretations. Authors can mimic the AND reasoning, albeit not elegantly, by storing data in the restriction clauses and reasoning about it in the success clause. Authors can mimic the OR property reasoning by calling out to common functions.

In a preferred embodiment, authors are permitted to specify a list of denotations using imperative code (e.g. calling to databases). The notation for this may vary according to the specific implementation and according to the databases involved.

Generally, the Named restriction provides authors with the name as a string. In one embodiment, authors can create a name class that can be queried by the runtime for a list of names it recognized in a given utterance. For example, considering the phrase "find Gone with The Wind movie", the author can create a name class that can recognize "Gone with the wind" as a name of a movie. In one embodiment, the SPL can be provided with an overload of Named restriction that takes the name class type as shown in Table 148.

TABLE 148

Overloaded Name Restriction.

```
name MovieNames
{
   // some method that the runtime can call to
   get list of recognized
   // names in a given utterance
   NameList     FindRecognizedNames(string
   Utterance);
}
entity MovieEntity denoted by "movie"
{
   on resolve
   {
   with restriction Named<name := MovieNames>;
   }
}
```

In a preferred embodiment, a NamedEntity type is associated with a NamedEntityRecognizer class as follows:
NamedEntity MovieName uses MoveNameRecognizer;

```
class MovieNameRecognizer :
NamedEntityRecognizer
{
    public override void Recognize( string
    input, /* other arguments */ )
    {
        // Recognize instances of movie titles
        //in 'input'
    }
}
```

In a preferred embodiment, developers are allowed to specify how unknown/un-authored commands (e.g. noun phrases) are to be handled. The author can code the application to handle them in place, or ask the runtime to invoke a particular command (or set of commands) for specific entities, or provide a default command handler.

In one embodiment, derived classes are permitted to invoke the restriction clauses of the base class as shown in Table 149.

TABLE 149

Derived Classes Invoke Restriction Clause of Base Class.

```
entity Entity1
{
    with restriction   Location<loc   :=
```

TABLE 149-continued

Derived Classes Invoke Restriction Clause of Base Class.

```
        SomeEntity>
        {
        }
    }
        entity Entity2 : Entity1
    {
        /* We want to provide handling for all
        types of locations that are not handled by
        Entity1 but go to Entity1 for locations of
        type SomeEntity. If we do the following,
        Entity1::Location will not get invoked
        since this clause will be tried before that
        of the Entity1.*/
        with restriction Location<loc := Entity>
        {
            // do processing
        }
    }
```

Direct invocation may not be desirable, since resolution of clauses is largely controlled by the runtime. Introducing public/private/protected/and other restriction clauses and trying to figure out what each means to resolution semantics would add unnecessary complexity. Instead, more constraints can be added (e.g. more declarative constraints) that tell the interpreter to invoke the base restriction clause before invoking its own clause if the base clause succeeded. The compiler can enforce the existence of the clause with exact slot types in the base as shown in Table 150.

TABLE 150

```
    entity Entity2 : Entity1
    {
        with invokebase restriction Location<loc :=
        SomeEntity>
        {
        }
        with restriction Location<loc := Entity>
        {
        }
    }
```

The semantics of the invokebase is that the base's restriction clause (both declarative and imperative constraints) must succeed before the clause decorated with invokebase is invoked. If it was desirable to change the semantics (i.e. invoke the derived clause before the base), then other syntax should be used. The "with" clause syntax means that the constraints specified by the clause must be met before the code attached to the clause is executed.

Some verbs interchange Goal and Location. For example, "print to my printer" means the same as "print on my printer". The author should not have to code against two different restrictions, depending on how the location is syntactically realized (i.e. "to" vs. "on"). Both restrictions can be surfaced for these verbs, depending on what is authored. In some instances, however, it may be easier to explain to authors that "to" will always be realized as a Goal and forget about trying to explain that for some verbs, Goals can be Location but for others, it cannot.

It is important to understand that abstract types cannot be instantiated (i.e. cannot be directly resolved against), but they are useful for polymorphism and for holding common functionality. If the author has written a command for "send mail to Bob", then "send to Bob" should also resolve against that command, even though there is no "mail" in the utterance. However, making this default can create a lot of interpretations. In some embodiments, such functionality may be desirable. If empty entities are allowed and are treated as valid by default, the author can write code at the entity's success clause to reject empty entities. If empty entities are not allowed by default (i.e. if there is not evidence of the entity in the utterance, then it won't resolve), then a slot qualifier could be introduced (such as "optional") that allows commands to accept null entities. In a preferred embodiment, there may be no restriction containing the MailEntity, and the frame or command would explicitly fail resolution, if the author cared to check for this case.

Although the present invention has been described with reference to particular embodiments, workers skilled in the art will recognize that changes may be made in form and detail without departing from the spirit and scope of the invention.

Appendix I-Scenario: Microsoft Outlook® Prototype

In this embodiment, Microsoft Outlook® was enabled for text and speech input using the SPL and the LOM. Most of the enabling was performed by a summer intern, who had no linguistic knowledge or training. The SPL code was designed to compile to and run on Microsoft .Net platform, and the code interacts with Microsoft Outlook via the Outlook 2002 object model and CDO (Collaboration Data Objects) to do the binding and to execute the commands.

Some advanced searching has been enabled, which reasons about different data sources. Some examples include the following scenarios:

"search for mail that was sent by people on Conference Group" where we reason about a distribution list;

"show mail from my contacts" where we reason about people in the contacts folder; and "find mail from my direct reports" where we reason about the organization chart.

Additionally, the system also does anaphoric resolutions. For example, "show me David's manager", followed by "send mail to him" is disambiguated for the developer that "him" refers to "David's manager".

Additionally, the system performs advanced reasoning and modeling such as the following:

"send mail to everyone on nlgcore except David Bradlee" where we reason about negation; and "schedule a meeting every Tuesday with my manager at 2:00 for 1 hour" where we model and program against a complex time expression.

Appendix II: Microsoft Outlook® Code Walk Through

The following discussion analyzes a command from the point of view of the developer. The discussion mimics what the developer sees as he/she debugs the code. The command is "send mail about package to Seattle group". This sentence has two possible meanings:

1. "send mail about package to seattle group" where the subject of the mail is "package to seattle group".
2. "send mail about package to seattle group" where the subject of the mail is "package" and the target of the "send" (i.e. where to send the mail) is "seattle group".

Depending on the domain knowledge, one or both of these interpretations will be in the final interpretation list.

Below is the code in its entirety. SPL keywords or reserved words are in bold. Code snippets will be left out as the analysis proceeds through the steps:

```
command SendMailCommand uses SendMailFrame
{
    on resolve
    {
        on begin
        {
            return Outlook.IsInSendMailContext( );
        }
        on success
        {
            Outlook.SendMail(SendMailFrame.Mail,
            SendMailFrame.Targets);
        }
        on failure
        {
            // do whatever cleanup is necessary
        }
    }
}
frame SendMailFrame : send
{
    public string[] Targets;
    public MailEntity Mail;
    on resolve
    {
        with restriction DoneTo<what := MailEntity>
        {
            Mail = DoneTo.what.MailEntity;
        }
        with restriction Goal<goal := DLEntity>
        {
            Targets = Goal.goal.DLEntity.People;
        }
    }
}
entity MailEntity denoted by MailEntityWords
{
    public string MailSubject;
    on resolve
    {
        with restriction Topic<topic := string>
        {
            MailSubject = Topic.topic.Phrase.topic;
        }
    }
}
entity DLEntity denoted by DLEntityWords
{
    public string[] People;
    with restriction Named<name := Entity>
    {
        People = Outlook.GetDLMembers(Named.name.Phrase.text);
        if (People == null)
        {
            return false;
        }
    }
}
denote MailEntityWords
{
    English := noun("mail"), noun("email"), noun("electronic mail"),
    noun("e-mail");
    French := noun("mail"), noun("email"), noun("courriel"),
    noun("message électronique");
}
denote DLEntityWords
{
    English := noun("distribution list"), noun("list"), noun("group"),
    noun("disc"), noun("discussion
group");
    French := noun("liste de distribution"), noun("dl");
}
```

Interpretation 1

Referring again to the command, the first interpretation is that the subject of the mail is "package to seattle group" as follows:

"send mail about package to seattle group"

The first object that gets invoked is "on begin" clause of the "on resolve" clause of the SendMailCommand:

```
"send mail about package to seattle group"
command SendMailCommand uses SendMailFrame
{
    on resolve
    {
        on begin
        {
            return Outlook.IsInSendMailContext( );
        }
        on success
        {
            Outlook.SendMail(SendMailFrame.Mail,
            SendMailFrame.Targets);
        }
        on failure
        {
            // do whatever cleanup is necessary
        }
    }
}
```

The constructor for the command is invoked and the code in the clause is executed. If the clause returns "false", then further analysis against this command is stopped. In this case, if SendMailContext( ) returns false (i.e. the application is not currently in the context for sending mail), then the analysis stops.

Assuming that the application can send mail, the SPL interpreter continues its analysis. The next object that gets invoked is the SendMailFrame because the SendMailCommands says it uses the SendMailFrame. The interpreter knows that the word "send" in the phrase maps to the SendMailFrame.

```
"send mail about package to seattle group"
frame SendMailFrame : send
{
    public string[] Targets;
    public MailEntity Mail;
    on resolve
    {
        with restriction DoneTo<what := MailEntity>
        {
            Mail = DoneTo.what.MailEntity;
        }
        with restriction Goal<goal := DLEntity>
        {
            Targets = Goal.goal.DLEntity.People;
        }
    }
}
```

There is no constructor for the SendMailFrame so the default constructor is invoked. The default constructor always succeeds. The interpreter continues to resolve the restrictions on 'send'. The first restriction to be resolved is "DoneTo" restriction, which represents the object of the 'send', which in this case is 'mail'.

```
"send mail about package to seattle group"
frame SendMailFrame : send
{
    public string[] Targets;
```

```
        public MailEntity Mail;
        on resolve
        {
            with restriction DoneTo<what := MailEntity>
            {
                Mail = DoneTo.what.MailEntity;
            }
            with restriction Goal<goal := DLEntity>
            {
                Targets = Goal.goal.DLEntity.People;
            }
        }
    }
```

According to the code, the slot of DoneTo (which dictates the domain specific type) is MailEntity. In other words, the object of the 'send' needs to be a MailEntity. The interpreter then tries to resolve the MailEntity:

```
entity MailEntity denoted by MailEntityWords
{
    public string MailSubject;
    on resolve
    {
        with restriction Topic<topic := string>
        {
            MailSubject = Topic.topic.Phrase.topic;
        }
    }
}
```

As with the other objects, the interpreter invokes the constructor. Since there is no constructor, the default constructor is invoked, which will succeed.

Entities have the concept of being denoted by a list of words. In this case, the interpreter checks to see if 'mail' is a denoter for MailEntity by looking at the English list for MailEntityWords:

```
"send mail about package to seattle group"
denote MailEntityWords
{
    English := noun("mail"), noun("email"),
    noun("electronic mail"), noun("e-mail");
    French := noun("mail"), noun("email"),
    noun("courriel"), noun("message électronique");
}
```

This is where language specific details are coded. The interpreter sees that 'mail' is in the list.

Next, the interpreter tries to resolve the restrictions on 'mail' against what is coded in MailEntity. In this case, "about package to seattle group" is a Topic restriction where the actual topic is "package to seattle group":

```
"send mail about package to seattle group"
entity MailEntity denoted by MailEntityWords
{
```

```
    public string MailSubject;
    on resolve
    {
        with restriction Topic<topic := string>
        {
            MailSubject = Topic.topic.Phrase.topic;
        }
    }
}
```

The interpreter tries to resolve the actual topic against the slot of the Topic restriction. The 'topic' slot is a string, so no resolution is necessary. The code in the Topic clause is executed.

```
"send mail about package to seattle group"
entity MailEntity denoted by MailEntityWords
{
    public string MailSubject;
    on resolve
    {
        with restriction Topic<topic := string>
        {
            MailSubject = Topic.topic.Phrase.topic;
        }
    }
}
```

The code stores the text of the topic into a member variable, MailSubject. The actual text of the topic is retrieved via the Linguistic Object Model (LOM). The interpreter is now done with the MailEntity object. It invokes the default success destructor for MailEntity since one was not coded.

Control flow is returned to the SendMailFrame where code is executed in the DoneTo clause:

```
frame SendMailFrame : send
{
    public string[] Targets;
    public MailEntity Mail;
    on resolve
    {
        with restriction DoneTo<what := MailEntity>
        {
            Mail = DoneTo.what.MailEntity;
        }
        with restriction Goal<goal := DLEntity>
        {
            Targets = Goal.goal.DLEntity.People;
        }
    }
}
```

This code just stores the MailEntity object into a member variable. {NOTE: This is where the second interpretation (discussed below) begins}. The interpreter is done resolving the SendMailFrame object and invokes the default success destructor since one was not provided.

Control flow returns to the SendMailCommand. At this point, the interpreter is done resolving the complete command. The success destructor for the SendMailCommand is invoked.

```
command SendMailCommand uses SendMailFrame
{
    on resolve
    {
        on begin
        {
            return Outlook.IsInSendMailContext( );
        }
        on success
        {
            Outlook.SendMail(SendMailFrame.Mail, SendMailFrame.Targets);
        }
        on failure
        {
            // do whatever cleanup is necessary
        }
    }
}
```

The code is executed and the SendMailCommand object is returned to the application.

Interpretation 2

Referring now to the second possible interpretation: "send mail about package to seattle group"

The resolution steps for "send mail about package" are exactly the same as above up to the marked spot, except the topic is 'package' instead of 'package to seattle group'.

```
"send mail about package to seattle group"
frame SendMailFrame : send
{
    public string[] Targets;
    public MailEntity Mail;
    on resolve
    {
        with restriction DoneTo<what := MailEntity>
        {
            Mail = DoneTo.what.MailEntity;
        }
        with restriction Goal<goal := DLEntity>
        {
            Targets = Goal.goal.DLEntity.People;
        }
    }
}
```

The code says that the actual goal needs to be a DLEntity so the interpreter tries to resolve "seattle group" against DLEntity.

```
"send mail about package to seattle group"
entity DLEntity denoted by DLEntityWords
{
    public string[] People;
    with restriction Named<name := string>
    {
        People = Outlook.GetDLMembers(Named.name);
        if(People == null)
        {
            return false;
        }
    }
}
```

The interpreter knows that 'group' should be a denoter of DLEntity. It checks the denoter list,

```
denote DLEntityWords
{
    English := noun("distribution list"), noun("list"),
        noun("group"), noun("disc"), noun("discussion group");
    French := noun("liste de distribution"), noun("dl");
}
```

A match is found. The interpreter then tries to resolve 'seattle' against the Named restriction clause. Since the slot of the Named restriction is a string, 'seattle' will resolve against it. The Named restriction clause succeeds and the code in the clause is executed:

```
entity DLEntity denoted by DLEntityWords
{
    public string[] People;
    with restriction Named<name := string>
    {
        People = Outlook.GetDLMembers(Named.name);
        if (People == null)
        {
            return false;
        }
    }
}
```

The code will return 'true' only if 'seattle' is a valid distribution group. If it's not a recognized distribution group, then the clause returns 'false'. This is how domain specific knowledge affects the interpretations that the SPL interpreter returns. If 'seattle' is not a distribution group, then resolution of this interpretation will fail and only the first interpretation will be returned.

The interpreter is done resolving the command. Depending on whether 'seattle' is a recognized distribution group or not, either the success or the failed destructor will be invoked.

Control flow returns to the SendMailFrame. If the resolution of DLEntity failed, then the code in the Goal clause will not be executed and the SendMailFrame fails resolution. Otherwise, the code is run and the resolution succeeds.

```
frame SendMailFrame : send
{
    public string[] Targets;
    public MailEntity Mail;
    on resolve
    {
        with restrictionDoneTo<what := MailEntity>
        {
            Mail = DoneTo.what.MailEntity;
        }
        with restrictionGoal<goal := DLEntity>
        {
            Targets = Goal.goal.DLEntity.People;
        }
    }
}
```

Control flow returns to the SendMailCommand and either the success destructor is invoked or the failed destructor is invoked, depending on whether the SendMailFrame succeeded or not.

```
command SendMailCommand uses SendMailFrame
{
    on resolve
    {
        on begin
        {
            return Outlook.IsInSendMailContext( );
        }
        on success
        {
            Outlook.SendMail(SendMailFrame.Mail,
            SendMailFrame.Targets);
        }
        on failure
        {
            // do whatever cleanup is necessary
        }
    }
}
```

What is claimed is:

1. A linguistic object model that is encoded on a computer-readable medium and is adapted to be utilized by a computer to model semantic elements of a natural language, the linguistic object model comprising:
    a set of types for modeling semantics of natural language, the set of types being independent of any particular natural language, and wherein the set of types further comprises a Denoter type for modeling user-defined categories of input strings, and wherein a data member describing the Denoter comprises a record of which user-defined category of input strings in a Denoter object of type Denoter is filled at runtime by an analysis engine to fulfill a match between a type of the set of types and an element of a natural language utterance.

2. The linguistic object model of claim 1 wherein the set of types comprises:
    an Entity type for modeling semantics of noun phrases.

3. The linguistic object model of claim 1 wherein the set of types comprises:
    an Entity type for modeling semantics of adjective phrases.

4. The linguistic object model of claim 2 and further comprising:
    a Restriction type for modeling properties of semantic elements;
    wherein the Entity hosts the Restriction.

5. The linguistic object model of claim 1 wherein the set of types comprises:
    a Frame type for modeling semantics of events.

6. The linguistic object model of claim 5 wherein the event comprises a semantic event that can be expressed either as verbs or nouns.

7. The linguistic object model of claim 5 wherein the Frame type comprises one or more head words corresponding to a syntactic head of a phrase modeled by the Frame type.

8. The linguistic object model of claim 5 wherein a head word of a Frame is defined by a developer of a natural language software application to create new Frame types.

9. The linguistic object model of claim 5 wherein a developer codes an application-specific Frame to inherit from a Frame type of the set of types.

10. The linguistic object model of claim 5 further comprising:
    a Restriction for modeling properties of semantic elements; and
    wherein the Frame hosts the Restriction.

11. The linguistic object model of claim 1 wherein the set of types comprises:
    a Restriction adapted to model properties of semantic elements.

12. The linguistic object model of claim 1 wherein the set of types comprises:
    Entities adapted to model semantic objects;
    Frames adapted to model events and associated relationships between one or more objects; and
    Restrictions adapted to model properties of and relationships between other entities, Frames or restrictions.

13. The linguistic object model of claim 1 wherein the set of types comprises:
    a Named Entity type adapted to model named Entities, the Named Entity type derived from a separately defined class.

14. The linguistic object model of claim 1 wherein the set of types comprises:
    a Named Entity type adapted to model named Entities, the Named Entity type accessed directly using an interface.

15. The linguistic object model of claim 1 wherein each type in the set of types corresponds to semantically meaningful elements of a natural language utterance.

16. A linguistic object model that is encoded on a computer-readable medium and is adapted to be utilized by a computer to model semantic elements of a natural language, the linguistic object model comprising:
    a set of types representative of elements of natural language utterances, each type corresponding to semantically meaningful elements of an utterance, and wherein the set of types further comprises a Denoter type for modeling user-defined categories of input strings, and wherein a data member describing the Denoter comprises a record of which user-defined category of input strings in a Denoter object of type Denoter is filled at runtime by an analysis engine to fulfill a match between a type of the set of types and an element of a natural language utterance.

17. The linguistic object model of claim 16 wherein correspondence between each type and semantically meaningful elements of an utterance is literal.

18. The linguistic object model of claim 16 wherein the set of types are implemented as a software class library.

19. The linguistic object model of claim 16 wherein the set of types comprises:
an Entity type adapted to model semantic entities.

20. The linguistic object model of claim 16 wherein the set of types comprises:
a Frame type adapted to model semantic relationships.

21. The linguistic object model of claim 16 wherein the set of types comprises:
a Restriction type adapted to model properties of semantic entities and semantic relationships.

22. The linguistic object model of claim 21 wherein the Restriction type models relationships between combinations of Entities, Frames, and other Restrictions.

23. The linguistic object model of claim 16 further comprising:
classes of linguistic expressions that the set of types model;
wherein the set of types and the classes of expressions are independent of an application domain.

24. The linguistic object model of claim 16 wherein the set of types are independent of an application domain.

25. The linguistic object model of claim 16 further comprising:
an analysis engine adapted to interact with the set of types and a natural language input to map the semantic elements of the natural language input to the set of types, the analysis engine producing one or more LOM objects corresponding to the mapping.

26. The linguistic object model of claim 25 wherein the one or more LOM objects comprises at least one LOM object generated without directly mapping the semantic elements to a type of the set of types.

27. The linguistic object model of claim 16 wherein the Denoter type is adapted to model user-defined strings, and wherein the Denoter type associates a privileged data member to another type of the set of types.

28. A computer-implemented method of modeling natural language comprising:
categorizing linguistic expressions into classes corresponding to elements of an utterance; and
deriving a set of types adapted to represent those classes as abstract objects, wherein the set of types further comprises a Denoter type for modeling user-defined categories of input strings, and wherein a data member describing the Denoter comprises a record of which user-defined category of input strings in a Denoter object of type Denoter is filled at runtime by an analysis engine to fulfill a match between a type of the set of types and an element of a natural language utterance.

29. The method of claim 28 and further comprising:
compiling the set of types into a software class library.

30. The method of claim 28 wherein the set of types comprises:
an Entity of type entity model semantics of phrases.

31. The method of claim 30 wherein the Entity models the semantics of noun phrases.

32. The method of claim 30 wherein the Entity models the semantics of adjective phrases.

33. The method of claim 30 wherein the set of types further comprises:
a Frame for modeling semantics of events; and
wherein the Entity hosts the Frame.

34. The method of claim 30 wherein the Entity corresponds to another type that can be used by an analysis engine to map Entities to natural language words.

35. The method of claim 28 further comprising:
a Frame for modeling semantics of events.

36. The method of claim 35 wherein the event comprises a semantic event that can be expressed either as verbs or nouns.

37. The method of claim 35 wherein the Frame corresponds to another type that can be used by an analysis engine to map Frames to natural language words.

38. The method of claim 35 wherein a head word of a Frame is defined by a developer to create new Frame types.

39. The method of claim 35 wherein a developer codes an application-specific Frame to inherit from a Frame.

40. The method of claim 35 further comprising:
a Restriction models properties of semantic elements; and
wherein the Frame hosts the Restriction.

41. The method of claim 28 wherein the set of types comprises:
a Restriction adapted to model properties of semantic elements.

42. The method of claim 28 wherein the set of types comprises:
a Named Entity type adapted to model named Entities, the Named Entity type accessed directly via an appropriate interface.

43. The method of claim 28 wherein the set of types comprises:
Entities for modeling semantic objects;
Frames for modeling events and associated relationships between one or more objects; and
Restrictions for modeling properties of and relationships between other entities, Frames or restrictions.

44. The method of claim 28 wherein the set of types comprises:
a Named Entity type adapted to model named Entities, the Named Entity type derived from a separately defined class.

45. A computer readable medium storing computer readable data structures that are adapted to be utilized by a computer to model natural language, comprising:
a linguistic object model comprising a set of types for modeling semantics of natural language, the set of types being independent of any particular application, and wherein the set of types further comprises a Denoter type for modeling user-defined categories of input strings, and wherein a data member describing the Denoter comprises a record of which user-defined category of input strings in a Denoter object of type Denoter is filled at runtime by an analysis engine to fulfill a match between a type of the set of types and an element of a natural language utterance.

46. The computer readable medium of claim 45, wherein the set of types of the linguistic object model comprises:
an Entity type adapted to model semantic entities;
a Frame type adapted to model events and associated relationships; and
a Restriction type adapted to model properties of and relationships between Entities, Frames, or other restrictions.

47. The computer readable medium of claim 45 wherein the set of types of the linguistic object model comprises:
an Entity type for modeling the semantics of phrases.

48. The computer readable medium of claim 47 wherein the set of types of the linguistic object model wherein the Entity models the semantics of noun phrases.

49. The computer readable medium of claim 47 wherein the Entity models the semantics of adjective phrases.

50. The computer readable medium of claim 47 wherein the set of types of the linguistic object model further comprises:

a Frame for modeling semantics of events; and
wherein the Entity hosts the Frame.

51. The computer readable medium of claim 47 wherein the Entity includes a data member that can be used by an analysis engine to map Entities to natural language words.

52. The computer readable medium of claim 45 wherein the set of types comprises:
a Frame for modeling semantics of events.

53. The computer readable medium of claim 52 wherein the event comprises a semantic event that can be expressed either as verbs or nouns.

54. The computer readable medium of claim 45 wherein the set of types comprises:
a Restriction adapted to model properties of semantic elements.

55. The computer readable medium of claim 45 wherein the set of types comprises:
a Named Entity type adapted to model named Entities, the Named Entity type derived from a separately defined class.

56. The computer readable medium of claim 45 wherein the set of types comprises:
a Named Entity type adapted to model named entities, the Named Entity type being implemented from an interface.

* * * * *

UNITED STATES PATENT AND TRADEMARK OFFICE
CERTIFICATE OF CORRECTION

PATENT NO. : 7,171,352 B2  
APPLICATION NO. : 10/940483  
DATED : January 30, 2007  
INVENTOR(S) : Su Chin Chang et al.

It is certified that error appears in the above-identified patent and that said Letters Patent is hereby corrected as shown below:

In column 3, line 20, delete "like. that" and insert -- like that --, therefor.

In column 6, line 43, delete "declartive" and insert -- declarative --, therefor.

In column 7, line 53, delete "NET" and insert -- .NET --, therefor.

In column 10, line 9, delete "NET" and insert -- .NET --, therefor.

In column 13, line 17, delete "she is" and insert -- "She is" --, therefor.

In column 15, line 15, delete "Retriction." and insert -- Restriction. --, therefor.

In column 22, line 16, delete "archive" and insert -- archivo --, therefor.

In column 22, line 34, delete "restrictiondoes" and insert -- restriction does --, therefor.

In column 22, line 49, delete "vaiant" and insert -- variant --, therefor.

In column 30, line 38, delete "(for" and insert -- for --, therefor.

In column 31, line 30, delete "ReferencePointrefPoint;" and
insert -- ReferencePoint refPoint; --, therefor.

In column 61, line 11, delete "(Commands" and insert -- Commands --, therefor.

In column 63, line 11, after "Table 94" insert -- . --.

In column 81, line 47, delete "Net" and insert -- .Net --, therefor.

In column 95, line 32, delete "Entity1" and insert -- Entity$_1$ --, therefor.

Signed and Sealed this

Twenty-seventh Day of July, 2010

David J. Kappos
*Director of the United States Patent and Trademark Office*

CERTIFICATE OF CORRECTION (continued)
U.S. Pat. No. 7,171,352 B2

In column 96, line 6, delete "Entity1" and insert -- Entity$_1$ --, therefor.

In column 97, line 56, delete "intepretations." and insert -- interpretations. --, therefor.

In column 99, line 47, delete ""notes" and insert -- "notes" --, therefor.

In column 99, line 58, delete "ony" and insert -- any --, therefor.

In column 100, line 13, delete "ORFindJournal" and insert -- OR FindJournal --, therefor.

In column 100, line 18, delete ""notes" and insert -- "notes" --, therefor.

In column 100, line 51, delete ""notes" and insert -- "notes" --, therefor.

In column 102, line 38, delete "MoveNameRecognizer" and insert -- MovieNameRecognizer --, therefor.

In column 109, line 30, below "group'." insert -- The interpreter knows that "to seattle group" is a Goal restriction on 'send': --.

In column 109, line 67, after "list," insert -- DLEntityWords: --.

In column 111, line 8, delete "restrictionDoneTo" and insert -- restriction DoneTo --, therefor.

In column 111, line 12, delete "restrictionGoal" and insert -- restriction Goal --, therefor.